US009259956B2

(12) United States Patent
Asai et al.

(10) Patent No.: US 9,259,956 B2
(45) Date of Patent: Feb. 16, 2016

(54) IMAGE FORMING SYSTEM, CONTROL METHOD, RECORDING MEDIUM, AND PROGRAM

(75) Inventors: Hidehiko Asai, Yokohama (JP); Kazuhiko Ushiyama, Edogawa-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/024,164

(22) Filed: Feb. 9, 2011

(65) Prior Publication Data

US 2011/0135366 A1 Jun. 9, 2011

Related U.S. Application Data

(63) Continuation of application No. 11/771,586, filed on Jun. 29, 2007, now Pat. No. 7,907,887, which is a continuation of application No. 11/098,192, filed on Apr. 4, 2005, now Pat. No. 7,263,328.

(30) Foreign Application Priority Data

Apr. 5, 2004 (JP) ................................. 2004-111404
Feb. 28, 2005 (JP) ................................. 2005-053960

(51) Int. Cl.
*G03G 15/00* (2006.01)
*B42C 19/02* (2006.01)

(52) U.S. Cl.
CPC ............. *B42C 19/02* (2013.01); *B42P 2261/04* (2013.01); *H04N 2201/0094* (2013.01)

(58) Field of Classification Search
CPC .......... G03G 15/6544; G03G 15/6541; G03G 2215/00822; G03G 2215/00839
USPC ............................. 399/407, 408, 410; 412/18
See application file for complete search history.

(56) References Cited

U.S. PATENT DOCUMENTS

| 4,864,350 | A | * | 9/1989 | Ishiguro et al. ................. 399/14 |
| 4,965,629 | A | * | 10/1990 | Hiroi et al. ...................... 355/50 |
| 5,138,178 | A | * | 8/1992 | Wong et al. ............... 250/559.28 |
| 6,213,456 | B1 | * | 4/2001 | Hirano et al. .............. 270/58.08 |
| 6,406,199 | B1 | * | 6/2002 | Hayashi ......................... 400/76 |
| 6,945,715 | B2 | * | 9/2005 | Nakatani et al. ................ 400/61 |
| 7,949,293 | B2 | * | 5/2011 | Osawa ........................ 399/408 |
| 2004/0098665 | A1 | * | 5/2004 | Kasahara et al. ............. 715/500 |

FOREIGN PATENT DOCUMENTS

| JP | H02-086550 A | 3/1990 |
| JP | H03-151293 A | 6/1991 |
| JP | H09-151024 A | 6/1997 |

* cited by examiner

*Primary Examiner* — Matthew G Marini
(74) *Attorney, Agent, or Firm* — Canon U.S.A., Inc. IP Division

(57) ABSTRACT

An image forming system has an image forming apparatus which has a printing unit which can perform a printing process of data of a storage unit which can store data of a plurality of jobs and which has a conveying unit which can convey a sheet from the print unit to a sheet processing device which can perform sheet processing, including at least a gluing process, for sheets from the printing unit, the system comprising: a controller adapted to permit a predetermined process related to the gluing process when the job to be processed is a job which meets a predetermined condition, and to inhibit the predetermined process related to the gluing process when the job to be processed is not a job which meets the predetermined condition, thereby overcoming obstacles to realization of an image forming system capable of a gluing process.

12 Claims, 41 Drawing Sheets

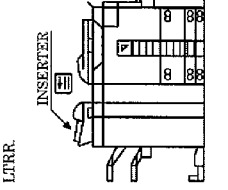
FIG. 7A
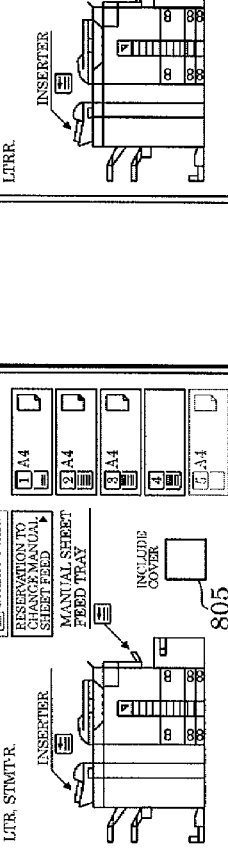
FIG. 7B
FIG. 7C
FIG. 7D

FIG. 8A
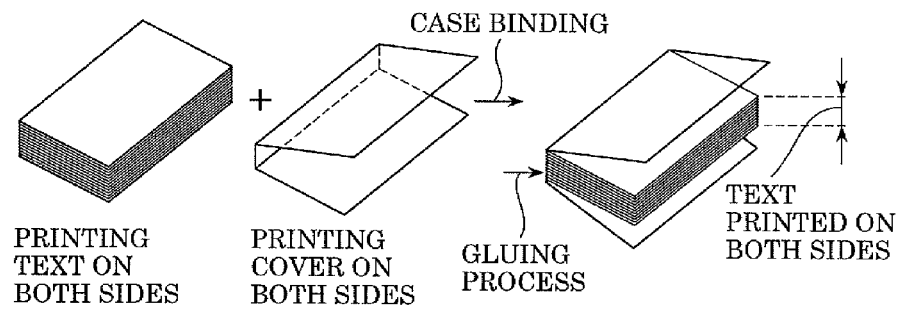
FIG. 8B
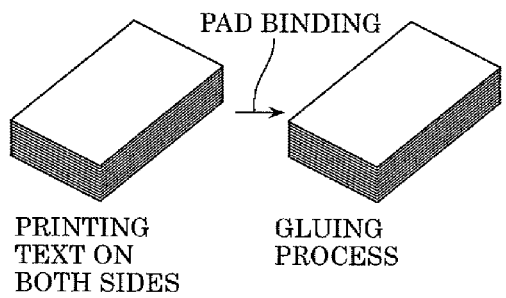
FIG. 9
| LAYOUT MEMORY | ~5000 |
| ACCUMULATION MEMORY 1 | ~5001 |
| ACCUMULATION MEMORY 2 | ~5002 |
| ACCUMULATION MEMORY 3 | ~5003 |
| | |
| | |
| | |
| ACCUMULATION MEMORY 100 | ~5100 |

| SHEET TYPE | SIZE (W mm × H mm) | TYPE OF SHEET PROCESS MODES | | | | | |
|---|---|---|---|---|---|---|---|
| | | GLUE-BINDING PROCESS MODE (NO.1) [CASE BINDING PROCESS MODE] | | GLUE-BINDING PROCESS MODE (NO.2) [PAD BINDING PROCESS MODE] | SADDLE STITCHING BINDING MODE (NO GLUING, BUT SADDLE-STITCHING PERFORMED) | PUNCH PROCESS MODE | STAPLING MODE | SHEET PROCESS MODE N |
| | | SHEETS WHICH ARE PERMITTED TO BE USED AS TEXT SHEETS IN THE CASE BINDING MODE ARE INDICATED BY "OK", THOSE INHIBITED ARE INDICATED BY "NO". | SHEETS WHICH ARE PERMITTED TO BE USED AS COVER SHEETS IN THE CASE BINDING MODE ARE INDICATED BY "OK", THOSE INHIBITED ARE INDICATED BY "NO". | SHEETS WHICH ARE PERMITTED TO BE USED AS TEXT SHEETS IN THE PAD BINDING PROCESS MODE ARE INDICATED BY "OK", THOSE INHIBITED ARE INDICATED BY "NO". | SHEETS WHICH ARE PERMITTED TO BE USED IN THE SADDLE-STITCHING BINDING PROCESS ARE INDICATED BY "OK", THOSE INHIBITED ARE INDICATED BY "NO". | SHEETS WHICH ARE PERMITTED TO BE USED IN THE PUNCH PROCESS MODE ARE INDICATED BY "OK", THOSE INHIBITED ARE INDICATED BY "NO". | SHEETS WHICH ARE PERMITTED TO BE USED IN THE STAPLING PROCESS MODE ARE INDICATED BY "OK", THOSE INHIBITED ARE INDICATED BY "NO". | |
| A5 | 148.5mm × 210mm | × | × | × | × | × | × | |
| A4 | 210mm × 297mm | ○ | × | ○ | × | ○ | ○ | |
| A3 | 297mm × 420mm | × | ○ | × | ○ | ○ | ○ | |
| . | . | . | . | . | . | . | . | . |
| LTR (LETTER) | 215.9mm × 279.4mm | ○ | × | ○ | × | × | ○ | |
| LGL (LEGAL) | 215.9mm × 355.6mm | × | × | × | × | ○ | ○ | |
| 11×17 (LEDGER) | 279.4mm × 431.8mm | × | ○ | × | ○ | ○ | ○ | |
| . | . | . | . | . | . | . | . | . |
| A5R | 210mm × 148.5mm | ○ | × | ○ | × | × | ○ | |
| A4R | 210mm × 297mm | × | ○ | × | ○ | × | ○ | |
| STMT-R | . | ○ | × | ○ | × | × | ○ | |
| LTR-R (LETTER R) | 279.4mm × 215.9mm | × | ○ | × | ○ | ○ | ○ | |
| B5 | 182mm × 257mm | ○ | × | ○ | × | × | ○ | |
| B4 | 257mm × 364mm | × | ○ | × | ○ | ○ | ○ | |
| . | . | . | . | . | . | . | . | . |
| . | . | . | . | . | . | . | . | . |
| A4 OVERSIZE | 242mm × 329mm | | ○ | | | × | ○ | |
| A3 OVERSIZE | 329mm × 483mm | × | | × | | × | | |
| SHEET N | | | | | | | | |

| TYPE OF SHEET PROCESS | GLUE-BINDING PROCESS MODE (NO. 1) [CASE BINDING PROCESS MODE] | GLUE-BINDING PROCESS MODE (NO. 2) [PAD BINDING PROCESS MODE] | SADDLE STITCHING BINDING MODE (NO GLUE, BUT SADDLE-STITCHING PREFORMED) | TRIMMING PROCESS MODE | STAPLING PROCESS MODE | PUNCHING PROCESS MODE | SHIFT SHEET DISCHARGE PROCESS MODE | ... | PROCESS MODE N |
|---|---|---|---|---|---|---|---|---|---|
| GLUE-BINDING PROCESS MODE (NO. 1) [CASE BINDING PROCESS MODE] | — | × | × | ○ | × | × | × | · | · |
| GLUE-BINDING PROCESS MODE (NO. 2) [PAD BINDING PROCESS MODE] | × | — | × | ○ | × | ○ | × | · | · |
| SADDLE STITCHING BINDING MODE (NO GLUE, BUT SADDLE-STITCHING PREFORMED) | × | × | — | ○ | × | × | × | · | · |
| TRIMMING PROCESS MODE | ○ | ○ | ○ | — | ○ | × | × | · | · |
| STAPLING PROCESS MODE | × | × | × | ○ | — | ○ | ○ | · | · |
| PUNCHING PROCESS MODE | × | ○ | × | × | ○ | — | ○ | · | · |
| SHIFT SHEET DISCHARGE PROCESS MODE | × | × | × | × | ○ | ○ | — | · | · |
| ... | · | · | · | · | · | · | · | · | · |
| PROCESS MODE N | · | · | · | · | · | · | · | · | — |

FIG. 36

CALCULATION TABLE FOR TOTAL NUMBER OF SHEETS
N TO BE USED FOR JOB TO BE PROCESSED
M REPRESENTS THE TOTAL NUMBER OF PAGES OF DATA
OF JOB TO BE PROCESSED

| | PROCESS CONDITION | CALCULATION |
|---|---|---|
| CASE 1 | SINGLE-SIDED PRINTING (REDUCED LAYOUT MODE OFF) | $(M \div 1) \div 1$ |
| CASE 2 | SINGLE-SIDED PRINTING + REDUCED LAYOUT MODE (2-IN-1) | $(M \div 2) \div 1$ |
| CASE 3 | SINGLE-SIDED PRINTING + REDUCED LAYOUT MODE (4-IN-1) | $(M \div 4) \div 1$ |
| CASE 4 | SINGLE-SIDED PRINTING + REDUCED LAYOUT MODE (8-IN-1) | $(M \div 8) \div 1$ |
| CASE 5 | BOTH-SIDED PRINTING (REDUCED LAYOUT MODE OFF) | $(M \div 1) \div 2$ |
| CASE 6 | BOTH-SIDED PRINTING + REDUCED LAYOUT MODE (2-IN-1) | $(M \div 2) \div 2$ |
| CASE 7 | BOTH-SIDED PRINTING + REDUCED LAYOUT MODE (4-IN-1) | $(M \div 4) \div 2$ |
| CASE 8 | BOTH-SIDED PRINTING + REDUCED LAYOUT MODE (8-IN-1) | $(M \div 8) \div 2$ |
| CASE 9 | SADDLE-STITCHING BINDING MODE | $M \div 4$ |
| . | . | . |
| . | . | . |
| CASE N | | |

ALL DECIMALS ARE ROUNDED TO THE
NEXT INTEGER, N IS AN INTEGER

FUNCTION RESTRICTION MANAGEMENT TABLE FOR CASE OF NOT TAKING SHEET TYPE (MEDIA TYPE) INTO CONSIDERATION
N REPRESENTS TOTAL NUMBER OF SHEET TO BE USED WITH JOB TO BE PROCESSED

| | TYPE OF SHEET PROCESS | WHETHER PROCESS IS PERMITTED OR NOT | |
|---|---|---|---|
| SHEET PROCESS MODE 1 | GLUE-BINDING PROCESS MODE (NO.1) [CASE BINDING PROCESS MODE] | IF N < 10 (CASE 1), OR 150 < N (CASE 2), EXECUTION OF CASE BINDING PROCESS IS INHIBITED | IF 10 ≦ N ≦ 150 (CASE 3), EXECUTION OF CASE BINDING PROCESS IS PERMITTED |
| SHEET PROCESS MODE 2 | GLUE-BINDING PROCESS MODE (NO.2) [PAD BINDING PROCESS MODE] | IF 150 < N (CASE 4), EXECUTION OF PAD BINDING PROCESS IS INHIBITED | IF N ≦ 150 (CASE 5), EXECUTION OF PAD BINDING PROCESS IS PERMITTED |
| SHEET PROCESS MODE 3 | SADDLE STITCHING BINDING MODE (NO GLUE, BUT SADDLE-STITCHING PERFORMED) | IF 15 < N (CASE 6), EXECUTION OF SADDLE STITCHING BINDING (NO GLUE, SADDLE-STITCHING) IS INHIBITED | IF N ≦ 15 (CASE 7), EXECUTION OF SADDLE STITCHING BINDING (NO GLUE, SADDLE-STITCHING) IS PERMITTED |
| . | . | . | . |
| . | . | . | . |
| SHEET PROCESS MODE N | | | |

FUNCTION RESTRICTION MANAGEMENT TABLE FOR CASE OF TAKING SHEET TYPE (MEDIA TYPE) INTO CONSIDERATION
N REPRESENTS TOTAL NUMBER OF SHEETS TO BE USED WITH JOB TO BE PROCESSED

| TYPE OF SHEET (MEDIA TYPE) | TYPE OF SHEET PROCESS | WHETHER PROCESS IS PERMITTED OR NOT | |
|---|---|---|---|
| MEDIA TYPE 1 (PLAIN PAPER, RECYCLED PAPER) | GLUE BINDING PROCESS MODE (NO.1) [CASE BINDING PROCESS] | IF N < 10 (CASE 1), OR 150 < N (CASE 2), EXECUTION OF CASE BINDING PROCESS IS INHIBITED | IF 10 ≤ N ≤ 150 (CASE 3), EXECUTION OF CASE BINDING PROCESS IS PERMITTED |
| | GLUE BINDING PROCESS MODE (NO.2) [PAD BINDING PROCESS] | IF 150 < N (CASE 4), EXECUTION OF PAD BINDING PROCESS IS INHIBITED | IF N ≤ 150 (CASE 5), EXECUTION OF PAD BINDING PROCESS IS PERMITTED |
| | SADDLE STITCHING BINDING MODE (NO GLUE, BUT SADDLE-STITCHING PERFORMED) | IF 15 < N (CASE 6), EXECUTION OF SADDLE STITCHING BINDING (NO GLUE, SADDLE-STITCHING) IS INHIBITED | IF N ≤ 15 (CASE 7), EXECUTION OF SADDLE STITCHING BINDING (NO GLUE, SADDLE-STITCHING) IS PERMITTED |
| MEDIA TYPE 2 (COLOR PAPER, GLOSSY PAPER) | CASE BINDING PROCESS | IF N < 8 (CASE 8), OR 100 < N (CASE 9), EXECUTION OF CASE BINDING PROCESS IS INHIBITED | IF 8 ≤ N ≤ 100 (CASE 10), EXECUTION OF CASE BINDING PROCESS IS PERMITTED |
| | PAD BINDING PROCESS | IF 100 < N (CASE 11), EXECUTION OF PAD BINDING PROCESS IS INHIBITED | IF N ≤ 100 (CASE 12), EXECUTION OF PAD BINDING PROCESS IS PERMITTED |
| | SADDLE STITCHING BINDING PROCESS (NO GLUE, BUT SADDLE-STITCHING PERFORMED) MODE | IF 10 < N (CASE 13), EXECUTION OF SADDLE STITCHING BINDING (NO GLUE, SADDLE-STITCHING) IS INHIBITED | IF N ≤ 10 (CASE 14), EXECUTION OF SADDLE STITCHING BINDING (NO GLUE, SADDLE-STITCHING) IS PERMITTED |
| MEDIA TYPE 3 (HEAVY PAPER) | CASE BINDING PROCESS | IF N < 5 (CASE 15), OR 75 < N (CASE 16), EXECUTION OF CASE BINDING PROCESS IS INHIBITED | IF 5 ≤ N ≤ 75 (CASE 17), EXECUTION OF CASE BINDING PROCESS IS PERMITTED |
| | PAD BINDING PROCESS | IF 75 < N (CASE 18), EXECUTION OF PAD BINDING PROCESS IS INHIBITED | IF N ≤ 75 (CASE 19), EXECUTION OF PAD BINDING PROCESS IS PERMITTED |
| | SADDLE STITCHING BINDING PROCESS (NO GLUE, BUT SADDLE-STITCHING PERFORMED) MODE | IF 5 < N (CASE 20), EXECUTION OF SADDLE STITCHING BINDING (NO GLUE, SADDLE-STITCHING) IS INHIBITED | IF N ≤ 5 (CASE 21), EXECUTION OF SADDLE STITCHING BINDING (NO GLUE, SADDLE-STITCHING) IS PERMITTED |
| ... | ... | ... | ... |
| MEDIA TYPE N | CASE BINDING PROCESS | | |
| | PAD BINDING PROCESS | | |
| | SADDLE STITCHING BINDING PROCESS (NO GLUE, BUT SADDLE-STITCHING PERFORMED) MODE | | |

FIG. 42

STORAGE MEDIUM SUCH AS FD OR CD-ROM

| DIRECTORY INFORMATION |
|---|
| FIRST DATA PROCESSING PROGRAM<br>PROGRAM CODE GROUP CORRESPONDING TO<br>STEPS OF FLOWCHART<br>SHOWN IN FIG. 13 |
| SECOND DATA PROCESSING PROGRAM<br>PROGRAM CODE GROUP CORRESPONDING TO<br>STEPS OF FLOWCHART<br>SHOWN IN FIG. 15 |
| THIRD DATA PROCESSING PROGRAM<br>PROGRAM CODE GROUP CORRESPONDING TO<br>STEPS OF FLOWCHART<br>SHOWN IN FIG. 16 |
|  |
| MANAGEMENT DATA PROGRAM GROUP<br>PROGRAM CODE GROUP CORRESPONDING TO<br>EACH TYPE OF MANAGEMENT<br>INFORMATION, INCLUDING THE MANAGEMENT<br>INFORMATION IN FIGS.<br>18, 20, 36, 37, 38, ETC. |

STORAGE MEDIUM MEMORY MAP

IMAGE FORMING SYSTEM, CONTROL METHOD, RECORDING MEDIUM, AND PROGRAM

CROSS REFERENCE TO RELATED APPLICATIONS

This application is a continuation of U.S. patent application Ser. No. 11/771,586, filed Jun. 29, 2007, which is a continuation of U.S. patent application Ser. No. 11/098,192, filed Apr. 4, 2005, which claims priority from Japanese Patent Application No. 2004-111404, filed Apr. 5, 2004, and Japanese Patent Application No. 2005-053960, filed Feb. 28, 2005, all of which are hereby incorporated by reference herein in their entirety.

BACKGROUND OF THE INVENTION

1. Field of the Invention

The present invention relates to an image forming apparatus, and more particularly relates to an image forming system having a sheet processing device which performs glue-binding, and to a control method, a recording medium, and a program of the same, and so forth.

2. Description of the Related Art

In recent years, digital multi-function apparatuses having binding printing (pamphlet printing) capabilities using imposition functions with digital image processing have been realized, and now, sheet processing devices which perform saddle-stitching in the process of pamphlet printing are being proposed.

Although the extent of processing which can be realized with such sheet processing devices having saddle-stitching functions is limited to simple bookbinding processing at the present, it is likely that in the future, there will be demand for bookbinding processing at a much higher level, such as glue-binding wherein the printed articles are glued, i.e., demand for bookbinding much closer to professional bookbinding. An example of a proposal being considered for such glue-binding can be seen in the configuration of the glue-binding device disclosed in Japanese Patent Laid-Open No. 2002-293060.

Such glue-binding devices may conceivably be as large as a digital multi-function apparatus, or even larger. This could lead to such glue-binding devices being expensive as well as taking up a large office space footprint. This would mean that most corporations would not be able to introduce these devices to the office environment without creating dedicated space, such as a copier room.

Accordingly, reducing the size of the glue-binding devices is being considered. Realization of reduction in the size of the glue-binding devices would mean reduced costs and a smaller footprint, so corporations would be able to replace currently-used devices with these devices, even without dedicated space.

However, attempts to reduce the size of glue-binding devices may come across the following restrictive issues.

(1) Binding of large-size sheets (A3 and B4) not being available.

(2) The number of sheets which can be glued at once being restricted.

(3) The number of sheets which can be glued at once changing depending on the type of sheets. For example, thicker sheets would mean that the number of sheets which can be glued would be reduced accordingly.

Observing the current marketplace, the demand for small-size (A4, US letter, or smaller) bookbinding is overwhelmingly greater than that for large-size (A3 and B4) bookbinding, so it would seem that needs for large-size bookbinding are negligible. On the other hand, most digital multi-function apparatuses are capable of printing large-size sheets. Now, let us say that an image forming apparatus or image forming system such as a digital multi-function apparatus was realized with glue-binding functions, but that the glue-binding functions were available only for small-size sheets, in accordance with (1) above. It is conceivable that there would be users who would assume that the glue-binding functions are available for large-size sheets, as well. Such misconceptions of users could lead to situations wherein the user plans a large-size bound article, creates the pages, and prints the pages, only to find that the command for glue-binding of the sheets is not available or ends in an error, wasting the user's time and resources.

The same can be said with regard to (2) and (3) wherein the number of sheets are limited. A user could attempt to create a bound article without correct understanding of the restrictions on the number of sheets, and the excessive number of sheets could result in trouble in binding, wasting the user's time and resources.

Further, in the case of the user attempting to use heavier sheets (issue (3) listed above), the restriction on the number of sheets differs according to how heavy the sheets are, meaning that it is difficult for the user to grasp the concept of how many sheets can be bound for which weight paper. This could also result in trouble in binding, wasting the user's time and resources.

Summarizing the above, the user of such a device would need to have extensive knowledge of the specifications of the device to avoid such trouble from occurring frequently, meaning that the device is not user-friendly at all.

As described so far, there are problems that must be solved in order to provide a product such as the image-forming device of a digital multi-function apparatus or the like, or an image forming system having the same, having capabilities of a gluing process, in a form which is non-problematic to the user.

Other problems to be studied, besides those listed above, potentially exist. For example, the product to be provided to the user should be capable of handling various bookbinding demands made by the users, such as users demanding a wide and varied range of output formats for the gluing-binding printing capabilities.

In light of this, the device or system to be provided should be capable of handling a wide variety of user needs regarding glue-binding for example, and should also be user-friendly and highly advantageous to the user. Thus, it can be said that there is still much study to be undertaken before realizing products such as an image-forming device of a digital multi-function apparatus or the like, or an image forming system having the same, having gluing process capabilities.

SUMMARY OF THE INVENTION

The present invention provides an image forming system, a control method, a storage medium, and a program, capable of solving the above problems.

The present invention provides an image forming system, a control method, a storage medium, and a program, which provide for an image forming apparatus or image forming system such as a digital printing system or the like which handles an environment capable of performing the sheet gluing process, and is user-friendly, which proactively avoid problems expected with the conventional art in the process of realizing a product of an image forming apparatus or image forming system enabling the gluing process to be performed on sheets, whereby unexpected trouble in the apparatus or extra work for the operator can be prevented beforehand.

Also, the present invention provides an image forming system, a control method, a storage medium, and a program, which allow impediments in glue-binding, due to the restriction items occurring due to reduction in size of the device for performing the glue-binding, to be suppressed, and solve the ill ease-of-use due to the restriction items occurring due to reduction in size, footprint, and cost.

Also, the present invention provides an image forming system, a control method, a storage medium, and a program, which take into consideration various user needs regarding bookbinding, and handle such user needs.

Also, the present invention provides an image forming system, a control method, a storage medium, and a program, which take into consideration various user needs regarding output of the glue-bound printed articles, and handle a wide variety of output formats to meet such needs.

Also, the present invention provides an image forming system, a control method, a storage medium, and a program, which take into consideration various user needs regarding glue-binding, and flexibly handle various user needs, which are easy to use, and which provide increased user advantages.

Further features and advantages of the present invention will become apparent from the following description of exemplary embodiments (with reference to the attached drawings).

BRIEF DESCRIPTION OF THE DRAWINGS

FIGS. 7A through 7D are further model diagrams illustrating examples of the operating screen (screens (d) through (g) displayed on the liquid crystal display unit shown in FIG. 4.

FIGS. 8A and 8B are schematic diagrams describing glue-binding according to the embodiment.

FIG. 9 is a schematic diagram illustrating a memory map of image memory illustrated in FIG. 2.

FIG. 18 is a diagram illustrating an example of a management table storing management information for stipulating restriction items relating to both: selection candidates of multiple types of sheets which can be printed by the printer unit according to the embodiment; and multiple types of sheet processes executable by the sheet processing device.

FIG. 20 is a diagram illustrating an example of a management table storing management information for stipulating restriction items among multiple types of sheet processing modes executable by the sheet processing device according to the embodiment.

FIG. 36 is a diagram illustrating an example of a management table storing management information for calculating the total number of sheets necessary for a job to be processed, which is to be controlled with the embodiment.

FIG. 37 is a diagram illustrating an example of a management table storing management information for stipulating restriction items relating to both: the total number of sheets necessary for a job to be processed; and multiple types of sheet processing executable by the sheet processing device which is to be controlled with the embodiment.

FIG. 38 is another diagram illustrating an example of a management table storing management information for stipulating restriction items relating to both: the total number of sheets necessary for a job to be processed; and multiple types of sheet processes executable by the sheet processing device which is to be controlled with the embodiment.

FIG. 42 is a diagram for describing a memory map of a storage medium (recording medium) for storing data processing programs for realizing the processes and control relating to the present invention.

DESCRIPTION OF THE EMBODIMENTS

First Embodiment

Figure 1:
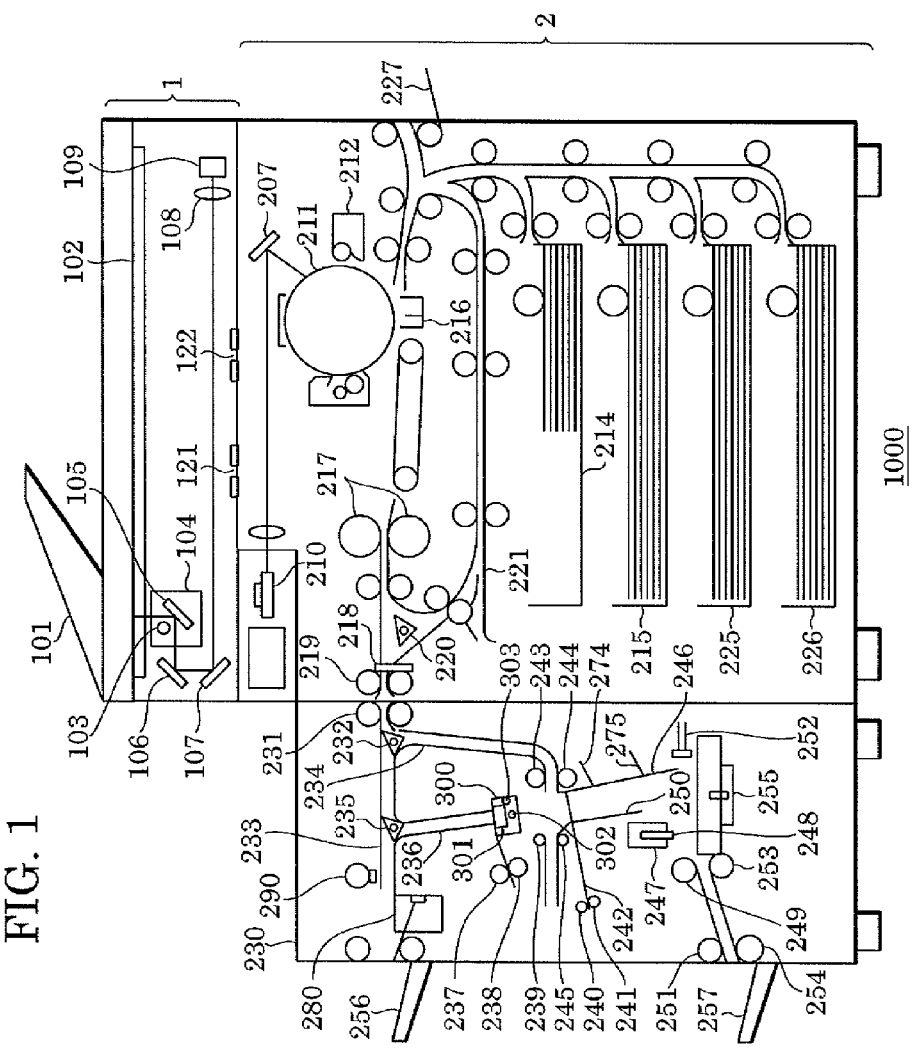
FIG. 1 is a cross-sectional diagram illustrating the configuration of an image forming system according to a first embodiment of the present invention.

FIG. 1 is a cross-sectional diagram illustrating the configuration of a photocopier (digital multi-function apparatus) to which can be applied an image forming apparatus (image forming system) according to a first embodiment of the present invention.

As shown in FIG. 1, the image forming apparatus (also referred to as "image forming system") 1000 according to the present invention has a reader unit 1 and a printer unit 2. The system 1000 further has a bookbinding unit 230, as an example of a sheet processing device (also called a "finisher") for subjecting sheets from the image forming apparatus main unit to various types of sheet processes (e.g., a case binding process, a pad binding process, a trimming process, a stapling process, a punching process, a shifted sheet discharge process, and so forth). The following is a description of the configuration and actions of the reader unit 1. The configuration and actions of the printer unit 2 and of the bookbinding unit (also called "sheet processing device") 230 will be described later.

Note that with the image forming system 1000, each of the individual units such as the reader unit 1, printer unit 2, sheet processing unit 230, and so forth, may be built into the same casing, or may be individually configured in separate casings.

Also, a configuration may be made as with the present invention, which is a system configuration wherein a sheet processing device such as the sheet processing device 230 may be connected as an option to the image forming apparatus main unit having the reading unit 1 and printer unit 2. Also, an arrangement may be made as an device configuration wherein the image forming apparatus main unit comprises the sheet processing device 230 as a standard component. In short, the present embodiment may be formed as any device configuration or system configuration.

With the reader unit 1 shown in FIG. 1, reference numeral 101 denotes an original document feeding device, also known as an ADF (Automatic Document Feeder) arranged so that an original document stack loaded on the original document feeding device 101 is conveyed onto an original document glass table 102, one sheet at a time in order from the first page. Upon a document being conveyed to a predetermined position on the original document glass table 102, a lamp 103 of the scanner unit is lit, and a scanner unit 104 is moved so as to illuminate the document. The reflected light from the original document is reflected off of mirrors 105, 106, 107, passes through a lens 108, and is input to a CCD image sensor unit 109 (hereafter referred to simply as a "CCD").

Figure 2:
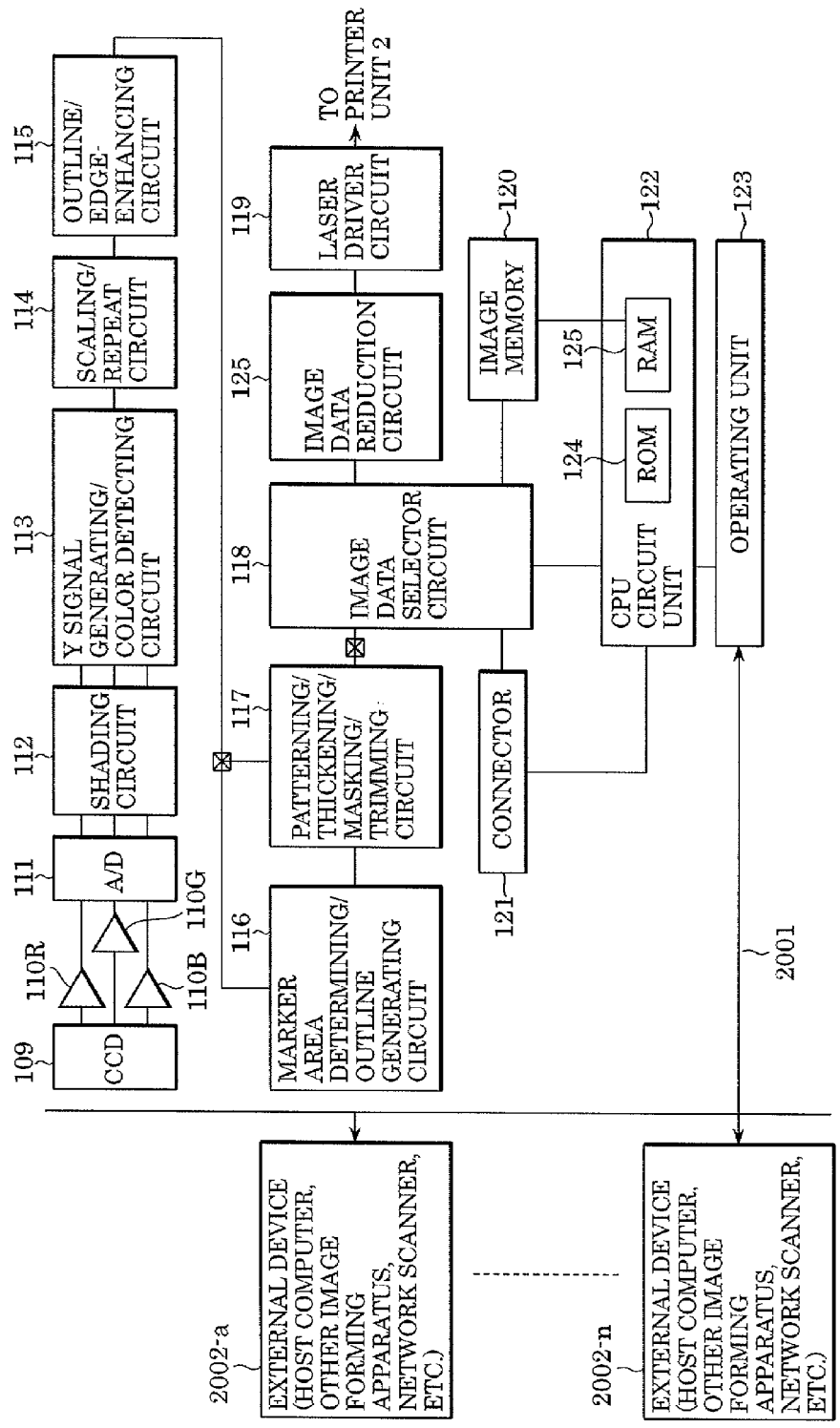
FIG. 2 is a circuit block diagram illustrating the signal processing configuration of a reader unit shown in FIG. 1.
Figure 3:
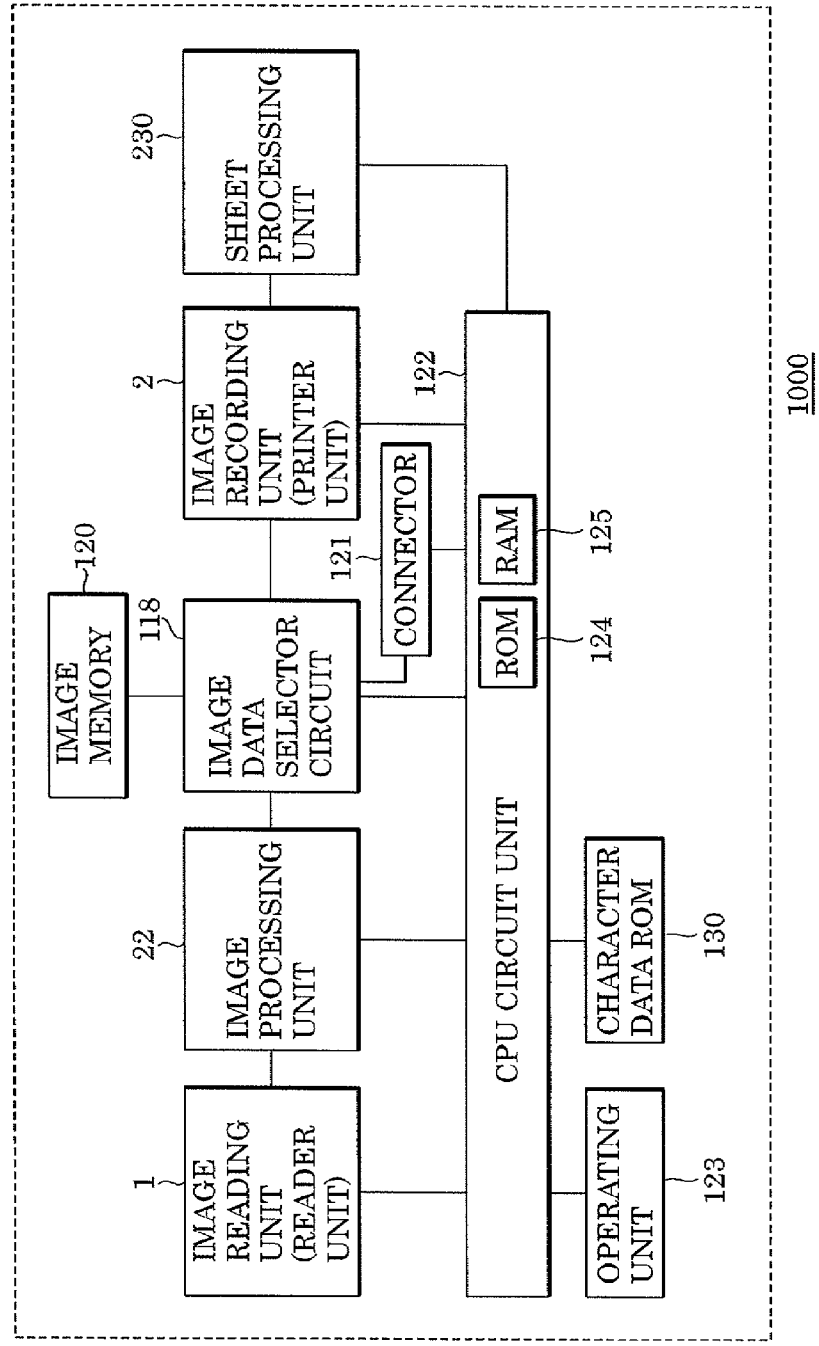
FIG. 3 is a circuit block diagram illustrating the signal processing configuration of the reader unit shown in FIG. 1.

FIGS. 2 and 3 are circuit block diagrams illustrating the signal processing configuration of the reader unit 1 shown in FIG. 1, and components in FIGS. 2 and 3 which are the same as those in FIG. 1 are denoted with the same reference numerals. The following is a description of the configuration and actions thereof.

As shown in FIG. 2, the reflected light from the original document which is cast onto the CCD 109 is subjected to photoelectric conversion here, so as to be converted into electric signals corresponding to each of the colors Red, Blue, and Green. The color information from the CCD 109 is then amplified at subsequent amplifiers 110R, 110G, and 110B, in accordance with the input signal level of an A/D converter 111.

Next, the output signals from the A/D converter 111 are input to a shading circuit 112, where light distribution irregularities of the lamp 103 and sensitivity irregularities of the CCD 109 are corrected. Signals from the shading circuit 112 are input to a Y signal generating/color detecting circuit 113.

The Y signal generating/color detecting circuit 113 has a Y signal generating circuit which performs computation of signals from the shading circuit 112 according to the following Expression to obtain a Y signal, and a color detecting circuit for dividing the R, G, and B signals into seven colors, and outputting signals corresponding to each color.

$$Y=0.3R+0.6G+0.1B$$

The output signals from the Y signal generating/color detecting circuit 113 are input to a scaling/repeat circuit 114. The scanning speed of the scanner unit 104 determines the scaling in the sub-scanning direction, and the scaling/repeat circuit 114 determines the scaling in the main scanning direction. Further, the scaling/repeat circuit 114 can be used to output multiple copies of the same image.

The signals from the scaling/repeat circuit 114 are input to an outline/edge-enhancing circuit 115 where the high-frequency component of the signals is enhanced, thereby obtaining edge enhancement and outline information. Signals from the outline/edge-enhancing circuit 115 are input to a marker area determining/outline generating circuit 116 and a patterning/thickening/masking/trimming circuit 117.

The marker area determining/outline generating circuit 116 reads portions written on the original document with a marker pen of a specified color and generates outline information of the marker, and then sends this to the subsequent patterning/thickening/masking/trimming circuit 117.

The patterning/thickening/masking/trimming circuit 117 performs thickening, masking, and trimming based on the outline information generated at the marker area determining/outline generating circuit 116, performs patterning based on color detection signals from the Y signal generating/color detecting circuit 113, and sends this to an image data selector circuit 118. Note that the image processing unit 22 shown in FIG. 3 corresponds to the components denoted by reference numerals 110 through 117.

The output signals from the patterning/thickening/masking/trimming circuit 117 are, in the event of output to the printer unit 2, selected by an image data selector circuit 118 under the control of a later-described CPU circuit unit 122, output to a laser driver circuit 119 via an image data reduction circuit 125, and the signals subjected various types of processes at the laser driver circuit 119 are converted into signals for driving the laser. The output signals of the laser device circuit 119 are input to the printer unit 2, and image forming is carried out to manifest a visible image.

A connector unit is configured so as to externally transmit ("externally" meaning to a host computer or other image forming apparatuses or the like, remote external devices 2002a through n capable of data communication with the present device, etc.) image data sent from the image data selector circuit 118 under instructions of the CPU circuit unit 122 via a predetermined communication medium 2001 such as a LAN or the like, for example, or to output image data received from an external device 2002 via a communication medium 2001 to the image data selector circuit 118. That is to say, the connector 121 has various types of data communication functions serving as external interface functions.

Image memory 120 stores and reads out the image data sent from the image data selector circuit 118 according to a latter-described method to and from specified locations of the image memory 120 specified by the CPU circuit unit 122, and has functions for rotating and synthesizing images in the memory. The image memory 120 also has large-capacity image memory such as a hard disk or the like, capable of storing multiple pages of image data.

The CPU circuit unit 122 effects control so as to store, on the internal hard disk of the image memory 120, the image data from the reader unit 1, and the image data from the various external devices (external device 202 in FIG. 2, etc.) of the host computer or other image forming apparatuses and the like, received via the connector 121.

The image data sorted in the hard disk within the image memory 120 is controlled by the CPU circuit unit 122, so as to be read out from the hard disk as suitable according to user instructions, and output as data output to destinations such as the printer unit 2, external devices, and so forth.

The present image forming apparatus is controlled by the CPU circuit unit 122 so as to be capable of simultaneous parallel processing of multiple jobs, using the image memory 120 having such a hard disk. For example, parallel with (simultaneously with) image data of a certain job being read out from a hard disk and printed at the printer unit 2, data of another job can be received, and the image data of the newly-received other job can be stored in the hard disk, even though the printing of the previous job is still continuing. Thus, the present device realizes asynchronous operations.

Of course, an arrangement may be made wherein image data of a certain job is input from the reader unit 1 or from an external device, and the input data is controlled so as to be stored in the hard disk, while in parallel with the input operation of the data, the image data of this same job is read out from the hard disk and printed at the printer unit 2. Thus, the present device realizes synchronous execution of operations for input/output of the same job.

Also, the image forming system 1000 according to the present embodiment has other functions in addition to the copying functions wherein job data from the reader unit 1 is printed at the printer unit 2 via the hard disk of the image memory 120. For example, the image forming system 1000 has printing functions wherein job data from an external device such as a computer or the like, received with the connector unit 121, is printed at the printer unit 2 via the hard disk of the image memory 120, data transmission functions wherein image data stored on the hard disk of the image memory 120 is transmitted to an external device using a data communication unit such as the connector 121 or the like.

Thus, the image forming system 1000 is an MFP (multi-function peripheral) type device having multiple functions. However, the present embodiment is not restricted to this arrangement, and may be a single function peripheral such as a device having only printing functions, or only copying functions, for example.

The CPU circuit unit 122 centrally controls the various units such as the reader unit 1, printer unit 2, connector unit 121, image memory unit 120, sheet processing device (bookbinding device) 230, and so forth. The CPU circuit unit 122 further has ROM 124 for storing various types of control programs and error processing program including programs for executing the processes of the later-described flowcharts, display control programs for displaying later-described display screens on an operating unit 123, and so forth. The CPU circuit unit 122 also has RAM 125 used as work area for the programs, and timer control units and the like. Also, image data stored in the RAM 125 can be rendered on the image memory 120 under instructions from the CPU circuit unit 122.

The CPU circuit unit 122 thus functions as a control unit, which controls the jobs to be processed by the present device according to a desired processing format in accordance with instructions from the user. Also, in addition to such job control, the CPU circuit unit 122 further governs display control of the operating unit 123 which has a display unit 4-250, an example of a user interface unit.

Information regarding the size of the recording sheets loaded on the discharge tray, the type of sheets, and whether or not subjected to stack shifting, is stored in the RAM 125 for each discharge tray, and the CPU circuit unit 122 loads a comparison program stored in the ROM 124 to the RAM 125 and executes the program, whereby the size, sheet type, etc., of the recording sheets loaded on each of the discharge trays can be determined.

Reference numeral 130 in FIG. 3 denotes character data ROM which stores character image data. The CPU circuit unit 122 reads out the image data stored in the character data ROM 130, based on the character code of characters to be printed, and renders the image data in the image memory 120 as bitmap image data. Also, an arrangement may be made wherein image data stored in the RAM 125 is rendered in the image memory 120 under instructions from the CPU circuit unit 122.

The operating unit 123 has: a key group of various keys for instructing image-related actions, such as for setting the contents of an image editing process to be performed on the image from the reader unit 1, setting the number of copies (or number of prints), and so forth; a display unit for displaying the operations being made; and so forth.

The CPU circuit unit 122 effects control so as to display the setting screens on the display unit 4-250 (an example of a user interface unit) of the operating unit 123. The user can use the setting screens on the display unit 4-250 to set the number of copies (or number of prints), the output sheets (the sheet size and/or sheet type), scaling, single-side or both-side output, and so forth. Further, the user can use the setting screens on the display unit 4-250 to set various application modes, such as reduced layout modes like the 2-in-1 mode (a layout mode wherein two pages of image data are arrayed on the same sheet), the 4-in-1 mode (a layout mode wherein four pages of image data are arrayed on the same sheet), the 8-in-1 mode (a layout mode wherein eight pages of image data are arrayed on the same sheet), and so forth. Moreover, the user can use the setting screens on the display unit 4-250 of the operating unit 123 to set desired sheet processes executable with the sheet processing device (bookbinding device 230) from the selection available (the case binding process, pad binding process, trimming process, stapling process, punching process, shifted sheet discharge process, and so forth).

Thus, the operating unit 123, and the display unit 4-250 thereof, serving as a user interface unit, receive from the user a processing condition for a job to be processed. Based on the processing condition received from the user, the CPU circuit unit 122 executes the later-described various types of processes. The CPU circuit unit 122 performs display control with regard to the display unit 4-250, whereby the later-described setting screens are displayed on the display unit 4-250. The CPU circuit unit 122 controls the units which the present image forming system has, such as the reader unit 1, printer unit 2, sheet processing device 230, image memory unit 120, and so forth, so as to execute processes according to the instructions received from the user via the user interface as described above, for the jobs to be processed.

The detailed configuration of the operating unit 123 shown in FIGS. 2 and 3, and an example of operating procedures carried out at the operating unit 123, will be described with reference to FIGS. 4 through 7.

Figure 4:
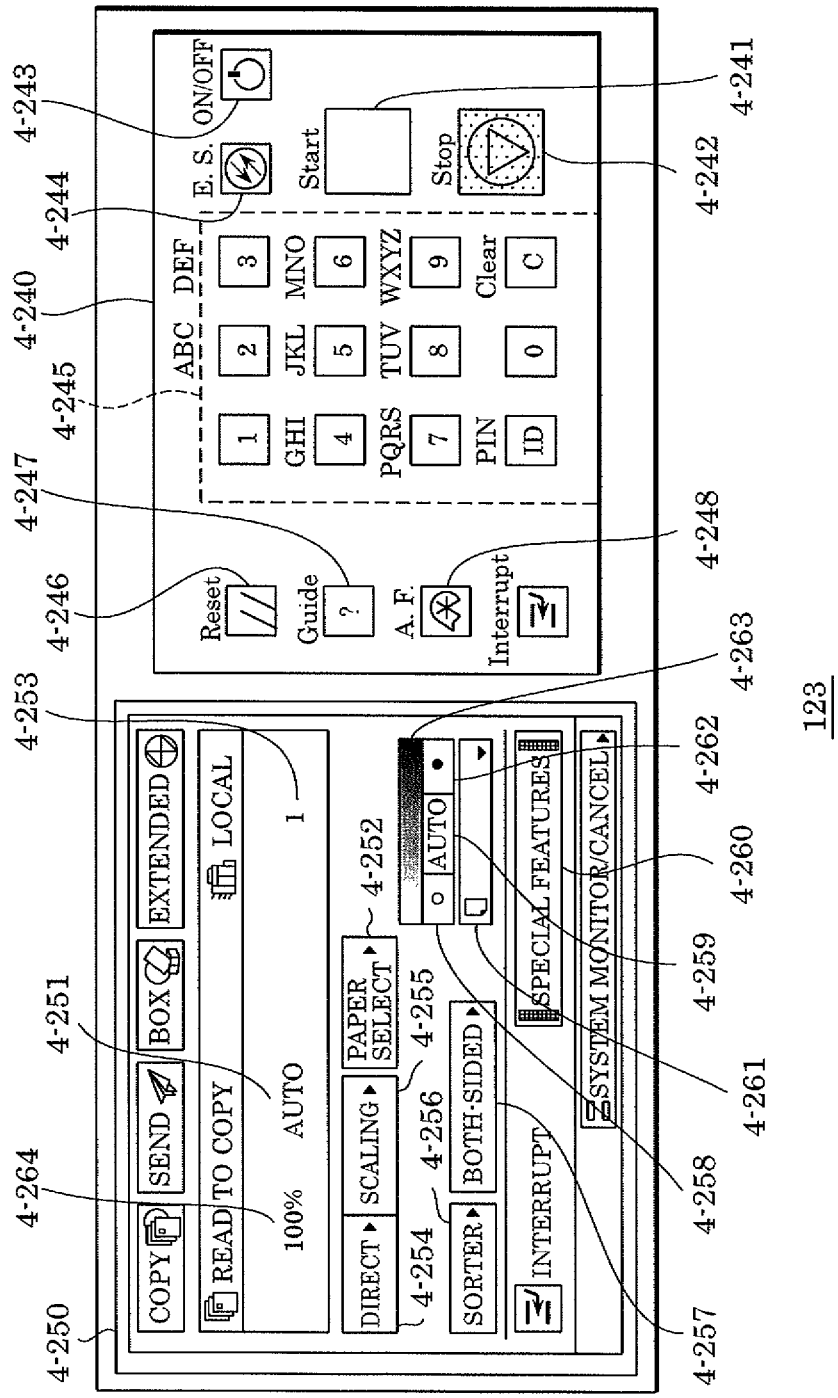
FIG. 4 is a plan view illustrating the detailed configuration of an operating unit shown in FIG. 3.

FIG. 4 is a plan view illustrating the detailed configuration of the operating unit 123 shown in FIG. 3, and FIG. 5 is a model diagram illustrating an example of the operating screen displayed on the liquid crystal display unit 4-250 shown in FIG. 4.

As shown in FIG. 4, the operating unit 123 comprises multiple keys (a hard key group 4-240), and a liquid crystal display unit 4-250 configured of a dot matrix made up of a liquid crystal display device. The liquid crystal display unit 4-250 has a touch panel on the surface thereof, and key input is enabled by pressing portions with keys displayed thereupon. The hard key group 4-240 has various types of hard keys 4-241 through 4-248.

Key 4-243 is a power key, for turning the electric power on and off. Key 4-244 is a power conservation key, and is for starting the power conservation mode and ending the power conservation mode. The key 4-241 is a start key, for inputting user instructions for starting various types of processes, such as instructing the start of reading a document, instructing the start of printing, and so forth. Key 4-242 is a stop key, for inputting user instructions for stopping a job process being executed with the present device.

The key group 4-245 is a numeric keypad consisting of numbers 0 through 9 and a clear key, for inputting the number of copies or the scaling or the like; the number of copies input with the key group 4-245 is displayed on a liquid crystal display unit 4-253. Key 4-246 is a recover key, for recovering the set mode to a standard state. Key 4-247 is a guide key, for displaying guide screens for each of the functions. Key 4-248 is a user mode key, for performing various types of settings for the device.

The liquid crystal display unit 4-250 displays, under control of the CPU circuit unit 122, the status of the device, the number of copies, the scaling, the sheets selected, and various operating screens. Touch keys are also displayed on the liquid crystal display unit 4-250.

Key 4-252 is a key on the liquid crystal display unit 4-250 for selecting the sheet feeding tier or selecting automatic sheet selection. Upon the user pressing this key, the CPU circuit unit 122 responds by controlling the operating unit 123 to display the sheet selection screen shown in FIG. 5A on the liquid crystal display unit 4-250.

Figure 5A:
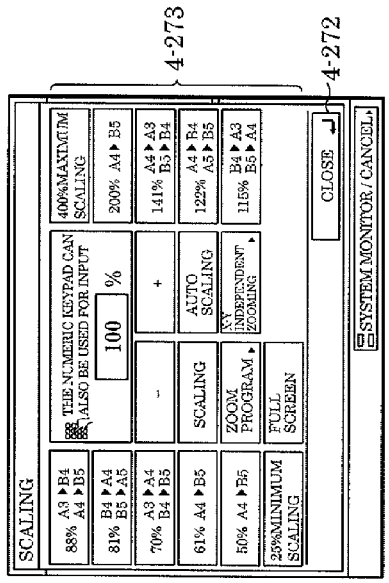
FIGS. 5A through 5D are model diagrams illustrating examples of the operating screen displayed on the liquid crystal display unit shown in FIG. 4.
Figure 5B:
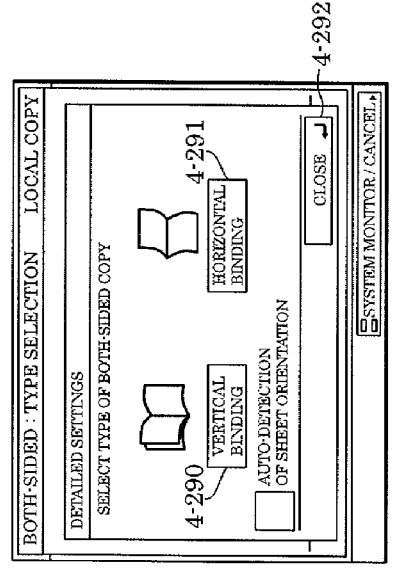

The user selects the sheet feeding tier with the key group 4-271 on the sheet selection screen shown in FIG. 5A, and presses a close key 4-270, whereupon the CPU circuit unit 122 responds by closing this screen and returning to the screen shown in FIG. 4, and then controls the operating unit 123 so as to display the selected sheet feeding tier on the display unit 4-251.

The keys 4-258 and 4-262 shown in FIG. 4 are keys for performing concentration adjustment, with the concentration being adjusted by these keys being displayed on the display unit 4-263 by the CPU circuit unit 122. The key 4-259 is a key for turning the automatic concentration adjustment function on and off, and the key 4-261 is a key for setting the mode to a photograph mode, text mode, and so forth.

The keys 4-254 and 4-255 are keys for setting same-size, reduction, and enlargement. Upon the key 4-255 being pressed, the CPU circuit unit 122 controls the operating unit 123 to display the scaling screen shown in FIG. 5B on the liquid crystal display unit 4-250, and controls the operating unit 123 so as to enable detailed settings of enlarging or reduction. Upon the magnification being selected by the key group 4-273 shown in FIG. 5B being selected and the user pressing the close key 4-272, the CPU circuit unit 122 responds by closing this screen and returning to the screen shown in FIG. 4, and displaying the set scaling on the display unit 4-251.

Figure 5C:
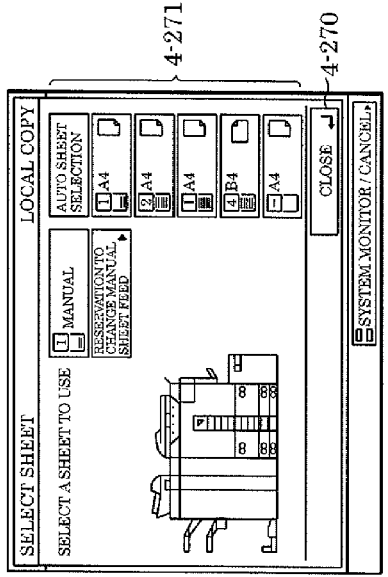

Upon the key 4-257, which is a both-face key, being pressed, the CPU circuit unit 122 effects control to display a both-side printing settings screen shown in FIG. 5C on the liquid crystal display unit 4-250. The following is a description of both-side printing, with reference to FIG. 5C. In FIG. 5C, the key 4-280 is a setting key for making settings such that single-sided documents are printed on both sides of sheets, and key 4-281 is a setting key for making settings such that both-sided documents are printed on both sides of sheets. Conversely, key 4-283 is a setting key for making settings such that both-sided documents are printed on one side of the sheets. Also, key 4-284 is a setting key for making settings such that the pages of two-page spread documents are printed on both sides of the sheets.

Key 4-285 is a key for applying the settings made by the user in the both-side printing settings screen shown in FIG. 5C. Upon this key 4-285 being pressed, the CPU circuit unit 122 applies the settings made in the both-side printing settings screen shown in FIG. 5C, and returns the display of the liquid crystal display unit 4-250 to that shown in FIG. 4. On the other hand, the key 4-282 is a key for canceling the settings made in FIG. 5C, and upon this key being pressed, the CPU circuit unit 122 cancels the settings made in the both-side printing settings screen shown in FIG. 5C, and returns the display of the liquid crystal display unit 4-250 to that shown in FIG. 4.

Figure 5D:
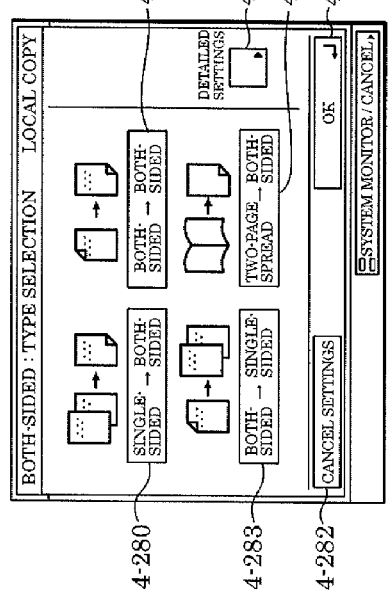

The key 4-286 is a key for enabling the user to make detailed settings, and upon this key 4-286 being pressed by the user, the CPU circuit unit 122 responds by displaying a both-side printing detailed settings screen shown in FIG. 5D on the liquid crystal display unit 4-250. Detailed settings of both-side printing will be described with reference to FIG. 5D.

In FIG. 4D, key 4-290 is a key for making settings so as to print both-side printed articles such that the pages can be bound later book-style, i.e., bound vertically, and key 4-291 is a key for making settings so as to print both-side printed articles such that the pages can be bound later calendar-style, i.e., bound horizontally. The type of both-sided printing is selected with the key 4-290 or key 4-291, and upon the close key 4-292 being pressed, the CPU circuit unit 122 closes this screen, and returns the display of the liquid crystal display unit 4-250 to that shown in FIG. 5C. Thus, settings can be made for both-side printing using the both-side printing settings screen shown in FIG. 5C and the both-side printing detailed settings screen shown in FIG. 5D.

The key 4-256 on the display screen shown in FIG. 4 is a sorter key enabling the user to input instructions to display on the display unit of the operating unit 123 a setting screen whereby the user can instruct sheet processes to be executed by the sheet processing device 230. Upon the key 4-256 being pressed by the user, the CPU circuit unit 122 responds by changing the display on the liquid crystal display unit 4-250 of the operating unit 123 to that of the sheet processing settings screen 1900 shown in FIG. 19, for example. Displaying this settings screen 1900 on the display unit 4-250 provides the user with candidates of sheet processes which can be carried out at the sheet processing device 230 (the stapling process, punching process, trimming process, case binding process, pad binding process, shifted sheet discharge process, and so forth) by the CPU circuit unit 122. The CPU circuit unit 122 enables user instructions for executing desired sheet processes to be accepted via the sheet processing settings screen 1900 shown in FIG. 19. The CPU circuit unit 122 further controls the sheet processing device 230 such that the sheets of the job from the printer unit 2 to be handled are subjected to the sheet processes corresponding to the instructions made by the user with the sheet processing settings screen.

Figure 6A:
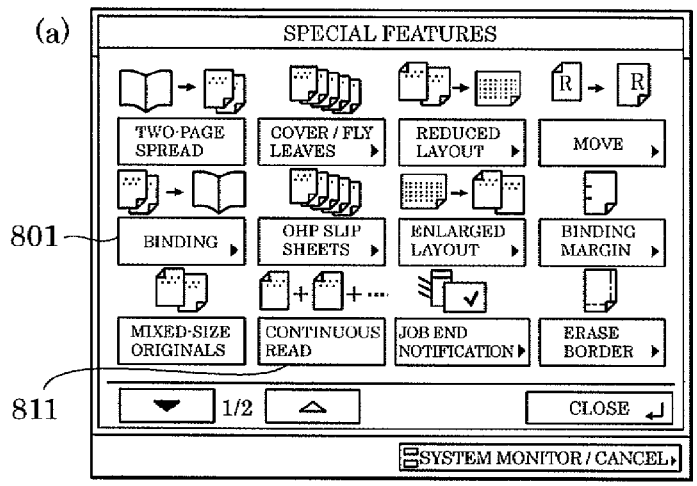
FIGS. 6A through 6C are also model diagrams illustrating examples of the operating screen (screens (a) through (c) displayed on the liquid crystal display unit shown in FIG. 4.

Also, the key 4-260 is an special features mode key, and upon the key 4-260 being pressed, the CPU circuit unit 122 responds by changing the display of the liquid crystal display unit 4-250 to the application mode settings screen shown in FIG. 6A, and effecting control enabling settings of the application modes.

The following is a description of the flow of bookbinding setting procedures with the image forming apparatus according to the present embodiment, with reference to FIGS. 6A through 7D. FIGS. 6A through 7D are a set of model diagrams illustrating examples of operating screens which the CPU circuit unit 122 displays on the liquid crystal display unit 4-250 of the operating unit 123 which is an example of a user interface, shown in FIG. 4.

FIG. 6A illustrates an application mode screen (a) which the CPU circuit unit 122 displays on the liquid crystal display unit 4-250 in response to the user pressing the key 4-260 on the operating screen shown in FIG. 4. In the screen shown in FIG. 6A, the key 801 is a display key (soft key) for setting the binding mode (including a gluing process (a glue-binding process) mode, such as case binding, pad binding, and so forth). Upon the user pressing the key 801, the CPU circuit unit 122 displays the document size selection screen shown in FIG. 6B on the liquid crystal display unit 4-250.

The screen key 811 in FIG. 6A is a continuous read key. In a state that this key 811 is pressed by the user, even in the event that the original document to be read is of a number of sheets too great to be loaded on the original document feeding device 101, the CPU circuit unit 122 controls the operating unit 123, reader unit 1, image memory 120, printer unit 2, and so forth so that extended reading can be realized wherein one stack loaded on the original document feeding device 101 is read and the next stack loaded thereupon is read as a continuation of the first stack, i.e., wherein multiple stacks can be read as a single document.

Figure 6B:
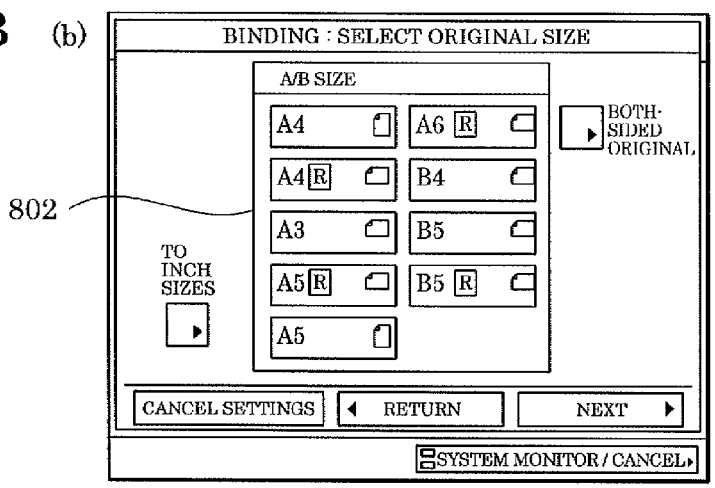

FIG. 6B illustrates an operating screen (b) for specifying the document size of the job to be processed in the aforementioned bookbinding mode. The key group 802 in the screen in FIG. 6B is document size specifying keys whereby the user can set user-specifiable document sizes for the job to be processed in the aforementioned bookbinding mode. For example, in the event that the user presses the key for the "A4" sheet size on the screen shown in FIG. 6B and then presses the "Next" key, the CPU circuit unit 122 displays the operating screen (c) shown in FIG. 6C on the liquid crystal display unit 4-250.

Figure 6C:
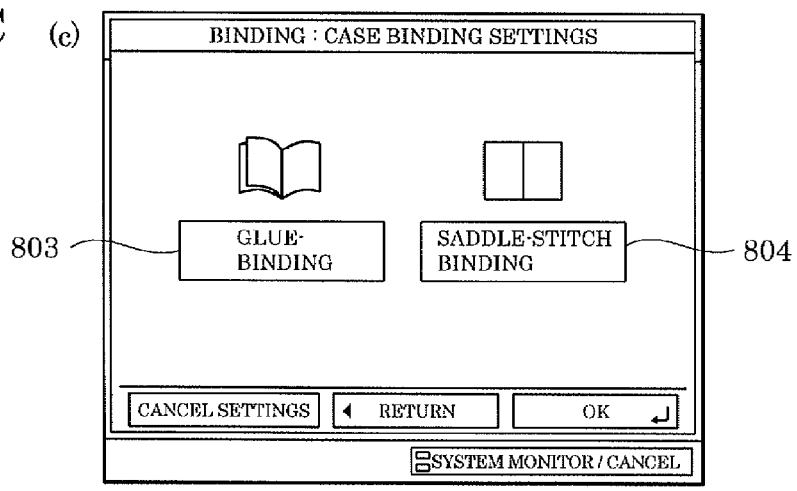

FIG. 6C illustrates the operating screen (c) for specifying the type of binding. The user can specify a glue-binding process (the later-described case binding and pad binding) by pressing a glue-binding key 803 on the settings screen, or can specify saddle-stitch bookbinding by pressing a saddle-stitch binding key 804. In response to one of the types of sheet processes having been selected from the settings screen shown in FIG. 6C, i.e., either glue-binding or saddle-stitch binding, the CPU circuit unit 122 reflects the sheet processing settings as a process condition for the job to be processed. Thus, the job process condition corresponding to instructions received from the user is used for later-described control of various types (job processing control, display control, etc.).

The CPU circuit unit 122 controls the present image forming system 1000 so as to execute various types of control based on the various types of job process conditions which the user has instructed to be set with regard to the jobs to be processed, using the operating unit 123, the liquid crystal display unit 4-250 thereof, or other user interface units. For example, the following control is performed, of which description will be made especially regarding the glue-binding process with the system 1000 of the present embodiment.

The CPU circuit unit 122 of the image forming system according to the present embodiment determines whether or not the job process condition set by the user via an interface such as described above for a job to be processed, satisfies a predetermined condition. Based on the determination results, whether or not the glue-binding process can be carried out is controlled. For example, in the event that the job to be processed is a job satisfying a predetermined condition, control is effected so as to permit execution of a gluing (pasting) process involving applying glue (paste) to the sheets of the job by the sheet processing device 230. On the other hand, in the event that the job to be processed is a job not satisfying a predetermined condition, control is effected so as to inhibit execution of a gluing process on the sheets of the job by the sheet processing device 230.

Note that there are two types of the gluing process which can be performed on the job to be processed that is fed from the printer unit 2, using the sheet processing device 230. As an example of the two types, the image forming system 1000 according to the present embodiment has two sheet gluing process modes, the case binding mode and the pad binding mode (the two gluing processes will be described later). The CPU circuit unit 122 controls the sheet processing device 230 so as to execute the one gluing process mode which the user has instructed to be selected from the above-described two gluing process modes. Thus, the image forming system according to the present embodiment has multiple types of gluing process modes, and is configured such that the gluing process can be selectively executed for each job to be processed.

Now, the following description will be made assuming the above-described configuration. With the present embodiment, the CPU circuit unit 122 and other components independently confirm, that is to say make confirmation without user intervention, whether or not a job to be processed regarding which the user has set the process condition meets the predetermined condition. The CPU circuit unit 122 and other components then independently control whether to permit or inhibit various types of a predetermined process related to (involving) a sheet gluing process, including the multiple types of gluing processes such as described above, based on the determination results above.

For example, let us say that the CPU circuit unit 122 determines that "this job to be processed satisfies a first predetermined condition". In this case, the CPU circuit unit 122 permits selective (alternative) execution of the case binding mode or the pad binding mode. That is, control is effected such that the user can freely select the desired one of the case binding mode or the pad binding mode. Conversely, the user can only select one of the two modes under this control. That is to say, the user is permitted to select the desired one, and only one, gluing process mode from the two gluing process modes, meaning that selection of both the case binding mode and the pad binding mode is inhibited.

Thus, a user who desires the case binding mode receives the properly case bound output results as desired. On the other hand, a user who desires the pad binding mode receives the properly pad bound output results as desired. This also is advantageous in that various needs of various users can be handled in a flexible manner. Moreover, these advantages can be had without various problems conceivable with the conventional art occurring with the present system 1000.

Now, let us say that the CPU circuit unit 122 determines otherwise than the above-described case. For example, let us say that the CPU circuit unit 122 determines that "this job to be processed does not satisfy the first predetermined condition, but satisfies a second predetermined condition". In this case, the CPU circuit unit 122 permits selective execution of only one of the case binding mode and the pad binding mode. That is, control is effected such that user selection of the other is altogether inhibited.

As a more specific description of this example, the CPU circuit unit 122 and other components independently effect control so as to permit the user to select the pad binding mode via the user interface unit (the term "user interface unit" as used here means the operating unit 123 in the event of processing a job from the reader unit 1, but in the event of a job from an external device such as a host computer or the like, means an operating unit of the external device). However, control is effected such that the user is not permitted to instruct selection and execution of the case binding mode via the user interface unit.

This proactively prevents erroneous operations by the user, such as the user erroneously setting the case binding mode even though the job is a job regarding which case binding is unsuitable. This also prevents beforehand any malfunctioning or trouble of the image forming system due to the user making such inappropriate settings. Moreover, this eliminates waste due to unacceptable output results, owing to the output results being different from those desired by the user.

However, even in the case of executing this control, (i.e., in the case of inhibiting the case binding mode and permitting only the pad binding mode), depending on instructions from the user regarding the job, the CPU circuit unit 122 can control the operating unit 123 and printer unit 2 and sheet processing device 230 such that printing of the job to be processed, regarding which the user actually would have preferred case binding if case binding had not been inhibited, is permitted, while execution of the case binding mode remains inhibited. Also, depending on instructions from the user regarding the job, the CPU circuit unit 122 can control the operating unit 123 and printer unit 2 and sheet processing device 230 such that the settings of the job can be switched from the case binding mode to the pad binding mode.

According to such a configuration, the image forming system can be flexibly operated even in the event that a certain amount of restrictions must be applied. Further, ease of use for the user, as well as operating efficiency, can be improved.

Now, let us say that the CPU circuit unit 122 determines otherwise than the above-described cases. For example, let us say that the CPU circuit unit 122 determines that "this job to be processed satisfies neither the first predetermined condition nor the second predetermined condition". In this case, the CPU circuit unit 122 permits selective execution neither the case binding mode nor the pad binding mode, that is, both gluing process modes are altogether inhibited.

This proactively prevents erroneous operations by the user, such as the user erroneously setting the case binding mode or pad binding mode even though the job is a job regarding which the gluing process is unsuitable. This also prevents beforehand any malfunctioning or trouble of the image forming system due to the user making such inappropriate settings. Moreover, this eliminates waste due to unacceptable output results, owing to the output results being different from those desired by the user.

However, even in the case of executing this control, (i.e., in the case of inhibiting both the case binding mode and the pad binding mode), depending on instructions from the user regarding the job, the CPU circuit unit 122 can control the operating unit 123 and printer unit 2 and sheet processing device 230 such that printing of the job to be processed, regarding which the user actually would have preferred a gluing process if the gluing process had not been inhibited, is permitted, while execution of both the case binding mode and the pad binding mode remains inhibited.

According to such a configuration, the image forming system 1000 can be flexibly operated, and further, ease of use for the user, as well as operating efficiency, can be improved even more.

As described above, the CPU circuit unit 122 determines whether or not a job to be processed satisfies a predetermined condition. The CPU circuit unit 122 uses information relating to the job to be processed (job attribute information), such as the total page number information of printing data included in the job to be processed, printing condition information which the user has set regarding the job, and so forth, in making this determination. The CPU circuit unit 122 further uses later-described management information defining various rules (e.g., management information and the like described in the management tables shown in FIGS. 18, 20, 37, 38, and so forth). Comparison and determination processing of the job attributes information and management information is then carried out.

Note that of the above three cases, the second and third cases involve a sheet process wherein the case binding mode and/or the pad binding mode are inhibited. However, the sheet processing device 230 still can execute a sheet process of a type wherein such a gluing process is not performed (e.g., stapling, punching, saddle-stitching, trimming, shifted sheet discharge, and so forth). Accordingly, with the present embodiment, the CPU circuit unit 122 effects control so as to permit selection and execution of other types of sheet processes based on the job process condition set by the user, even in the event that execution of a sheet gluing process, including the above-described two types, is inhibited.

Thus, the above-described advantages, such as usability and flexibility of the system 1000, can be further improved with such a configuration.

As examples of "determines whether or not a job to be processed satisfies a predetermined condition" in the above description, the CPU circuit unit 122 performs the following process.

First Example

The CPU circuit unit 122 executes a process for confirming whether or not the total number of sheets used in a job to be processed, regarding which an output condition has been set by the user, is greater than a first predetermined number of sheets (hereafter referred to as "first determination process"). Based on the determination results, whether or not to execute the gluing process for the sheets of the job is decided.

For example, in the event that a job to be processed is found to be a job using sheets of a number greater than the first predetermined number of sheets as a result of executing the above-describe determination processing, execution of both the case binding process and the pad binding process is inhibited. That is to say, in this case, the CPU circuit unit 122 inhibits both of the sheet gluing process modes.

Second Example

In this example, a second predetermined number of sheets is used besides the first predetermined number of sheets as a threshold value. The second predetermined number of sheets is a value smaller than the first predetermined number of sheets. Let us say here that the first predetermined number of sheets is 150 sheets, and the second predetermined number of sheets is 10 sheets, for example. With such a configuration, the CPU circuit unit 122 executes a process for confirming whether or not the total number of sheets used in a job to be processed, regarding which an output condition has been set by the user, is smaller than the second predetermined number of sheets (hereafter referred to as "second determination process"). Based on the determination results, whether or not to execute the gluing process for the sheets of the job is decided.

For example, in the event that a job to be processed is found to be a job using sheets of a number smaller than the second predetermined number of sheets (e.g., the job uses less than 10 recording sheets) with the present image forming device as a result of executing the above-described determination processing, the CPU circuit unit 122 inhibits execution of the case binding process for the job to be processed. Note that the second determination process in this Second Example is executed in the event that the user has selected the "case binding process mode" for the job to be processed. The CPU circuit unit 122 executes the control sequence illustrated in the Second Example including the above second determination process, in the event of processing a job regarding which the case binding mode has been selected.

On the other hand, in the event that the job to be processed is a job regarding which the "pad binding process mode" has been selected, the execution of the entire control sequence illustrated in the Second Example, including the above second determination process, is itself inhibited by the CPU circuit unit 122.

However, control is effected such that execution of the control sequence illustrated in the First Example including the first determination process is carried for both cases of processing of a job regarding which the case binding process mode has been selected and of a job regarding which the pad binding process mode has been selected.

Now, with the understanding of the above configuration, description will be made regarding control illustrated in the following Third Example and Fourth Example executed by the CPU circuit unit 122.

Third Example

In the event that a job to be processed is a job regarding which the case binding mode has been selected and is found to be a job using sheets of a number equal to or smaller than the first predetermined number of sheets but not a job using sheets of a number smaller than the second predetermined number of sheets (i.e., second predetermined number of sheets total number of sheets to be used for the job to be processed first predetermined number of sheets), the CPU circuit unit 122 permits execution of the case binding process for the job to be processed.

Fourth Example

In the event that a job to be processed is a job regarding which the pad binding mode has been selected and is found to be a job using sheets of a number equal to or smaller than the first predetermined number of sheets, the CPU circuit unit 122 permits execution of the pad binding process for the job to be processed, regardless of whether the total number of sheets to be used for the job to be processed is smaller than the second predetermined number of sheets.

Now, description of the First through Fourth Examples will be given in light of the earlier examples.

An example of the above "job satisfying the first predetermined condition" is "a job needing output sheets of a number equal to or smaller than the first predetermined number of sheets, and needing output sheets of a number equal to or greater than the second predetermined number of sheets". In this case, execution of the case binding mode is permitted, and further, execution of the pad binding mode is permitted, so the user is allowed to select one or the other of the two. That is to say, simultaneous selection of both types of the sheet gluing process is inhibited.

An example of the above "job not satisfying the first predetermined condition but satisfying the second predetermined condition" is "a job needing output sheets of a number equal to or smaller than the first predetermined number of sheets, and needing output sheets of a number equal to or smaller than the second predetermined number of sheets". In this case, execution of the case binding mode is inhibited, but execution of the pad binding mode is permitted.

An example of the above "job satisfying neither the first predetermined condition nor satisfying the second predetermined condition" is "a job needing output sheets of a number equal to or smaller than the first predetermined number of sheets". In this case, execution of the case binding mode is inhibited, and execution of the pad binding mode is also inhibited.

The reason why control according to the above-described relation is introduced will be described later, but it should be noted that this is a primary feature of the present image forming system.

Thus, with the image forming system 1000 according to the present embodiment, the CPU circuit unit 122 and other components independently control whether to permit or inhibit execution of a predetermined process relating to the gluing process executable by the sheet processing device 230 (in the above-described examples, whether to permit or inhibit execution of the gluing process itself), based on whether the job to be processed satisfies the predetermined condition or not.

Now, the CPU circuit unit 122 uses the following judgment material, for example, for the above-described determining process (determination process regarding whether or not the job to be processed satisfies the predetermined condition). An example is the "process condition data relating to the total number of output sheets of the job to be processed", such as described above. The CPU circuit unit 122 compares this information based on user settings, with management information in a function restriction management table, in the management table 3700 shown in FIG. 37 or in the management table 3800 shown in FIG. 38, described later.

Besides this, there is also "process condition data relating to the output sheets themselves of the job to be processed", and so forth. Examples include a process condition relating the size information of sheets to be printed, a process condition relating the sheet type information of sheets to be printed, and so forth, which the user has set for the job to be processed. The CPU circuit unit 122 compares this information based on user settings, with management information in the management table 1800 shown in FIG. 18.

Further, there is also "process condition data relating to the type of sheet process selected by the user for the job to be processed", and so forth. Examples include a process condition mode relating to the sheet process data set by the user for one or more of the multiple types of sheet processes executable by the sheet processing device 230 (e.g., the stapling process, punching process, trimming process, shifted sheet discharge process, case binding process, pad binding process, saddle-stitching process, and so forth). The CPU circuit unit 122 compares this information based on user settings, with management information in the management table 1800 shown in FIG. 20.

The CPU circuit unit 122 acquires various types of job process condition information for the job set by the user, directly relating to the job to be processed, via a user interface unit such as the operating unit 123, for example. The actions of the system 1000 are controlled based on this job attributes information corresponding to user settings, and management information and the like described in the management tables shown in FIGS. 18, 20, 37, 38, for the system 1000 to manage itself. In the case of this example, the job to be processed is a copy mode job, and accordingly, the information is received from the operating unit 123. However, the present embodiment is not restricted to this arrangement.

For example, let us say that a print job is received from a host computer connected to a network, via the connector 121. In this case, control is effected so as to process the job based on the job process condition which the user of the host computer has set, via the printer driver or the like installed in the host computer which is the data originator.

Thus, in the event that the job is an external job from an external device other than the present image forming apparatus (e.g., an external device 2002) such as shown in FIG. 2), the job process condition can be set for the print data to be processed by the user of the external device via a user interface unit of the external device (in the case of a host computer, a display, mouse, keyboard, or the like). Accordingly, in the event of processing a job received from an external device, the CPU circuit unit 122 controls the present image forming system 1000 based on the job process condition information set by the user of the external device which is associated with the print data of the received job.

Also, with the present embodiment, various types of inhibition control (exclusive control) and function restrictions are provided so as to be executable by the CPU circuit unit 122 for example, for operating the present image forming system. For example, in the event that a predetermined operating mode is selected from the multiple operating modes which the present image forming system 1000 has, selection of a separate predetermined operating mode is inhibited. Also, function restrictions are executed such that, for example, in the event that a certain function is selected, a separate function can be used in parallel within a certain restricted range.

With the present embodiment, management information data for stipulating rules for the various functions and actions of the present image forming system (management information stipulating various rules, such as shown in FIGS. 18, 20, 37, and 38, for example) is stored in suitable memory such as the image memory 120 or ROM 124 or the like, in a table format for example. The CPU circuit unit 122 also uses such management data as a judgment resource for processing jobs.

Also, the configuration is such that, in the event of processing jobs from external devices with the present system 1000, all or part of the various types of control carried out by the CPU circuit unit 122 described in the present embodiment is executed at the control unit of the external device (e.g., in the case that the external device is a host computer, the CPU of the host computer).

According to this configuration, the advantages described in the present embodiment can be had not only in cases of processing jobs from the reader unit 1 with the present system 1000, but also in cases of processing jobs from external devices with the present system 1000.

Now, the glue-binding process according to the present embodiment will be described with reference to FIG. 8, which is a model diagram describing the glue-binding process according to the present embodiment.

The sheet processing device 230, which the image forming system 1000 according to the present embodiment has, is configured so as to be capable of executing multiple types of sheet processes including the glue-binding process (the stapling process, punching process, shifted sheet discharge process, saddle-stitch binding process, trimming process, glue-binding process, and so forth). Further more, the sheet processing device 230 according to the present embodiment is configured so as to be capable of executing multiple types of glue-binding processes including at least the two types of a first type of glue-binding process and a second type of glue-binding process, these two glue-binding processes differing one from another.

For example, the image forming system 1000 according to the present embodiment is configured so as to be capable of executing a case binding process as the first type of glue-binding process, with the sheet processing device 230. In the case binding process, the present image forming system is controlled by the CPU circuit unit 122 so as to create an output article such as shown in FIG. 8A.

In processing a case binding job with the present system 1000, the following series of process actions are executed at the image forming system 1000.

For example, a series of print data of a job input from the reader unit 1, or a series of print data of a job received from an external device via the connector 121, is stored in the hard disk of the image memory 120. Also, a predetermined type of sheet specified by the user as the text sheet for the case binding of this job (hereafter referred to "type 1 sheet") is fed from one of the multiple sheet feeding units 214, 215, 225, 226, and 227, which the image forming apparatus main unit has, that has been specified by the user. Next, the printer unit 2 prints the text print data for the case binding process of the job that has been read out from the image memory 120, onto the type 1 sheet from the sheet feeding unit. In the example shown in FIG. 8A, text image data has been printed on both sides of multiple text sheets.

Further, with the case binding process, a sheet stack made up of the multiple text sheets on which the text print data has been printed (hereafter, this sheet stack will be referred to as "type 1 sheet stack") is subjected to a gluing process by a gluing unit 300. In the gluing process, the multiple text sheets (type 1 sheets) are glued to each other.

Subsequently, with the case binding process, the glued type 1 sheet stack (i.e., the sheet stack made up of the multiple text sheets on which the text image data has been printed) and a predetermined type of sheet specified by the user as the cover sheet for the case binding (hereafter referred to "type 2 sheet") are glued by the gluing unit 300 so as to yield a single output stack. The article drawn at the middle in FIG. 8A is an example of the case binding cover sheet (which is equivalent to the type 2 sheet).

Now, the present embodiment does not restrict, in any way, the manner in which the gluing process of the type 1 sheet stack (equivalent to the sheet stack upon which the text images have been printed) and the type 2 sheet (equivalent to the case binding cover sheet for covering the text sheet stack) is carried out. In any case, the image forming system 1000 is controlled such that the gluing process on sheets is executed and the output result such as shown to the right of FIG. 8A, or the printed article shown in FIGS. 25A through 29D, is ultimately obtained.

Now, with the image forming system 1000 according to the present embodiment, the type 2 sheet (equivalent to the case binding cover sheet) is fed from one of the multiple sheet feeding units 214, 215, 225, 226, and 227, which the image forming apparatus main unit has, that has been specified by the user, so as to be capable of being conveyed into the sheet processing device 230.

This type 2 sheet (equivalent to the case binding cover sheet) can also be printed with case binding cover image data at the printer unit 2. The article drawn at the middle in FIG. 8A is an example of the case binding cover sheet which has been printed with the case binding cover image data at the printer unit 2.

Of course, a sheet which has been printed with case binding cover image data beforehand may be used as the type 2 sheet (the case binding cover sheet). In this case, there is no need to carry out the printing process at the printer 2, and all that is necessary for the user to do is to set the sheet, upon which the case binding cover image data has been printed beforehand, in the sheet feeding unit. Accordingly, in this case, the printer unit 2 does not print the sheet, and the system 1000 is controlled so as to convey the type 2 sheet into the sheet processing unit 230 as it is.

Note that in the event of using a sheet upon which an image has been printed beforehand as the type 2 sheet, a special feeding device which conveys sheets into the sheet processing device 230 without passing through the printer unit 2 (in the present embodiment, such a feeding device will be referred to as an "inserter") may be provided. The present image forming system may be configured such that, in the event that the type 2 sheet is a pre-printed sheet, the sheet can be fed from the inserter.

Also, with the present embodiment, the CPU circuit unit 122 controls the display unit 4-250 so as to display an operating screen for enabling the user to decide whether or not to print cover image data on the type 2 sheet in the case binding process. The user can thus select whether or not to print on the type 2 sheet in the case binding mode.

Now, the relation between the type 1 sheets and the type 2 sheet in the case binding process according to the present embodiment will be described. In the present embodiment, the type 1 sheets and the type 2 sheet are of different types of sheets, and further, the sizes of the sheets are also diffident. Or, the type 1 sheets and the type 2 sheet may be of the same sheet type but of a different size. That is to say, in the case binding process described in detail in the present embodiment, the type 1 sheets and the type 2 sheet imply that at least the sizes thereof differ. Particularly, with the present embodiment the type 2 sheet is of a larger size than the type 1 sheet.

The gluing process of the type 1 sheet stack and the type 2 sheet is carried out as follows. For example, a single type 2 sheet upon which case binding cover image data has been printed is glued to a type 1 sheet stack upon which text image data has been printed and which has been glued at the spine portion, such that the type 2 sheet covers the type 1 sheet stack with the center of the type 2 sheet being positioned at the spine portion of the type 1 sheet stack. Finally, a process is executed to fold the type 2 sheet on the spine portion. An example of the product thereof is the output result such as shown to the right of FIG. 8A, or the printed article shown in FIGS. 25A through 29D. Thus, the image forming system 1000 according to the present embodiment is configured so as to be capable of executing the case binding process as the first type sheet gluing process, with the sheet processing device 230.

Next, a second type sheet gluing processing, which is a sheet gluing process of a type different from that of the first sheet gluing process, which can be carried out with the present image forming system, will be described.

For example, the image forming system 1000 according to the present embodiment is configured so as to be capable of executing a pad binding process as the second type of gluebinding process. In the pad binding process, the present image forming system 1000 is controlled by the CPU circuit unit 122 so as to execute the following series of process actions, for example.

First, a series of print data of a job input from the reader unit 1, or a series of print data of a job received from an external device via the connector 121, is stored in the hard disk of the image memory 120. Also, a predetermined type of sheet specified by the user as the text sheet for the case binding of this job (equivalent to the type 1 sheet) is fed from one of the multiple sheet feeding units 214, 215, 225, 226, and 227, which the image forming apparatus main unit has, that has been specified by the user. Next, the printer unit 2 prints the text print data for the pad binding process of the job that has been read out from the image memory 120, onto the type 1 sheet from the sheet feeding unit. In the example shown in FIG. 8B, text image data has been printed on both sides of multiple text sheets. Further, with the pad binding process, a sheet stack made up of the multiple text sheets on which the text print data has been printed (equivalent to the type 1 sheet stack) is subjected to a gluing process by a gluing unit 300.

Now, the actions so far are the same as those with the above-described case binding process. However, in the case of executing the pad binding process, the CPU circuit unit 122 for example controls the present system 1000 so as to inhibit the following process which is executed with the above-described case binding process.

For example, using a coversheet (equivalent to a type 2 sheet) is inhibited with pad binding. Specifically, in the pad binding process mode, control is effected so as to inhibit the type 2 sheet from being glued to the type 1 sheet stack upon which the text image data has been printed. Moreover, in the pad binding process mode, feeding the type 2 sheet which is to be used for case binding mode, from one of the sheet feeding units 214, 215, 225, 226, and 227, is in itself inhibited in the case binding mode. Of course, the printing process on the type 2 sheet is also inhibited in the pad binding mode.

The article drawn to the right in FIG. 8B illustrates an example of the product created by the pad binding process. The gluing method differs between the pad binding process and the above-described case binding process.

For example, both pad binding and case binding are the same in that a type 1 sheet stack (equivalent to a sheet stack of multiple sheets upon which the text image data has been printed) is glued together. However, in the pad binding process mode, execution of the gluing process of the type 2 sheet executed in the case binding process mode (see FIG. 8A) is inhibited. In the pad binding process, the sheet processing device 230 and the printer unit 2 and the like are controlled by the CPU circuit unit 122 such that the gluing process is completed at the point of gluing the text sheet stack, as shown in FIG. 8B. In this way, the present image forming system is configured such that the sheet processing device 230 can execute a pad binding process, which is a second type of gluing process different from the first type of gluing process.

Now, with the above-described configuration as a presumption, the image forming system 1000 according to the presents embodiment is configured such that the user can select a desired gluing process mode from the case binding process mode and the pad binding process mode, via the user interface unit (in the case of the present embodiment, the display unit 4-250, the operating unit 123, and so forth). The CPU circuit unit 122 controls the image forming system so as to execute the gluing process corresponding to the process mode which the user has selected from the above two types of gluing process modes.

Next, the processes involved in "case binding", which is equivalent to the gluing process mode wherein a cover is attached, as described with reference to FIG. 8A, will be described in further detail by way of examples.

In this case, let us say that the data for the job to be subjected to the case binding process originates at the reader unit 1 of the apparatus itself. The series of procedures in the case of performing printing processing of the originals set in the reader unit 1, and subjecting the sheets printed by the printing process to the case binding process by the sheet processing device 230, will be described.

First, upon the user pressing the special features mode key 4-260 on the screen in FIG. 4 displayed on the display unit 4-250 of the operating unit 123, the CPU circuit unit 122 displays the screen (a) shown in FIG. 6A on the display unit 4-250. Next, let us say that the user selects the "Binding" mode by pressing the corresponding key 801 on the screen shown in FIG. 6A. The CPU circuit unit 122 responds by displaying the screen (b) shown in FIG. 6B on the display unit 4-250, and upon the user making suitable selections and then pressing the "Next" key, the CPU circuit unit 122 displays the screen (c) shown in FIG. 6C on the display unit 4-250. Let us further say that the user inputs instructions for "Glue-binding" by pressing the key 803 in the screen (c), and making "Cover settings" through the later-described screen (f) in FIG. 7C.

Now, in such a case wherein the glue-binding mode has been selected by the user, in the event that the user instructs settings for attaching a cover to the sheets upon which the text image data has been printed, the CPU circuit unit 122 determines that the job to be processed in accordance with the user settings is a "job to be case-bound". That is to say, in this example, under the condition that the glue-binding mode is selected by the user, and that in this mode an "Attach cover" setting has been selected by the user, the CPU circuit unit 122 determines that the job is a job regarding which the case binding process mode should be executed.

Let us say that setting of each of the printing process conditions for the job to be processed as described above has been completed, and that further, the user has then pressed the start key 4-242 on the operating unit 123 shown in FIG. 4. The CPU circuit unit 122 at this point determines that there has been input of a job process start request. Based on the instructions from the user, the document stack already loaded on the original document feeding device 101 of the reader unit 1 is fed to the reading position on the platen glass of the reader unit 1, one sheet at a time, in order from the first sheet, and the CPU circuit unit 122 controls the reader unit 1 so as to execute the reading process of the originals of the job. Further, the CPU circuit unit 122 controls the image memory 120 and so forth so as to sequentially store this read data as text image data for the case binding process in the hard disk of the image memory 120.

The results of printing the stored data is equivalent to the both-sided text printing for example, like the sheets shown in FIG. 8A, which are a product of both-sided printing. However, it should be noted that both-sided printing is not a prerequisite for the case binding process. There are a wide range of user needs, and while many users might want to have the text portion of the product to be printed on both sides, there will also be users who want the text portion of the product to be printed on just one side of the sheets. Accordingly, an arrangement may be made wherein, with the present system 1000, the user himself/herself can select whether to print the sheets (equivalent to type 1 sheets), upon which the text image data is to be printed, on one side or on both sides, when performing case binding, using the key 4-258 shown in FIG. 4.

Also, the cover sheet (equivalent to the type 2 sheet) for the case binding process is set to the manual feed unit 227 of the image forming apparatus, for example, by the user, in the case of the present embodiment. Now, at the time of the user selecting the cover sheet from the display unit 4-250 so as to select the type 2 sheet, selection of the sheet feeding unit corresponding to the manual feed unit 227 is enabled. This allows the user to feed the type 2 sheet from the manual feed unit.

Also, the case binding cover image data is printed on the cover sheet for the case binding process, either using the present image forming apparatus or another printing device, beforehand. The sheet, upon which the cover image has already been printed, is set in the sheet feeding unit of the image forming apparatus by the user, before the job to be subjected to the case binding process with the image forming system is processed. Further, the user sets the process condition to use this sheet, from the operating unit 123. Accordingly, there is no need to perform the printing process on the case binding cover sheet at the time of processing the case biding process job.

Now, in the event of using an already-printed sheet as the type 2 sheet, an arrangement may be made wherein the type 2 sheet is fed from an inserter, in the event that the system 1000 has such an inserter as described above. In this case, the CPU circuit unit 122 effects control such that a display screen enabling selection of the inserter as the sheet feeding unit for the type 2 sheet is displayed on the display unit 4-250. Thus, the user can use the display unit 4-250 to select the inserter as the sheet feeding unit for the type 2 sheet.

As described above, in the event that the cover image data has already been printed on the type 2 sheet, all pages of the read image data of the job regarding which the reading action has been executed by the reader unit 1 is taken as original image data for the text.

On the other hand, in the event that there is the need to print the cover image data on the cover for case binding in the series of processes of the job to be carried out in the case binding process, the CPU circuit unit 122 causes the image forming apparatus to carry out the following process.

Let us say that the case binding mode has been selected by the user using the operating unit 123, and also that instructions have been input to print a cover image on a sheet, equivalent to the type 2 sheet to serve as the cover. In this case, the CPU circuit unit 122 stores, in the hard disk of the image memory 120, the original image of the first page in the original stack of multiple pages to be read by the reader unit 1 as the cover original image. Subsequent original image data of the following pages (the second and the following pages, for example) is sequentially stored in the hard disk as text original image data, in correlation with the aforementioned cover image data.

Also, an arrangement may be made for a case binding process job wherein an front cover image is printed on the portion of the case binding cover sheet (equivalent to type 2 sheet) to serve as the front cover, and also, a back cover image data is printed on the portion of this sheet to serve as the back cover. In order to handle such user demands, the CPU circuit unit 122 may execute the following control.

One example is to display to the user a display screen on the display unit 4-250 having a display key which enables the user to make instructions to the effect of "print both the front cover image and back cover image on the case binding cover sheet" at the time of the user performing settings at the display unit 4-250. In response to the above instruction being input via this screen, the CPU circuit unit 122 controls the printer unit 2 so as to execute this processing.

In the event that such settings have been made, the image data equivalent to the first page in the original stack of multiple pages read by the reader unit 1 is stored in the hard disk of the image memory 120 as the front cover original image. Further, the image data equivalent to the second page in the original stack of multiple pages read by the reader unit 1 is stored in the hard disk of the image memory 120 as the back cover original image. Subsequent original image data of the following pages is sequentially stored in the hard disk as text original image data, in correlation with the aforementioned cover image data.

Now, in the event that the case binding mode has been selected, and an original stack of 10 pages for example is to be read consecutively with the reader unit 1, an arrangement may be made wherein the original image data for the rear cover is registered at the end of the original stack. Specifically, the first read original is registered in the image memory 120 as the front cover image data to be printed on the type 2 sheet (equivalent to the cover sheet). Next, the originals read as No. 2 through No. 9 are registered in the image memory 120 as the first through eight pages of text image data to be printed on the type 1 sheets (equivalent to text sheets). Finally, the last (tenth) original read is registered in the image memory 120 as the back cover image data to be printed on a type 1 sheet. The CPU circuit unit 122 manages the image data in a correlated manner. That is to say, with this arrangement, the image data to be processed is registered in the image memory 120 in the same page order as that of the case-bound printed article obtained after the entire printing and case binding process has been completed.

However, it should be understood that while the above control example may be employed for the purpose of improving ease of use, the present embodiment is by no means restricted to this arrangement. Any configuration may be employed as long as the following control can be carried out with the image forming system 1000.

For example, the CPU circuit unit 122 controls the reader unit 1, image memory unit 120, printer unit 2, and so forth, such that, of the series of image data made up of multiple pages to be processed, the original image data equivalent to the front cover data and the original image data equivalent to the back cover data are printed on the same face of a type 2 sheet (equivalent to the cover sheet for the case binding process), and of the series of image data made up of multiple pages to be processed, the multiple pages of original image data equivalent to the text data is printed on multiple type 1 sheets (equivalent to the text sheets for the case binding process), thereby printing the print data which the user desires to be printed as a cover image for case binding on the case binding cover sheet, and printing the print data which the user desires to be printed as text image for case binding on the text sheets.

As long as such a configuration can be realized, the order of reading original documents at the reader unit 1, the order of storing the original image data to the image memory 120, the order of reading out the original image data from the image memory 120, the order of printing original image data at the printer unit 2, and so forth, does not matter, i.e., the sequences of the various actions are not an issue. This holds true for print data for case-binding jobs received from an external device (e.g., that denoted by reference numeral 2002 in FIG. 2).

Also, further application of the above control in the present embodiment may be made to further improve the advantages of handling various demands of various users with regard to the gluing process with devices or system capable of gluing sheets, as with the present image forming system 1000. For example, the CPU circuit unit 122 of the present image forming system may control the image forming system 1000 so as to execute the following control.

For example, in the event that the case binding mode is selected by the user at the display unit 4-250, the display screen (f) shown in FIG. 7C is displayed on the display unit 4-250. With this arrangement, the user can select, from the display screen having the various types of display keys shown in FIG. 7C, whether or not first predetermined print data different from text print data for a case-bound printed article (referred to as "outer image data for case-bound article" in the present embodiment) is to be printed on the sheet space of the case-bound printed article (see the case-bound printed product 2400 in the example in FIGS. 24A through 24D) corresponding to the outer side of the front cover (i.e., the portion corresponding to 2401 in FIG. 24A), for processing a case-binding process job.

Figure 24B:
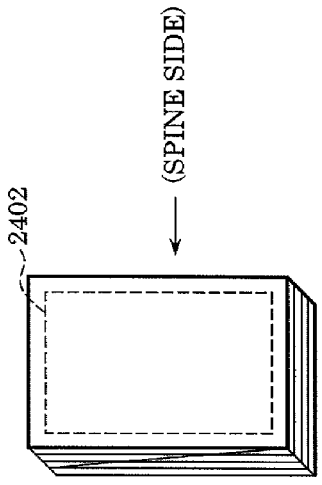
FIGS. 24A through 24D are explanatory diagrams relating to case binding as an example of a sheet gluing process, which is to be controlled with the embodiment.
Figure 24D:
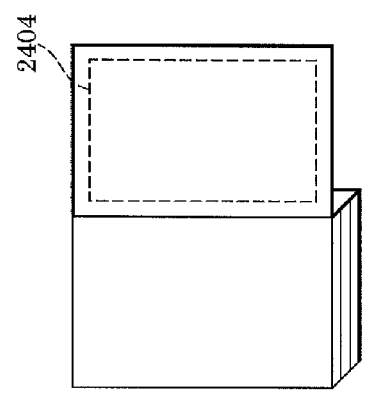
Figure 24A:
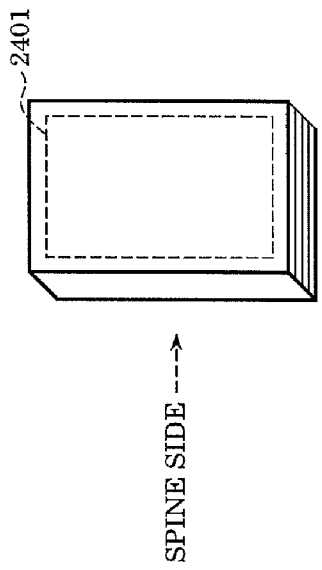

For example, in the event that the user presses the "Copy" key for the selection "Outer side of front cover" shown in FIG. 7C, the cover image data of the case-bound printed article is printed by the printer unit 2 on the sheet space of the case-bound printed article corresponding to the outer side of the front cover (i.e., the portion corresponding to 2401 in FIG. 24A; note that here, "cover" is described based on the results of having executing case-binding printing). On the other hand, in the event that the user presses the "No copy" key for the selection "Outer side of front cover" shown in FIG. 7C, printing of the first predetermined print data by the printer unit 2 on the sheet space of the case-bound printed article corresponding to the outer side of the front cover is inhibited. Thus, the present system 1000 enables first special printing processing in the case binding mode.

Further, with the present embodiment, the user can select, from the display screen having the various types of display keys shown in FIG. 7C, whether or not second predetermined print data, also different from text print data for the case-bound printed article (referred to as "inner image data for cover for case-bound article" in the present embodiment) is to be printed on the sheet space of the case-bound printed article corresponding to the page immediately following the user opening just the front cover from the front cover side with the case-bound printed article in an erected state (i.e., the portion corresponding to 2403 in FIG. 24C), for processing a case-binding process job.

Figure 24C:
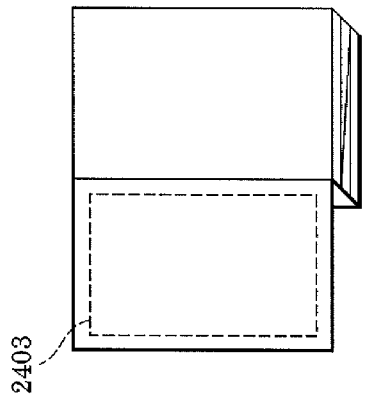
Figure 25B:
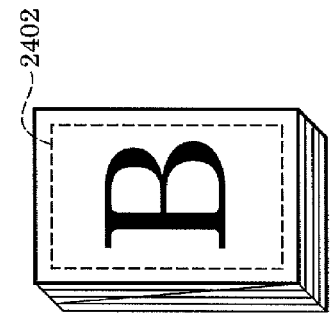
FIGS. 25A through 25D are explanatory diagrams relating to case binding as another example of a sheet gluing process, which is to be controlled with the embodiment.
Figure 25D:
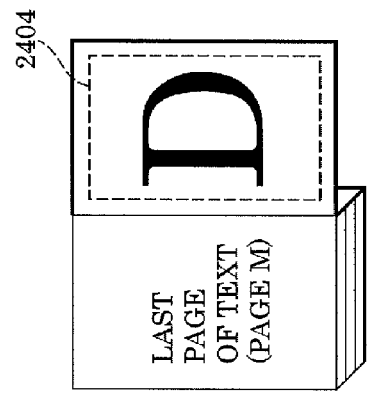
Figure 25A:
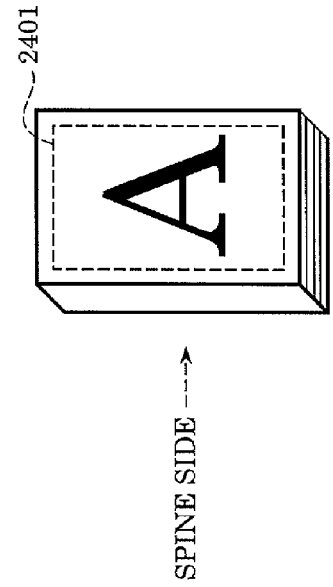
Figure 25C:
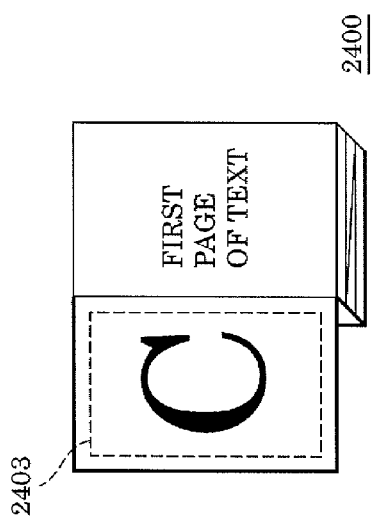
Figure 26A:
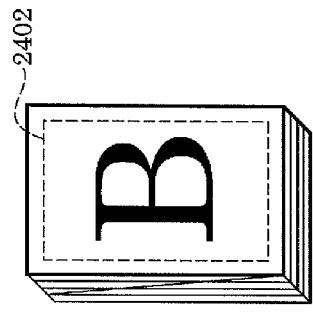
FIGS. 26A through 26D are explanatory diagrams relating to case binding as an example of a sheet gluing process, which is to be controlled with the embodiment.
Figure 26B:
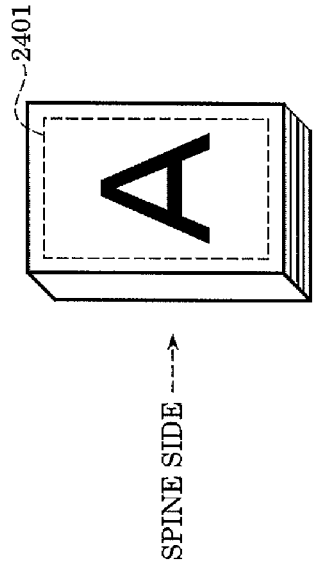
Figure 26C:
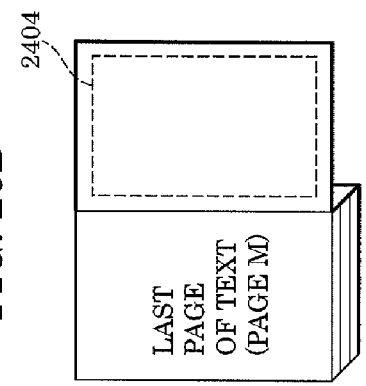
Figure 26D:
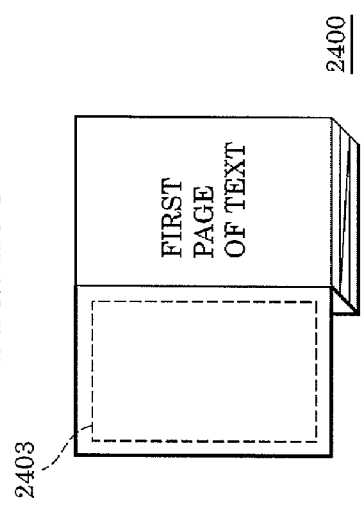
Figure 27A:
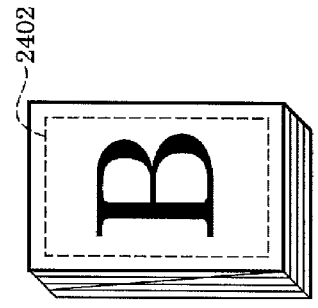
FIGS. 27A through 27D are explanatory diagrams relating to case binding as an example of a sheet gluing process, which is to be controlled with the embodiment.
Figure 27B:
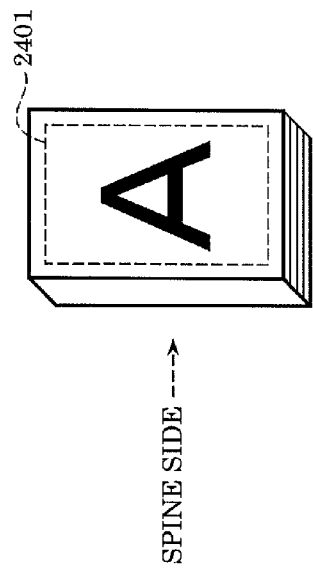
Figure 27C:
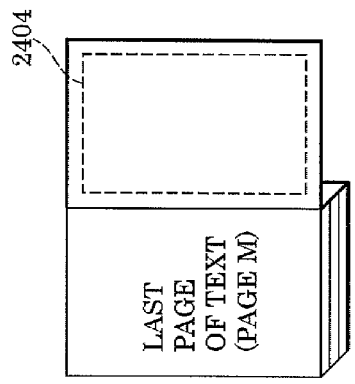
Figure 27D:
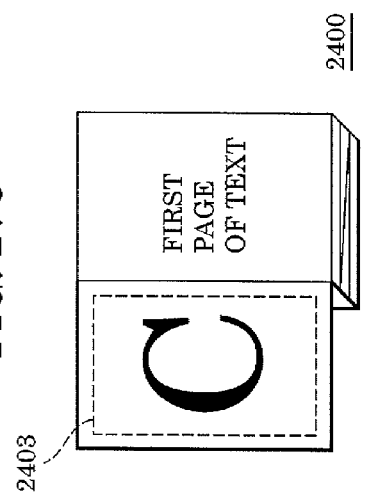
Figure 28A:
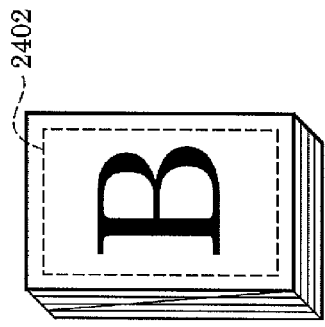
FIGS. 28A through 28D are explanatory diagrams relating to case binding as an example of a sheet gluing process, which is to be controlled with the embodiment.
Figure 28B:
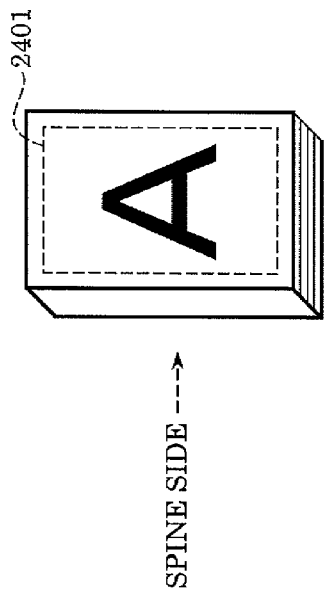
Figure 28C:
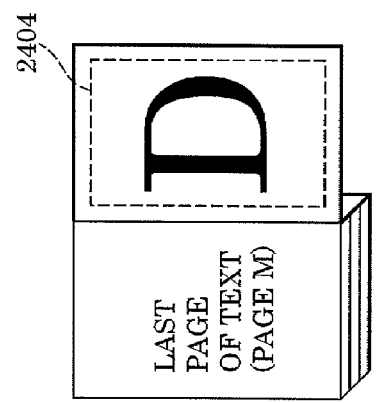
Figure 28D:
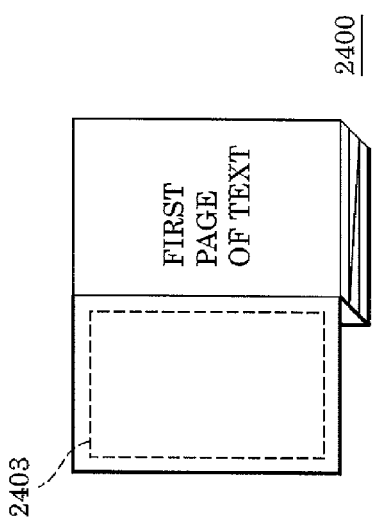
Figure 29A:
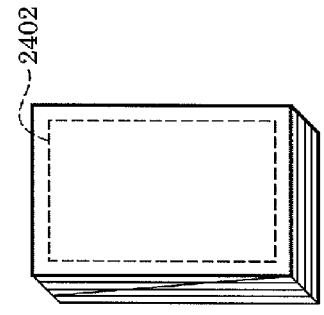
FIGS. 29A through 29D are explanatory diagrams relating to case binding as an example of a sheet gluing process, which is to be controlled with the embodiment.
Figure 29B:
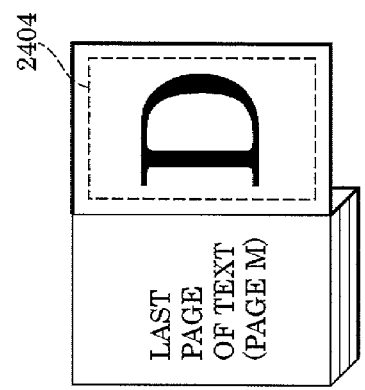
Figure 29C:
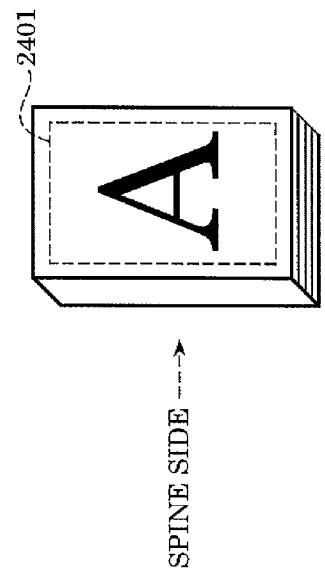
Figure 29D:
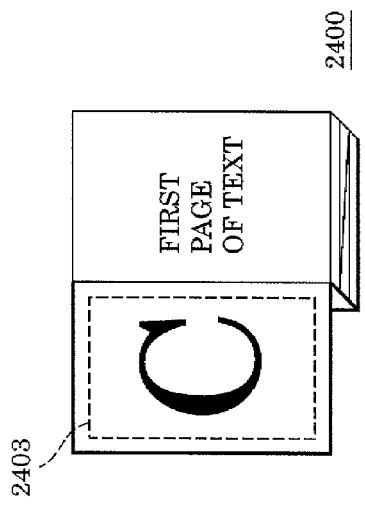

For example, in the event that the user presses the "Copy" key for the selection "Inner side of front cover" shown in FIG. 7C, the cover back image data of the case-bound printed article is printed by the printer unit 2 on the sheet space of the case-bound printed article corresponding to the page immediately following the user opening just the front cover from the front cover side with the case-bound printed article in an erected state (i.e., the portion corresponding to 2403 in FIG. 24C). On the other hand, in the event that the user presses the "No copy" key for the selection "Inner side of front cover" shown in FIG. 7C, printing of the second predetermined print data by the printer unit 2 on the page immediately following the user opening just the front cover of the case-bound printed article is inhibited. Thus, the present system 1000 enables second special printing processing in the case binding mode.

Further, with the present embodiment, the user can select, from the display screen having the various types of display keys shown in FIG. 7C, whether or not third predetermined print data, also different from text print data for the case-bound printed article (referred to as "inner image data for back cover for case-bound article" in the present embodiment) is to be printed on the sheet space of the case-bound printed article corresponding to the page immediately following the user opening just the back cover from the back cover side with the case-bound printed article in an erected state (i.e., the portion corresponding to 2404 in FIG. 24D), for processing a case-binding process job.

For example, in the event that the user presses the "Copy" key for the selection "Inner side of back cover" shown in FIG. 7C, the cover back image data of the case-bound printed article is printed by the printer unit 2 on the sheet space of the case-bound printed article corresponding to the page immediately following the user opening just the back cover from the back cover side with the case-bound printed article in an erected state (i.e., the portion corresponding to 2404 in FIG. 24D). On the other hand, in the event that the user presses the "No copy" key for the selection "Inner side of back cover" shown in FIG. 7C, printing of the third predetermined print data by the printer unit 2 on the page immediately following the user opening just the back cover of the case-bound printed article is inhibited. Thus, the present system 1000 enables third special printing processing in the case binding mode.

Further, the user can select, from the display screen having the various types of display keys shown in FIG. 7C, whether or not fourth predetermined print data, also different from text print data for a case-bound printed article (referred to as "outer image data for case-bound article" in the present embodiment) is to be printed on the sheet space of the case-bound printed article (see the case-bound printed product 2400 in the example in FIGS. 24A through 24D) corresponding to the outer side of the back cover (i.e., the portion corresponding to 2402 in FIG. 24B), for processing a case-binding process job.

For example, in the event that the user presses the "Copy" key for the selection "Outer side of back cover" shown in FIG. 7C, the back cover image data of the case-bound printed article is printed by the printer unit 2 on the sheet space of the case-bound printed article corresponding to the outer side of the back cover (i.e., the portion corresponding to 2402 in FIG. 24B). On the other hand, in the event that the user presses the "No copy" key for the selection "Outer side of back cover" shown in FIG. 7C, printing of the fourth predetermined print data by the printer unit 2 on the sheet space of the case-bound printed article corresponding to the outer side of the back cover is inhibited. Thus, the present system 1000 enables fourth special printing processing in the case binding mode.

As described above, processing of a job set by the user in the case-binding mode with the image forming system 1000 is not limited to simply executing a printing process of text image data on text sheets (type 1 sheets) with the printer unit 2. This processing of printing text print data on text sheets (type 1 sheets) will be referred to as a "first print mode in the case binding mode" (or "first print sequence in the case binding mode"). Not only does the image forming system 1000 according to the present embodiment execute the first print mode in the case binding mode for jobs to be subjected to the case-binding process; the CPU circuit unit 122 controls the image forming system so as to be capable of executing, along with the above mode, a series of printing processes including at least a printing process of predetermined print data, not handled as text image data by the user, onto a case binding sheet (the above-described example has four special print sequences). This printing process for predetermined print data which is not text print data will be referred to as a "second print mode in the case binding mode" (or "second print sequence in the case binding mode").

Moreover, the configuration is such that control is effected by the CPU circuit unit 122 to display a screen such as the display screen shown in FIG. 7C on the user interface, so that the user who has selected the case binding mode can select whether to execute both the first print sequence and the second print sequence in the case binding mode, or only to execute the first print sequence.

Using the first print sequence and the second print sequence allows a wide variety of case-bound articles, of various types and various layouts, such as product catalogues, brochures, and manuals, in-house training programs with a considerable number of pages, public organization guide-books, and so forth, to be created with this image forming system. Now, four examples of case binding printing which can be executed with the image forming system 1000 will be described with reference to FIGS. 25A through 33B.

Now, it will be recalled that the above description included four types of predetermined data other than the text print data in the case binding mode. In the following description, with reference to FIGS. 25A through 33B, these four types of print data will be referred to as follows: the first predetermined print data will be referred to as image A; the second predetermined print data referred to as image C; the third predetermined print data as image D; and the fourth predetermined print data as image B. In this example, there are M pages of text print data for the case binding mode.

Also, the first through fourth predetermine print data images A through D, and the text print data (the print data for page No. 1 through page No. M), are input from either the reader unit 1 or the external device 2002. These sets of data are correlated as a single job, and stored in the hard disk of the image memory 120. Let us say that the user for example has made the following settings as settings for a job to be processed, with an arrangement such as described above.

First, the user has pressed the "Copy" key for the "Outer side of front cover" on the setting screen (f) shown in FIG. 7C, thereby inputting instructions to execute the above-described first special printing process so as to print the image A on the region 2401 of the type 2 sheet in the case binding mode.

Also, the user has pressed the "Copy" key for the "Inner side of front cover" on the setting screen (f) shown in FIG. 7C, thereby inputting instructions to execute the above-described second special printing process so as to print the image C on the region 2403 of the type 2 sheet in the case binding mode.

Further, the user has pressed the "Copy" key for the "Inner side of back cover" on the setting screen (f) shown in FIG. 7C, thereby inputting instructions to execute the above-described third special printing process so as to print the image D on the region 2404 of the type 2 sheet in the case binding mode.

Moreover, the user has pressed the "Copy" key for the "Outer side of back cover" on the setting screen (f) shown in FIG. 7C, thereby inputting instructions to execute the above-described fourth special printing process so as to print the image B on the region 2402 of the type 2 sheet in the case binding mode.

In response to this series of printing settings for the case binding mode having been made by the user at the operating unit 123, the CPU circuit unit 122 causes the image forming system 1000 to process the case-binding print job, so as to create the case-bound product 2400 such as shown in FIGS. 25A through 25D. Note that the case-bound product 2400 shown in FIGS. 25A through 25D should be referred to in the same manner as with the case-bound product 2400 shown in the above FIGS. 24A through 24D.

Now, in order to yield the case-bound product 2400 shown in FIGS. 25A through 25D, the CPU circuit unit 122 causes the printer unit 2 to execute the following two types of printing processes as case-binding printing processes, in the case binding mode.

First, as the first print sequence for the case-binding print job, the printer unit 2 is controlled so as to print the text print data included on the data of the job to be subjected to the case-binding printing process which is stored in the hard disk of the image memory 120, to the type 1 sheet. This printing action is repeated as many times as the number of text pages. In the case of this example, the print process is executed for a total of M pages.

In addition to executing the above first print sequence, the CPU circuit unit 122 controls the printer unit 2 to print the four predetermined data sets of the above-described image A, image B, image C, and image D, stored in the hard disk of the image memory 120 in a manner correlated with the text print data of the case-binding print job to the regions 2401 through 2404 on the type 2 sheet, as the second print sequence of the case-binding print job.

To create the case-bound product 2400 shown in FIGS. 25A through 25D, the CPU circuit unit 122 executes the following printing process in the series of printing procedures for printing onto the type 2 sheet.

Figure 30A:
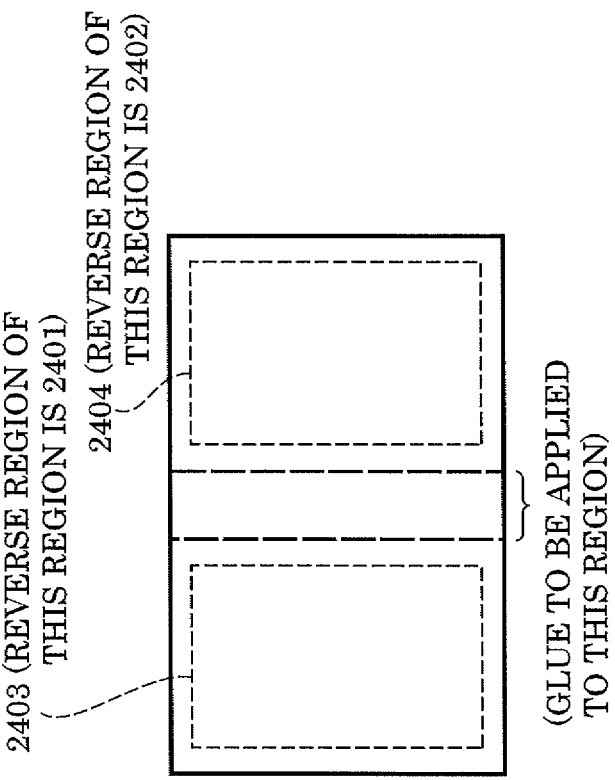
FIGS. 30A and 30B are explanatory diagrams relating to case binding as another example of a sheet gluing process, which is to be controlled with the embodiment.
Figure 30B:
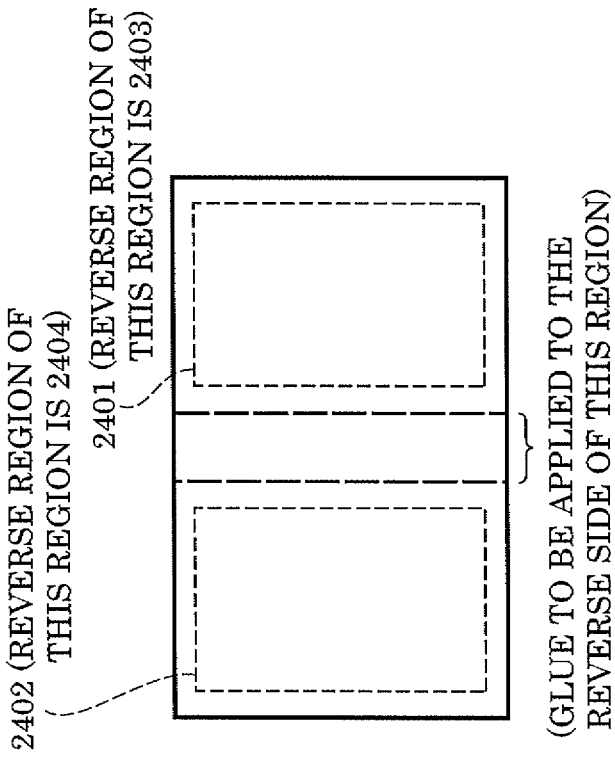
Figure 31B:
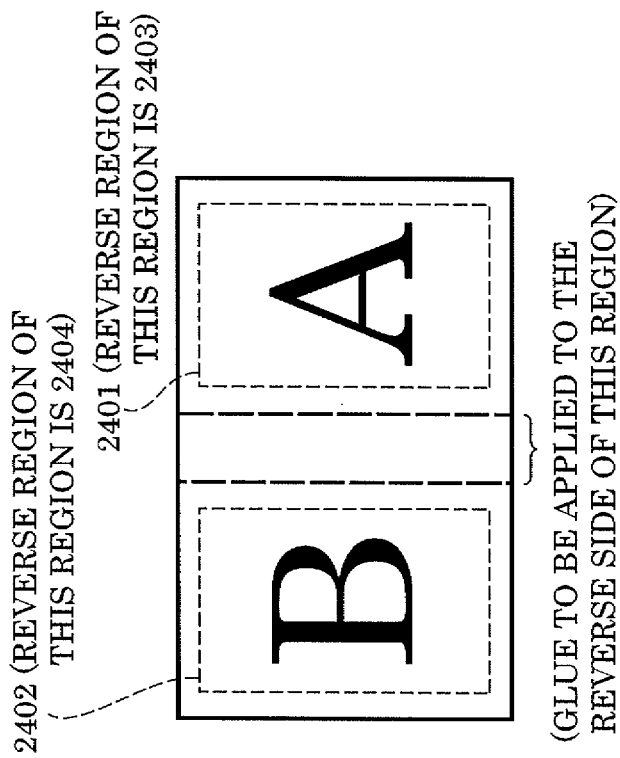
FIGS. 31A and 31B are explanatory diagrams relating to case binding as another example of a sheet gluing process, which is to be controlled with the embodiment.
Figure 31A:
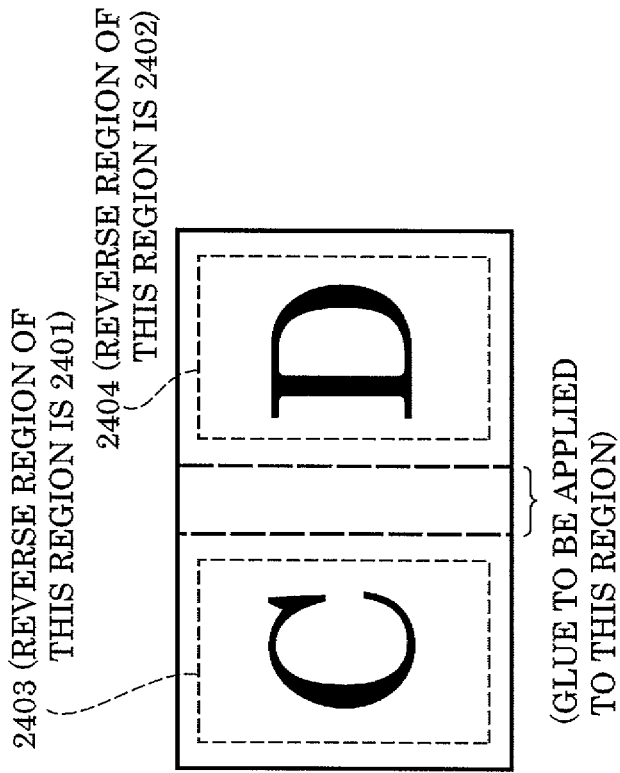

The type 2 sheet before being glued to the type 1 sheet stack upon which text print data has been printed, is in a state prior to being folded over, as shown in FIGS. 30A and 30B. Then, to obtain the printing results such as shown in FIGS. 25A through 25D, the CPU circuit unit 122 causes the printer unit 2 to execute a printing process such as shown in FIGS. 31A and 31B.

That is to say, the printer unit 2 executes a printing process on the first face of the type 2 sheet, such that the image A is disposed at the region 2401 of the first face of the type 2 sheet, and such that the image B is disposed at the region 2402 of the first face of the type 2 sheet. Note that the CPU circuit unit 122 uses memory which is usable for an image editing process to perform a layout process such that the image A and image B form data for the one face of the one sheet, following which this image data wherein image A and image B form data for the one face of the one sheet is printed on the first face of the type 2 sheet by the printer unit 2.

Further, the printer unit 2 executes a printing process on the second face of the type 2 sheet, such that the image C is disposed at the region 2403 of the second face of the type 2 sheet, and such that the image D is disposed at the region 2404 of the second face of the type 2 sheet. Note that the CPU circuit unit 122 uses memory usable for an image editing process to perform a layout process such that the image C and image D form data for the one face of the one sheet, following which this image data wherein image C and image D form data for the one face of the one sheet is printed on the second face of the type 2 sheet by the printer unit 2.

After the series of printing processes on the type 2 sheet, the printed type 2 sheet is glued to the type 1 sheet stack made up of the multiple type 1 sheets upon which the text print data (the M pages total of print data) has been printed, by a gluing process using the gluing unit 300. This completes creating of the case-bound product 2400 shown in FIGS. 25A through 25D using the present system 1000.

Next, a second example will be described. Let us say that the user for example has made the following settings on the setting screen (f) shown in FIG. 7C.

First, the user has pressed the "Copy" key for the "Outer side of front cover" on the setting screen (f) shown in FIG. 7C, thereby inputting instructions to execute the above-described first special printing process so as to print the image A on the region 2401 of the type 2 sheet in the case binding mode.

Also, the user has not pressed the "Copy" key for the "Inner side of front cover" on the setting screen (f) shown in FIG. 7C, but rather pressed the "No copy" key for the "Inner side of front cover", thereby inputting instructions to inhibit the above-described second special printing process so as to not print the image C on the region 2403 of the type 2 sheet in the case binding mode.

Further, the user has not pressed the "Copy" key for the "Inner side of back cover" on the setting screen (f) shown in FIG. 7C, but rather pressed the "No copy" key for the "Inner side of back cover", thereby inputting instructions to inhibit the above-described third special printing process so as to not print the image D on the region 2404 of the type 2 sheet in the case binding mode.

Moreover, the user has pressed the "Copy" key for the "Outer side of back cover" on the setting screen (f) shown in FIG. 7C, thereby inputting instructions to execute the above-described fourth special printing process so as to print the image B on the region 2402 of the type 2 sheet in the case binding mode.

In response to this series of printing settings for the case binding mode having been made by the user at the operating unit 123, the CPU circuit unit 122 causes the image forming system 1000 to process the case-binding print job, so as to create the case-bound product 2400 such as shown in FIGS. 26A through 26D. Note that the case-bound product 2400 shown in FIGS. 26A through 26D should be referred to in the same manner as with the case-bound product 2400 shown in the above FIGS. 24A through 24D.

Now, in order to yield the case-bound product 2400 shown in FIGS. 26A through 26D, the CPU circuit unit 122 causes the printer unit 2 to execute the following two types of printing processes as case-binding printing processes, in the case binding mode.

First, as the first print sequence for the case-binding print job, the printer unit 2 is controlled so as to print the text print data included on the data of the job to be subjected to the case-binding printing process in the hard disk of the image memory 120, to the type 1 sheet. This printing action is repeated as many times as the number of text pages. In the case of this example, the print process is executed for a total of M pages.

In addition to executing the above first print sequence, the CPU circuit unit 122 controls the printer unit 2 to print the two predetermined print data sets of the above-described image A and image B, stored in the hard disk of the image memory 120 in a manner correlated with the text print data of the case-binding print job, on the region 2401 and 2402 of the type 2 sheet, as the second print sequence of the case-binding print job.

To create the case-bound product 2400 shown in FIGS. 26A through 26D, the CPU circuit unit 122 executes the following printing process in the series of printing procedures for printing onto the type 2 sheet.

Figure 32B:
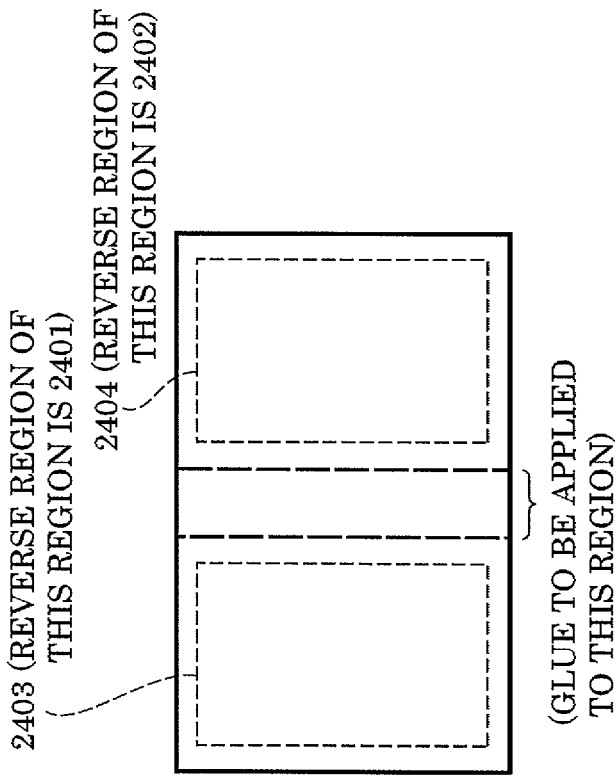
FIGS. 32A and 32B are explanatory diagrams relating to case binding as an example of a sheet gluing process, which is to be controlled with the embodiment.
Figure 32A:
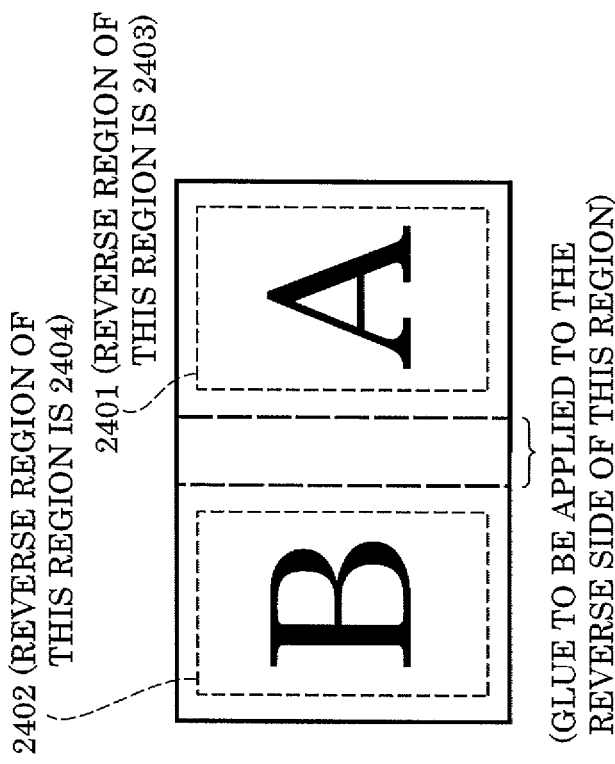

The type 2 sheet before being glued to the first type sheet stack upon which text print data has been printed, is in a state prior to being folded over, as shown in FIGS. 30A and 30B. Then, to obtain the printing results such as shown in FIGS. 26A through 26D, the CPU circuit unit 122 causes the printer unit 2 to execute a printing process such as shown in FIGS. 32A and 32B.

That is to say, the printer unit 2 executes a printing process on the first face of the type 2 sheet, such that the image A is disposed at the region 2401 of the first face of the type 2 sheet, and such that the image B is disposed at the region 2402 of the first face of the type 2 sheet. Note that the CPU circuit unit 122 uses memory which is usable for an image editing process to perform a layout process such that the image A and image B form data for the one face of the one sheet, following which this image data wherein image A and image B form data for the one face of the one sheet is printed on the first face of the type 2 sheet by the printer unit 2.

However, in this printing sequence, control is effected such that the printing process for the second face of the type 2 sheet by the printer unit 2, such that the image C is disposed at the region 2403 of the second face of the type 2 sheet, and such that the image D is disposed at the region 2404 of the second face of the type 2 sheet, is inhibited.

Thus, in this second example, the CPU circuit unit 122 controls the printer unit 2 such that the image A and image B are printed on the first face of the type 2 sheet, but controls the printer unit 2 such the printing process wherein the image C and image D subjected to layout on the second face of the type 2 sheet is inhibited.

After the series of printing processes on the type 2 sheet, the printed type 2 sheet is glued to the type 1 sheet stack made up of the multiple type 1 sheets upon which the text print data (the M pages total of print data) has been printed, by a gluing process using the gluing unit 300. This completes creating of the case-bound product 2400 shown in FIGS. 26A through 26D using the present system 1000.

Next, a third example will be described. Let us say that the user for example has made the following settings on the setting screen (f) shown in FIG. 7C.

First, the user has pressed the "Copy" key for the "Outer side of front cover" on the setting screen (f) shown in FIG. 7C, thereby inputting instructions to execute the above-described first special printing process so as to print the image A on the region 2401 of the type 2 sheet in the case binding mode.

Also, the user has pressed the "Copy" key for the "Inner side of front cover" on the setting screen (f) shown in FIG. 7C, thereby inputting instructions to execute the above-described second special printing process so as to print the image C on the region 2403 of the type 2 sheet in the case binding mode.

Further, the user has not pressed the "Copy" key for the "Inner side of back cover" on the setting screen (f) shown in FIG. 7C, but rather pressed the "No copy" key for the "Inner side of back cover", thereby inputting instructions to inhibit the above-described third special printing process so as to not print the image D on the region 2404 of the type 2 sheet in the case binding mode.

Moreover, the user has pressed the "Copy" key for the "Outer side of back cover" on the setting screen (f) shown in FIG. 7C, thereby inputting instructions to execute the above-described fourth special printing process so as to print the image B on the region 2402 of the type 2 sheet in the case binding mode.

In response to this series of printing settings for the case binding mode having been made by the user at the operating unit 123, the CPU circuit unit 122 causes the image forming system 1000 to process the case-binding print job, so as to create the case-bound product 2400 such as shown in FIGS. 27A through 27D. Note that the case-bound product 2400 shown in FIGS. 27A through 27D should be referred to in the same manner as with the case-bound product 2400 shown in the above FIGS. 24A through 24D.

Now, in order to yield the case-bound product 2400 shown in FIGS. 27A through 27D, the CPU circuit unit 122 causes the printer unit 2 to execute the following two types of printing processes as case-binding printing processes, in the case binding mode.

First, as the first print sequence for the case-binding print job, the printer unit 2 is controlled so as to print the text print data included on the data of the job to be subjected to the case-binding printing process in the hard disk of the image memory 120 to the type 1 sheet. This printing action is repeated as many times as the number of text pages. In the case of this example, the print process is executed for a total of M pages.

In addition to executing the above first print sequence, the CPU circuit unit 122 controls the printer unit 2 to print the three predetermined data sets of the above-described image A, image B, and image C, stored in the hard disk of the image memory 120 in a manner correlated with the text print data of the case-binding print job, on the regions 2401, 2402, and 2403, of the type 2 sheet, as the second print sequence of the case-binding print job.

To create the case-bound product 2400 shown in FIGS. 27A through 27D, the CPU circuit unit 122 executes the following printing process in the series of printing procedures for printing onto the type 2 sheet.

Figure 33B:
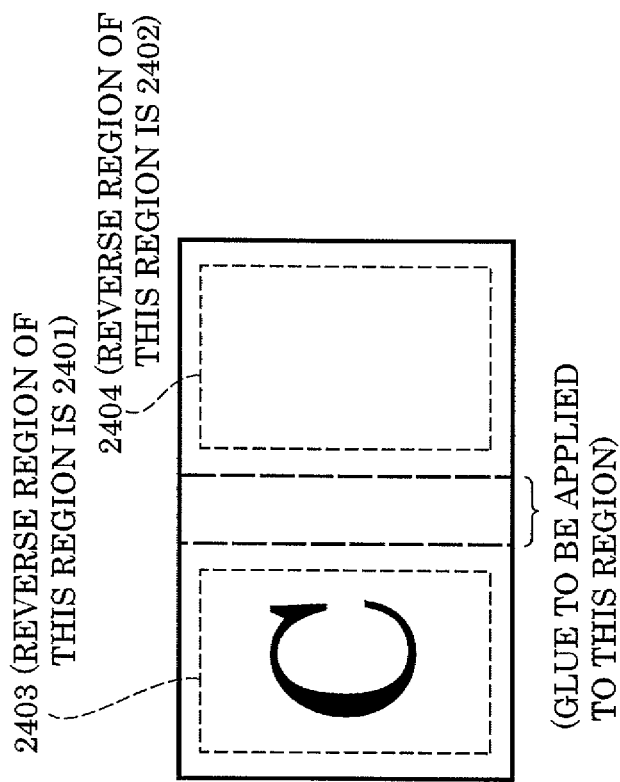
FIGS. 33A and 33B are explanatory diagrams relating to case binding as an example of a sheet gluing process, which is to be controlled with the embodiment.
Figure 33A:
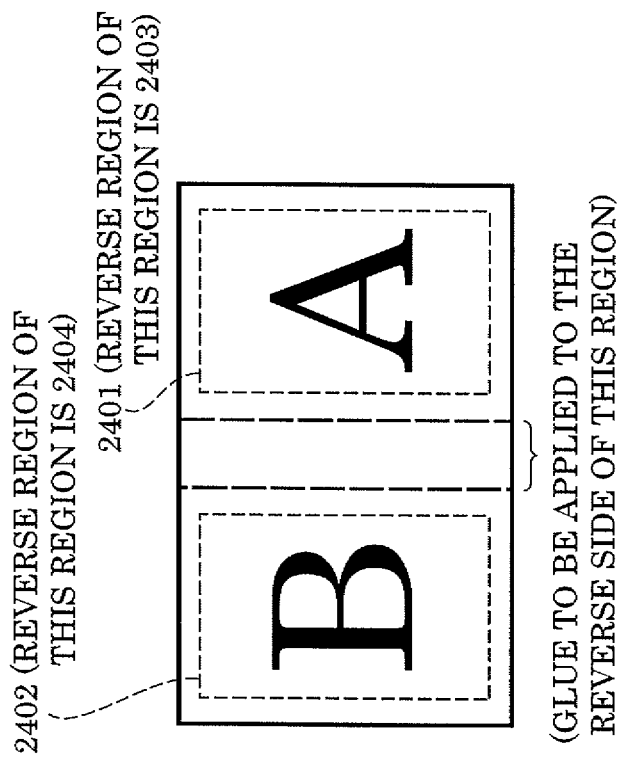

The type 2 sheet before being glued to the first type sheet stack upon which text print data has been printed, is in a state prior to being folded over, as shown in FIGS. 30A and 30B. Then, to obtain the printing results such as shown in FIGS. 27A through 27D, the CPU circuit unit 122 causes the printer unit 2 to execute a printing process such as shown in FIGS. 33A and 33B.

That is to say, the printer unit 2 executes a printing process on the first face of the type 2 sheet, such that the image A is disposed at the region 2401 of the first face of the type 2 sheet, and such that the image B is disposed at the region 2402 of the first face of the type 2 sheet. Note that the CPU circuit unit 122 uses memory which is usable for an image editing process to perform a layout process such that the image A and image B form data for the one face of the one sheet, following which this image data wherein image A and image B form data for the one face of the one sheet is printed on the first face of the type 2 sheet by the printer unit 2.

Further, the printer unit 2 executes a printing process on the second face of the type 2 sheet, such that the image C is disposed at the region 2403 of the second face of the type 2 sheet, but such that the image D is not disposed at the region 2404 of the second face of the type 2 sheet. Thus, with this printing sequence, control is effected such that the printing process of the image C at the region 2403 of the second face of the type 2 sheet is permitted, but such that the printing process of the image D at the region 2404 of the second face of the type 2 sheet, is inhibited.

Thus, with the third example, the CPU circuit unit 122 controls the printer 2 such that a printing process is executed wherein the image A and image B are laid out on the first face of the type 2 sheet, and further wherein layout of the image C to the second face of the type 2 sheet is permitted. However, the CPU circuit unit 122 effects control such that a printing process wherein the image D is laid out on the second face of the type 2 sheet is inhibited.

After the series of printing processes on the type 2 sheet, the printed type 2 sheet is glued to the type 1 sheet stack made up of the multiple type 1 sheets upon which the text print data (the M pages total of print data) has been printed, by a gluing process using the gluing unit 300. This completes creating of the case-bound product 2400 shown in FIGS. 27A through 27D using the present system 1000.

Next, a fourth example will be described. Let us say that the user for example has made the following settings on the setting screen (f) shown in FIG. 7C.

First, the user has pressed the "Copy" key for the "Outer side of front cover" on the setting screen (f) shown in FIG. 7C, thereby inputting instructions to execute the above-described first special printing process so as to print the image A on the region 2401 of the type 2 sheet in the case binding mode.

Also, the user has not pressed the "Copy" key for the "Inner side of front cover" on the setting screen (f) shown in FIG. 7C, but rather pressed the "No copy" key for the "Inner side of front cover", thereby inputting instructions to inhibit the above-described second special printing process so as to not print the image C on the region 2403 of the type 2 sheet in the case binding mode.

Further, the user has pressed the "Copy" key for the "Inner side of back cover" on the setting screen (f) shown in FIG. 7C, thereby inputting instructions to execute the above-described third special printing process so as to print the image D on the region 2404 of the type 2 sheet in the case binding mode.

Moreover, the user has pressed the "Copy" key for the "Outer side of back cover" on the setting screen (f) shown in FIG. 7C, thereby inputting instructions to execute the above-described fourth special printing process so as to print the image B on the region 2402 of the type 2 sheet in the case binding mode.

In response to this series of printing settings for the case binding mode having been made by the user at the operating unit 123, the CPU circuit unit 122 causes the image forming system 1000 to process the case-binding print job, so as to create the case-bound product 2400 such as shown in FIGS. 28A through 28D. Note that the case-bound product 2400 shown in FIGS. 28A through 28D should be referred to in the same manner as with the case-bound product 2400 shown in the above FIGS. 24A through 24D.

Now, in order to yield the case-bound product 2400 shown in FIGS. 28A through 28D, the CPU circuit unit 122 causes the printer unit 2 to execute the following two types of printing processes as case-binding printing processes, in the case binding mode.

First, as the first print sequence for the case-binding print job, the printer unit 2 is controlled so as to print the text print data included on the data of the job to be subjected to the case-binding printing process in the hard disk of the image memory 120 to the type 1 sheet. This printing action is repeated as many times as the number of text pages. In the case of this example, the print process is executed for a total of M pages.

In addition to executing the above first print sequence, the CPU circuit unit 122 controls the printer unit 2 to print the three predetermined print data sets of the above-described image A, image B, and image D, stored in the hard disk of the image memory 120 in a manner correlated with the text print data of the case-binding print job, on the regions 2401, 2402, and 2404, of the type 2 sheet as the second print sequence of the case-binding print job.

To create the case-bound product 2400 shown in FIGS. 28A through 28D, the CPU circuit unit 122 executes the following printing process in the series of printing procedures for printing onto the type 2 sheet.

Figure 34B:
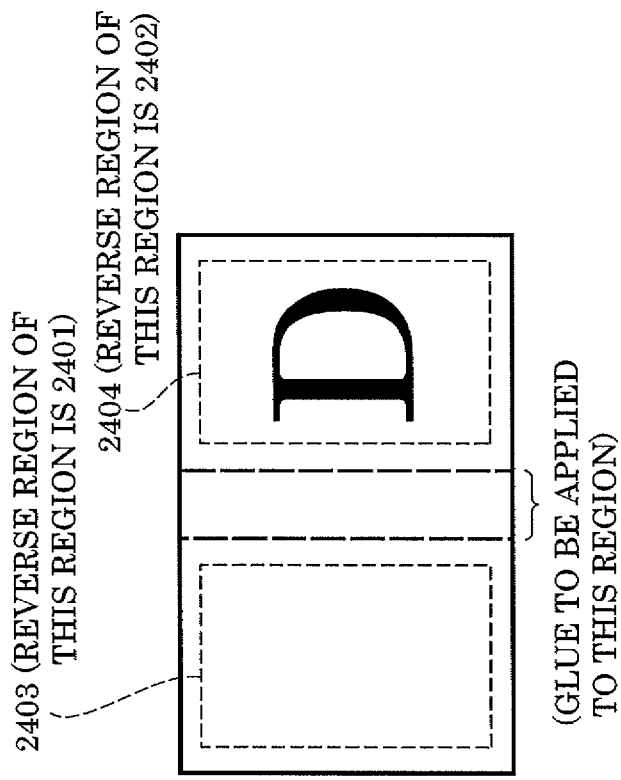
FIGS. 34A and 34B are explanatory diagrams relating to case binding as an example of a sheet gluing process, which is to be controlled with the embodiment.
Figure 34A:
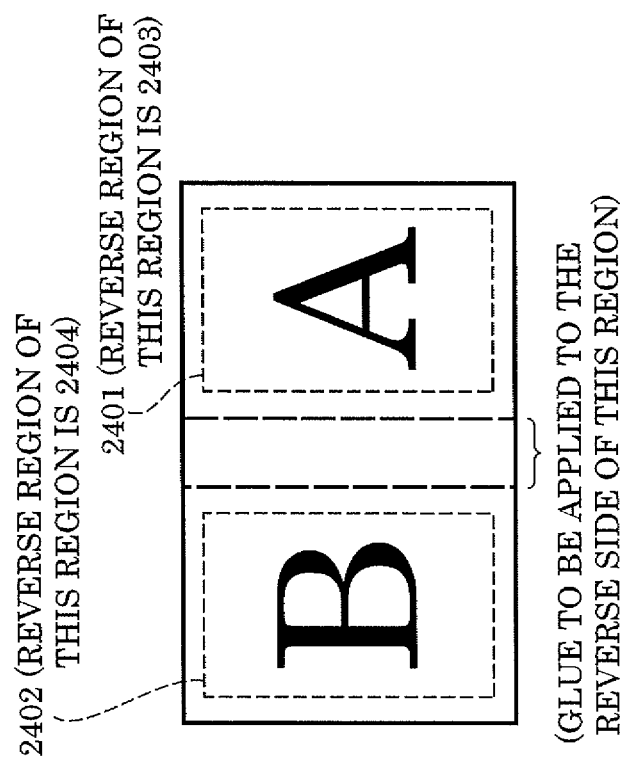

The type 2 sheet before being glued to the first type sheet stack upon which text print data has been printed, is in a state prior to being folded over, as shown in FIGS. 30A and 30B. Then, to obtain the printing results such as shown in FIGS. 28A through 28D, the CPU circuit unit 122 causes the printer unit 2 to execute a printing process such as shown in FIGS. 34A and 34B.

That is to say, the printer unit 2 executes a printing process on the first face of the type 2 sheet, such that the image A is disposed at the region 2401 of the first face of the type 2 sheet, and such that the image B is disposed at the region 2402 of the first face of the type 2 sheet. Note that the CPU circuit unit 122 uses memory which is usable for an image editing process to perform a layout process such that the image A and image B form data for the one face of the one sheet, following which this image data wherein image A and image B form data for the one face of the one sheet is printed on the first face of the type 2 sheet by the printer unit 2.

Further, the printer unit 2 executes a printing process on the second face of the type 2 sheet, such that the image D is disposed at the region 2404 of the second face of the type 2 sheet, but such that the image C is not disposed at the region 2403 of the second face of the type 2 sheet. Thus, with this printing sequence, control is effected such that the printing process of the image D at the region 2404 of the second face of the type 2 sheet is permitted, but such that the printing process of the image C at the region 2403 of the second face of the type 2 sheet, is inhibited.

Thus, with the fourth example, the CPU circuit unit 122 controls the printer 2 such that a printing process is executed wherein the image A and image B are laid out on the first face of the type 2 sheet, and further wherein layout of the image D to the second face of the type 2 sheet is permitted. However, the CPU circuit unit 122 effects control such that a printing process wherein the image C is laid out on the second face of the type 2 sheet is inhibited.

After the series of printing processes on the type 2 sheet, the printed type 2 sheet is glued to the type 1 sheet stack made up of the multiple type 1 sheets upon which the text print data (the M pages total of print data) has been printed, by a gluing process using the gluing unit 300. This completes creating of the case-bound product 2400 shown in FIGS. 28A through 28D using the present system 1000.

Next, a fifth example will be described. Let us say that the user for example has made the following settings on the setting screen (f) shown in FIG. 7C.

First, the user has pressed the "Copy" key for the "Outer side of front cover" on the setting screen (f) shown in FIG. 7C, thereby inputting instructions to execute the above-described first special printing process so as to print the image A on the region 2401 of the type 2 sheet in the case binding mode.

Also, the user has pressed the "Copy" key for the "Inner side of front cover" on the setting screen (f) shown in FIG. 7C, thereby inputting instructions to execute the above-described second special printing process so as to print the image C on the region 2403 of the type 2 sheet in the case binding mode.

Further, the user has pressed the "Copy" key for the "Inner side of back cover" on the setting screen (f) shown in FIG. 7C, thereby inputting instructions to execute the above-described third special printing process so as to print the image D on the region 2404 of the type 2 sheet in the case binding mode.

Moreover, the user has not pressed the "Copy" key for the "Outer side of back cover" on the setting screen (f) shown in FIG. 7C, but rather pressed the "No copy" key for the "Outer side of back cover", thereby inputting instructions to inhibit the above-described fourth special printing process so as to not print the image B on the region 2402 of the type 2 sheet in the case binding mode.

In response to this series of printing settings for the case binding mode having been made by the user at the operating unit 123, the CPU circuit unit 122 causes the image forming system 1000 to process the case-binding print job, so as to create the case-bound product 2400 such as shown in FIGS. 29A through 29D. Note that the case-bound product 2400 shown in FIGS. 29A through 29D should be referred to in the same manner as with the case-bound product 2400 shown in the above FIGS. 24A through 24D.

Now, in order to yield the case-bound product 2400 shown in FIGS. 29A through 29D, the CPU circuit unit 122 causes the printer unit 2 to execute the following two types of printing processes as case-binding printing processes, in the case binding mode.

First, as the first print sequence for the case-binding print job, the printer unit 2 is controlled so as to print the text print data included on the data of the job to be subjected to the case-binding printing process in the hard disk of the image memory 120 to the type 1 sheet. This printing action is repeated as many times as the number of text pages. In the case of this example, the print process is executed for a total of M pages.

In addition to executing the above first print sequence, the CPU circuit unit 122 controls the printer unit 2 to print the three predetermined data sets of the above-described image A, image C, and image D, stored in the hard disk of the image memory 120 in a manner correlated with the text print data of the case-binding print job, as the second print sequence of the case-binding print job on the regions 2401, 2403, and 2404, of the type 2 sheet.

To create the case-bound product 2400 shown in FIGS. 29A through 29D, the CPU circuit unit 122 executes the following printing process in the series of printing procedures for printing onto the type 2 sheet.

Figure 35A:
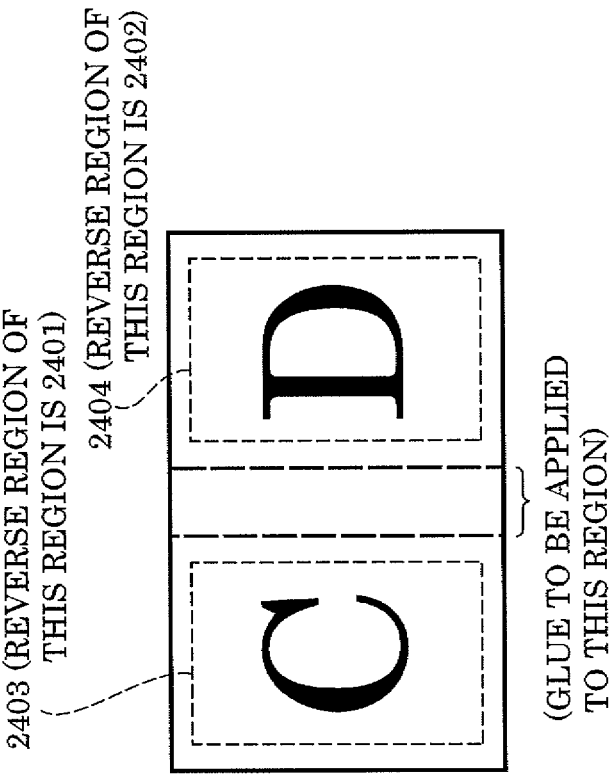
FIGS. 35A and 35B are explanatory diagrams relating to case binding as an example of a sheet gluing process, which is to be controlled with the embodiment.
Figure 35B:
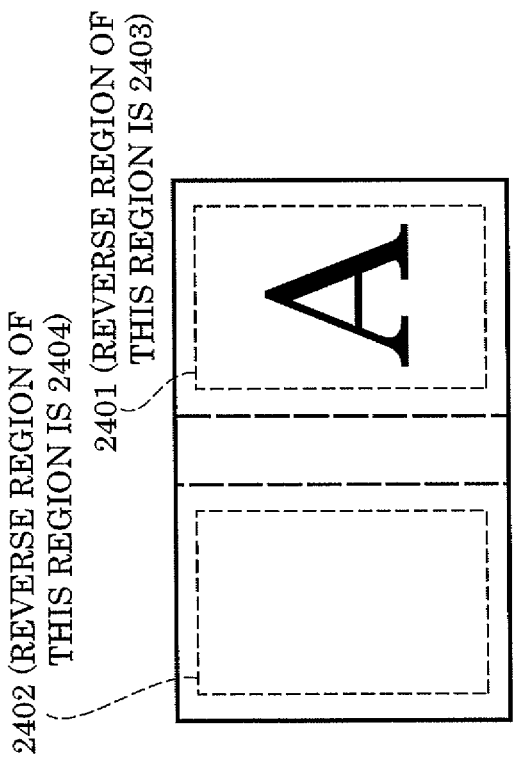

The type 2 sheet before being glued to the first type sheet stack upon which text print data has been printed, is in a state prior to being folded over, as shown in FIGS. 30A and 30B. Then, to obtain the printing results such as shown in FIGS. 29A through 29D, the CPU circuit unit 122 causes the printer unit 2 to execute a printing process such as shown in FIGS. 35A and 35B.

That is to say, the printer unit 2 executes a printing process on the first face of the type 2 sheet, such that the image A is disposed at the region 2401 of the first face of the type 2 sheet, but such that the image B is not disposed at the region 2402 of the first face of the type 2 sheet.

Further, the printer unit 2 executes a printing process on the second face of the type 2 sheet, such that the image C is disposed at the region 2403 of the second face of the type 2 sheet, and such that the image D is disposed at the region 2404 of the second face of the type 2 sheet. Note that the CPU circuit unit 122 uses memory usable for an image editing process to perform a layout process such that the image C and image D form data for the one face of the one sheet, following which this image data wherein image C and image D form data for the one face of the one sheet is printed on the second face of the type 2 sheet by the printer unit 2.

Thus, with the fifth example, the CPU circuit unit 122 controls the printer 2 so as to execute a printing process on the second face of the type 2 sheet, such that the image C and image D are laid out on the second face of the type 2 sheet. Also, control is effected such that a printing process is executed wherein layout of the image A on the first face of the type 2 sheet is permitted but layout of the image B on the first face of the type 2 sheet is inhibited.

After the series of printing processes on the type 2 sheet, the printed type 2 sheet is glued to the type 1 sheet stack made up of the multiple type 1 sheets upon which the text print data (the M pages total of print data) has been printed, by a gluing process using the gluing unit 300. This completes creating of the case-bound product 2400 shown in FIGS. 29A through 29D using the present system 1000.

Now, the above five examples are examples of processing a job from the reader unit 1, and accordingly, the memory of the image forming apparatus was used to execute for image editing before executing the printing process of printing onto the type 2 sheet with the printer unit 2.

However, in the event that the job is an external job received from an external host computer (e.g., the external device 2002 shown in FIG. 2) via the connector 121, a printer driver or the like at the host computer is used to perform layout processing of the data of the pages to be printed into data for one side of a type 2 sheet, which is then received from the host computer.

Accordingly, in the event that the job is an external job received from an external host computer in the case binding mode, the above-described layout process is not executed at the system 1000 side, but rather printed out at the printer unit 2 via the image memory 120. Thus, even in the event that the job is an external job received from an external host computer, the printing process such is shown in FIGS. 31A through 35B can be realized, to yield case-bound products 2400 such as shown in FIGS. 25A through 29D.

Thus, as described with reference to FIG. 24A through 35B through the five case-binding printing process examples, with the present embodiment, the CPU circuit unit 122 controls the system 1000 so as to print text print data on type 1 sheets which are equivalent to text sheets in the case binding printing process in the case binding mode. With this configuration as a prerequisite, the CPU circuit unit 122 further controls the system 1000 so as to be able to print predetermined print data other than the text print data, such as case binding cover print data or the like, onto type 2 sheets equivalent to case binding cover sheets.

Moreover, in the case of executing the printing processing onto the type 2 sheets in the case binding mode, the user can determine whether each of the two regions 2401 and 2402 on the first face of the type 2 sheet, and each of the two regions 2403 and 2404 on the second face of the type 2 sheet will be printed or not, for each of the regions. Thus, in examples described above involved a configuration for determining whether or not per executing printing for each region of the four regions; however, the following arrangement may be used instead.

For example, the user may be enabled to input a predetermined instruction to the effect that both the first print process on the type 2 sheet and the second type print process on the type 2 sheet are to be permitted (hereafter referred to as "first instruction").

Further, the user may be enabled to input a predetermined instruction to the effect that only one of the first print process on the type 2 sheet and the second type print process on the type 2 sheet is to be permitted (hereafter referred to as "second instruction").

Moreover, the user may be enable to input a predetermined instruction to the effect that both the first print process on the type 2 sheet and the second type print process on the type 2 sheet are to be inhibited (hereafter referred to as "third instruction").

In the event that the user inputs the above first instruction at the time of processing the type 2 sheet in the case binding mode, the CPU circuit unit 122 controls the printer unit 2 so as to enable creating of the printed article 2400 such as shown in FIGS. 25A through 25D. That is to say, the printer unit 2 is made to execute the printing process on both sides of the type 2 sheet, according to the printing method shown in FIGS. 31A and 31B.

Or, in the event that the user inputs the above second instruction at the time of processing the type 2 sheet in the case binding mode, the CPU circuit unit 122 controls the printer unit 2 so as to enable creating of the printed article 2400 such as shown in FIGS. 26A through 26D. That is to say, the printer unit 2 is made to execute the printing process on one side of the type 2 sheet, according to the printing method shown in FIGS. 32A and 32B.

Further, the event that the user inputs the above third instruction at the time of processing the type 2 sheet in the case binding mode, the CPU circuit unit 122 effects control so as to inhibit all printing processing of the type 2 sheet. In this case, the printer unit 2 does not perform the printing process to the type 2 sheet; rather, the type 2 sheet is conveyed without change from a discharge roller 219 of the printer unit 2 to the gluing unit 300 of the sheet processing device 230.

In this way, a configuration may be made wherein the user can determine whether or not printing is to be made on the type 2 sheet in the case binding mode, in increments of sheet sides, using an user interface unit such as the operating unit 123 (in the case of a job received from a host computer, the operating unit of the host computer).

Also, in the above example, a configuration has been described wherein the user can select whether or not to print on the type 2 sheet in the case binding mode, through the display screen (f) shown in FIG. 7C. However, the present embodiment is not restricted to this configuration, and the following arrangement may be made instead.

For example, with the present embodiment, the configuration is such that the user himself/herself can determine the sheet to be used for the type 2 sheet in the case binding mode, using an user interface unit such as the operating unit 123 (in the case of a job received from a host computer, the operating unit of the host computer). Let us say that the user makes settings regarding the type 2 sheet in the case binding mode for example, with such a configuration. Upon receiving the settings, the CPU circuit unit 122 obtains information relating to the sheet that has been selected by the user as the type 2 sheet. Based on the information relating to the type 2 sheet which has been obtained, the CPU circuit unit 122 itself automatically makes determination regarding whether or not printing can be performed on the type 2 sheet in the case binding mode. This configuration allows the following situation to be handled.

Let us consider what sort of printed materials a user would want to create using the case binding process. Most likely would be guidebooks, user manuals, and so forth. Such casebound printed articles would probably use plain paper or recycled paper for the text sheets. On the other hand, heavy paper or special sheets with a considerable thickness would most likely be used for the case binding cove sheet for covering the text sheets.

In addition to such user needs and usage cases, there are also issues to consider with regard to the configuration of the system and apparatus itself. For example, the image forming system 1000 shown in FIG. 1 has the mechanical configuration shown in FIG. 1 to reduce size. Printing on heavy sheets with such a mechanical configuration could affect the system or apparatus in one way or another. In light of the above points observed, the CPU circuit unit 122 may be used to execute control. The following is an example.

For example, in the event of performing the case binding process on a job from the reader 1, the user can set the case binding mode using the operating unit 123, which is an example of a user interface unit of the system 1000 according to the present embodiment. Also, in the event of performing the case binding process on a job from a host computer for example, the user can set the case binding mode using a printing settings screen displayed on the display unit of the host computer, serving as an example of a user interface unit of the present embodiment.

With such a configuration, let us say that the user has selected, through a user interface unit such as described above, a predetermined type sheet regarding which both-side printing at the printer unit 2 of the system 1000 should be inhibited, such as heavy paper, as the type 2 sheet for the case binding mode. In this case, the printer unit 2 is controlled so as to inhibit the both-sided printing process on the type 2 sheet. On the other hand, let us say that that the user has selected, through the user interface unit, a media type sheet regarding which both-side printing at the printer unit 2 is permissible, such as plain paper or recycled paper, rather than the predetermined type of sheet, as the type 2 sheet for the case binding mode. In this case, the printer unit 2 is controlled so as to permit the both-sided printing process on the type 2 sheet.

As described above, with this configuration, the user does not directly determine whether or not the both-sided print process can be performed on the type 2 sheet of the case binding job (i.e., a screen such as the screen (f) shown in FIG. 7C is not directly presented to the user), but rather, the CPU circuit unit 122 itself automatically determines this issue based on the information relating to the type 2 sheet to be used in the case bonding mode.

Of course, while such control should be able to be executed in light of matters to be considered regarding the system 1000 side, such as mechanical configuration and the like, the present embodiment is not restricted to this perspective. For example, a configuration may be made wherein control is executed based upon giving consideration to user-side issues, such as proactively preventing user errors.

Further, the present system 1000 may have the following configuration. For example, the sheet processing device 230 shown in FIG. 1 is connected to the image forming apparatus main unit. However, a sheet processing device having similar functions to those of the sheet processing device 230 at the least, and also having a special sheet feeding unit such as an inserter, can also be connected to the image forming apparatus main unit. Note that an inserter is capable of conveying printed sheets into the sheet processing device 230, as mentioned earlier, and further, can convey sheets to a conveying path within the sheet processing device 230 without passing through a sheet conveying path for sheets to be subjected to image formation within the printer unit 2.

Now, in the event that the sheet processing device 230 which the present system 1000 has is a type of sheet processing device also having an inserter, a configuration can be made wherein the user can select the inserter as the sheet feeding source for the type 2 sheet for the case binding mode, at the time of the user making case binding mode settings using the user interface.

For example, in the event of performing the case binding process on a job from the reader 1, the user can select the inserter as the sheet feeding source of the type 2 sheet in the case binding mode, via the operating unit 123 which is an example of the user interface unit according to the present embodiment. Also, in the event of performing the case binding process on a job from a host computer for example, the user can select the inserter as the sheet feeding source of the type 2 sheet in the case binding mode, using the printing settings screen displayed on the display unit of the host computer, serving as an example of a user interface unit of the present embodiment.

With such a configuration, let us say that the user has selected the inserter as the sheet feeding source for the type 2 sheet for the case binding mode, using the user interface unit described above. In this case, the CPU circuit unit 122 controls the printer unit 2 so as to inhibit the printing process on the type 2 sheet for cases of processing the case binding job. On the other hand, in the event that the user has selected a sheet feeding source other than the inserter as the sheet feeding source for the type 2 sheet for the case binding mode, i.e., one of the sheet feeding units 227, 214, 215, 225, or 226, using the user interface unit described above, the CPU circuit unit 122 controls the printer unit 2 so as to permit the printing process on the type 2 sheet for cases of processing the case binding job.

As described above, a configuration may be employed wherein the user does not directly determine whether or not the print process can be performed on the type 2 sheet of the case binding job (i.e., without a screen such as the screen (f) shown in FIG. 7C being directly presented to the user), but rather, the CPU circuit unit 122 itself automatically determines this issue based on the sheet feeding source which the user has selected as the sheet feeding source for the type 2 sheet.

As described above, the image forming system 1000 according to the present embodiment is configured such that, with regard to processing a job for case binding, whether or not to permit the printing process (including cases of both-sided printing as well) on the type 2 sheet to be subjected to the gluing process to the first type sheet stack upon which the text print data has been printed, is executed based upon direct user instructions, but further is configured such that the determination can be made automatically upon determination of the CPU circuit unit 122 itself, as well.

Now with the present embodiment, inhibiting both-sided printing on the type 2 sheet includes at least one of the following two cases: inhibiting the printing process altogether on both the first face and the second face of the type 2 sheet; and inhibiting the printing process on one of the first face and the second face of the type 2 sheet, while permitting the printing process on the other.

As described above, the present embodiment is configured so as to enable inhibiting execution of both-sided printing of the type 2 sheet used as the cover for a case binding job, using the CPU circuit unit 122 for example, however, the CPU circuit unit 122 can at the same time effect control so as to permit both-sided printing of the text sheets to which the type 2 sheet is to be glued (i.e., type 1 sheets) while processing the case binding job. It should be noted though, that selection whether to execute both-sided printing or single-sided printing on the type 1 sheets can be made by the user via the above-described user interface.

This control described here is control which takes into consideration user needs and usage cases, i.e., the usage environment. Printed materials which a user would want to create using the case binding process most likely would be guidebooks, user manuals, and so forth. Such case-bound printed articles would probably use plain paper or recycled paper for the text sheets, and further, the probability that both-sided printing is desired for the text itself is high. On the other hand, this does not mean that both-sided printing is desired in all cases. This is why the above-described control can be executed, taking into consideration such various situations.

According to such a configuration, the above-described advantages, that various user demands, relating to the sheet gluing process mode in an image forming apparatus or image forming system capable of sheet gluing processing which has been realized as a product, can be flexibly handled without trouble occurring, can be further improved.

Thus, with the present embodiment, the system 1000 is controlled so as to inhibit or to permit execution itself of the printing process on the type 2 sheet of a case binding job, based on the results of various types of determination processes relating to the case binding job.

Also, control can be effected so as to permit execution of single-sided printing alone on the type 2 sheet for the case binding job, based on the various types of determination processes, with execution of both-sided printing being inhibited. Further, control can be effected so as to permit execution of single-sided printing alone on the type 1 sheets for the case binding job, based on the various types of determination processes, with execution of both-sided printing being inhibited.

Now, the term "various types of determination processes" means, with regard to the present embodiment as described above: the determination results relating to whether or not the user has given instructions to execute printing on a type 2 sheet, in a case wherein the user has selected the case binding mode; confirmation results relating to what sort of media type the sheet to be used as the type 2 sheet is, in a case wherein the user has selected the case binding mode; and/or determination results regarding whether or not the sheet feeding source of the type 2 sheet is a predetermined sheet feeding source such as an inserter. The CPU circuit unit 122 thus checks the processing conditions of jobs to be processed, and executes the above-described various types of control based on the determination results.

Further, in the event of the CPU circuit unit 122 executing control based on the determination results, the various types of control may be used in a logical sum manner or in a logical product manner with the present embodiment.

Moreover, with the present embodiment, predetermined processes relating to (affecting) the sheet gluing process with the sheet processing unit 230 are controlled so as to be permitted or inhibited by the CPU circuit unit 122 for example, based on whether the job to be processed is a job satisfying a predetermined condition. With the present embodiment, an example of a "predetermined process" is the above described printing process on a sheet for a job which requires the sheet gluing process by the sheet processing device 230. However, this is not the only "predetermined process" with the present embodiment, and there are other "predetermined processes" which are inhibited or permitted by the CPU circuit unit 122 according to whether or not the job to be processed is a job satisfying a predetermined condition.

For example, the "sheet gluing process with the sheet processing unit 230", such as the "case binding process with the sheet processing unit 230", the "pad binding process with the sheet processing unit 230", and so forth, is in itself a further example of the "predetermined process".

Let us take as an example a case wherein the originals for a case binding job are read from the reader unit 1. In this case, the CPU circuit unit 122 executes the original document reading action with the reader unit 1, and at the same time, gets the number of print data pages of the case binding process job from an unshown document counter, thereby obtaining total page number information for the job. On the other hand, the CPU circuit unit 122 checks the print processing conditions set for the job by the user for whether there are any job processing conditions set which would affect the number of printed faces of the output sheets, such as both-sided printing settings, single-sided printing settings, reduced layout settings, and so forth. The CPU circuit unit 122 then calculates the total number of sheets to be used for the case binding process job, based upon these various kinds of determination resources.

For example, the CPU circuit unit 122 uses information of a management table 3600 such as shown in FIG. 36 to calculate the total number of type 1 sheets necessary for the job to be subjected to the gluing process. The CPU circuit unit 122 performs the following calculations using the table information. In FIG. 36, the variable N is equivalent to the total number of sheets necessary for the job to be processed. The variable M is equivalent to the total number of pages of print data for the job to be processed. This table 3600 is registered beforehand in the hard disk of the image memory 120, for example, as management information.

Now, let us say that single-sided printing has been set for a series of print data consisting of 200 pages. In this case, the CPU circuit unit 122 uses the calculation according to Case 1 in the table 3600 to calculate that the total number of output sheets N needed for this job to be processed is $(200 \div 1) \div 1 = 200$.

Also, let us say that single-sided printing has been set for a series of print data consisting of 200 pages, and that the 2-in-1 mode has been selected in the reduced layout printing mode. Note that the 2-in-1 mode is a printing mode wherein two pages of input data are printed on one page worth of space on the same face of a single output sheet. In this case, the CPU circuit unit 122 uses the calculation according to Case 2 in the table 3600 to calculate that the total number of output sheets N needed for this job to be processed is $(200 \div 2) \div 1 = 100$.

Further, let us say that single-sided printing has been set for a series of print data consisting of 200 pages, and that the 4-in-1 mode has been selected in the reduced layout printing mode. Note that the 4-in-1 mode is a printing mode wherein four pages of input data are printed on one page worth of space on the same face of a single output sheet. In this case, the CPU circuit unit 122 uses the calculation according to Case 3 in the table 3600 to calculate that the total number of output sheets N needed for this job to be processed is $(200 \div 4) \div 1 = 50$.

The same calculation method is applied to Case 4 and so on.

Then, let us say that both-sided printing has been set for a series of print data consisting of 200 pages. In this case, the CPU circuit unit 122 uses the calculation according to Case 5 in the table 3600 to calculate that the total number of output sheets N needed for this job to be processed is $(200 \div 1) \div 2 = 100$.

Also, let us say that both-sided printing has been set for a series of print data consisting of 200 pages, and that the 2-in-1 mode has been selected in the reduced layout printing mode. In this case, the CPU circuit unit 122 uses the calculation according to Case 6 in the table 3600 to calculate that the total number of output sheets N needed for this job to be processed is $(200 \div 2) \div 2 = 50$.

The same calculation method is applied to Case 7 and so on, to calculate the total number of sheets necessary. In the event that the calculation results for the value of N result in fractions, the calculated value of N is rounded off to the next integer.

This sort of confirmation process for checking the total number of sheets necessary for printing the print data of the job to be processed (referred to as "number of prints" in the processes in the later-described flowchart) is performed in the event that the user selects a gluing process mode such as the case binding process mode or the pad binding process mode. This process is equivalent to the later-described step S9-3 in FIGS. 13, 15, and 16.

Also, in the pad binding mode, this sheet total number N is equivalent to the total number of type 1 sheets to yield a single output stack. On the other hand, this sheet total number N may be handled as the total number of type 1 sheets with case binding, as well. However, in the case binding mode, the final printed article is made up of both text sheets and the cover sheet.

Accordingly, in the case binding mode, the value N may be a value which takes into consideration the case binding cover (type 2 sheet). That is to say, the total sheet number N may be handled as a value obtained by adding the one type 2 sheet (the cover) to the total number of type 1 sheets.

With the above-described configuration, the CPU circuit unit 122 performs a comparison process between the total number of sheets to be used for the case binding job and a predetermined processing sheets number. Whether or not to execute the case binding process for the sheets of the case binding job is determined according to the comparison results.

The CPU circuit unit 122 uses management information of a management table 3700 such as shown in FIG. 37 to determine whether or not to execute the case binding process. This table 3700 is registered beforehand in the hard disk of the image memory 120, for example, as management information, and stores management information for providing restriction items (rules) beforehand for cases of executing sheet processing with the sheet processing device 230 on sheets of the job to be processed.

For example, in the example shown in FIG. 37, conditions for permitting sheet processing on sheets of the job to be processed, conditions for inhibiting the processing, and so forth, are stored as management information for each of the multiple; types of sheet processes which the sheet processing device 230 has, within the table 3700.

With such a configuration of the present embodiment, the CPU circuit unit 122 for example uses the information of the management table 3600 shown in FIG. 36 and so forth to calculate the total number of sheets necessary for the job to be processed, following which restriction control (inhibition control) described later is executed based on the restriction items (rules) relating to the multiple types of sheet processing modes which the sheet processing device 230 has, as in the example in FIG. 37.

Now, the sheet processing device 230 of the image forming system 1000 has two types of sheet gluing process modes, i.e., the case binding process mode and the pad binding process mode, and a saddle-stitching mode which does not need the gluing process, as well as others. Accordingly, specialized description will be made for each of these sheet processing modes.

For example, in the event that the total number of output sheets necessary for the job to be processed (i.e., the total number N of sheets) is less than 10 sheets (Case 1 in FIG. 37), or in the event that the number of sheets exceeds 150 sheets (Case 2, wherein N<150, in FIG. 37), the CPU circuit unit 122 inhibits execution of the case binding process by the sheet processing device 230 for the sheets of the job to be processed.

Also, for example, in the event that the total number of output sheets necessary for the job to be processed (i.e., the total number N of sheets) is 10 sheets or more but 150 sheets or less (Case 3 in FIG. 37), the CPU circuit unit 122 permits execution of the case binding process by the sheet processing device 230 for the sheets of the job to be processed.

Also, for example, in the event that the total number of output sheets necessary for the job to be processed (i.e., the total number N of sheets) exceeds 150 sheets (Case 4, wherein N>150, in FIG. 37), the CPU circuit unit 122 inhibits execution of the pad binding process by the sheet processing device 230 for the sheets of the job to be processed.

Also, for example, in the event that the total number of output sheets necessary for the job to be processed (i.e., the total number N of sheets) is 150 sheets or less (Case 5 in FIG. 37), the CPU circuit unit 122 permits execution of the pad binding process by the sheet processing device 230 for the sheets of the job to be processed.

Now, let us compare Case 5 in FIG. 37 and Case 3 in FIG. 37. In the event that the job to be processed is a pad binding job, the CPU circuit unit 122 permits pad binding of the sheets of the job even if the total number of sheets is less than 10 sheets. Thus, the CPU circuit unit 122 executes inhibiting control in the pad binding mode which differs from the inhibiting processing in the case binding mode. While the reason thereof will be described later, this is another feature of the present invention.

Also, for example, in the event that the total number of output sheets necessary for the job to be processed (i.e., the total number N of sheets) exceeds 15 sheets (Case 6, wherein N>15, in FIG. 37), the CPU circuit unit 122 inhibits execution of the saddle-stitch process by the sheet processing device 230 for the sheets of the job to be processed.

Or, for example, in the event that the total number of output sheets necessary for the job to be processed (i.e., the total number N of sheets) is 15 sheets or less (Case 7 in FIG. 37), the CPU circuit unit 122 permits execution of the saddle-stitch process by the sheet processing device 230 for the sheets of the job to be processed.

While not shown in FIG. 37, the sheet processing device 230 has other sheet processing modes besides these three sheet processing modes. Accordingly, management information similar to that of the above-described modes is also written in this table 3700 for the other sheet processing modes besides these three sheet processing modes.

Thus, with the present embodiment, restriction items (rules) for determining whether or not sheet processing can be executed with the sheet processing device 230, according to the total number of sheets necessary for the job to be processed, is stored beforehand in the image memory 120 of the system 1000, as management information. The CPU circuit unit 122 controls whether or not sheet processing can be executed for the sheets of a job to be processed, referring to the restriction items information in the image memory 120. It will be shown later that the CPU circuit unit 122 uses the management information in the management table 3700 in FIG. 37 for the later-described process in step S9-5, the process in step S9-6, and the process in step S9-14, in the flowchart in FIG. 13.

Thus, with the above-described configuration, problems which would conceivably occur with conventional art can also be proactively prevented, and the above-described advantages can be had in a sure manner.

Also, the image forming system 1000 according to the present embodiment is configured so as to be capable of using various types of sheets as candidates for sheets to be printed. For example, various types of sheets such as plain paper, recycled paper, color paper, glossy paper, heavy paper, and so forth, i.e., different media types, can be set in the sheet feeding units 227, 214, 215, 225, and 226, which the system 1000 has. Upon a user selecting a desired sheet feeding unit through a user interface unit such as the operating unit 123, the CPU circuit unit 122 controls the system 1000 to feed sheets of the media type which the user desired, so as to execute the printing process at the printer unit 2.

Accordingly, with the present embodiment, the control shown in FIG. 37 for example can be expanded to execute the following control, illustrated in FIG. 38, with the CPU circuit unit 122.

The information in the management table 3700 shown in FIG. 37 is management information stipulating restriction items (rules) for determining whether or not sheet processing can be executed, based on the number of sheets necessary for a job to be processed, for each of the multiple types of sheet processes which the sheet processing device 230 has. The control using the management information shown in FIG. 37 is a control sequence of a case not taking into consideration the type of sheets (media type) to be printed in the job to be processed.

Comparing FIG. 38 with FIG. 37, the information registered in the management table 3800 in FIG. 38 is stipulating restriction items (rules) for determining whether or not sheet processing can be executed, based on the number of sheets necessary for a job to be processed, for each of the multiple types of sheet processes which the sheet processing device 230 has. It this regard, the management table 3800 in FIG. 38 is no different from the management table 3700 in FIG. 37. What is different is that the management table 3800 in FIG. 38 is management information used in a control sequence of a case which takes into consideration the type of sheets (media type) to be printed in the job to be processed. This table 3800 is also registered in the hard disk of the image memory 120 of the system beforehand, as management information.

In the present embodiment, for example, the CPU circuit unit 122 executes the following control based on the restriction items (rules) relating to the sheet processes of the sheet processing device 230 as illustrated in the management table shown in FIG. 38. As with the previous example, specialized description will be made for each of the sheet processing modes of the two types of sheet gluing process modes, i.e., the case binding process mode and the pad binding process mode, and the saddle-stitching mode which does not need the gluing process. With the present embodiment, the CPU circuit unit 122 executes the control based on the management information shown in FIG. 38, upon having obtained information of the total number N of sheets necessary for the job to be processed, using the information of the management table 3600 shown in FIG. 36.

Now, let us say that with the job to be processed, the type of sheets on which the printing process is to be executed (i.e., media type) is plain paper or recycled paper. In the following description, a job which uses such media type sheets like plain paper or recycled paper or the like will be referred to as a "first media type job".

Now, in a case wherein the job to be processed is a first media type job, in the event that the total number of output sheets necessary for the job to be processed (i.e., the total number N of sheets) is less than 10 sheets (Case 1 in FIG. 38), or in the event that the number of sheets exceeds 150 sheets (Case 2, wherein N>150, in FIG. 38), the CPU circuit unit 122 inhibits execution of the case binding process by the sheet processing device 230 for the sheets of the first media type job to be processed.

Also, for example, in a case wherein the job to be processed is a first media type job, in the event that the total number of output sheets necessary for the job to be processed (i.e., the total number N of sheets) is 10 sheets or more but 150 sheets or less (Case 3 in FIG. 38), the CPU circuit unit 122 permits execution of the case binding process by the sheet processing device 230 for the sheets of the first media type job to be processed.

Also, for example, in a case wherein the job to be processed is a first media type job, in the event that the total number of output sheets necessary for the job to be processed (i.e., the total number N of sheets) exceeds 150 sheets (Case 4, wherein N>150, in FIG. 38), the CPU circuit unit 122 inhibits execution of the pad binding process by the sheet processing device 230 for the sheets of the first media type job to be processed.

Also, for example, in a case wherein the job to be processed is a first media type job, in the event that the total number of output sheets necessary for the job to be processed (i.e., the total number N of sheets) is 150 sheets or less (Case 5 in FIG. 38), the CPU circuit unit 122 permits execution of the pad binding process by the sheet processing device 230 for the sheets of the first media type job to be processed.

Also, for example, in a case wherein the job to be processed is a first media type job, in the event that the total number of output sheets necessary for the job to be processed (i.e., the total number N of sheets) exceeds 15 sheets (Case 6, wherein N>15, in FIG. 38), the CPU circuit unit 122 inhibits execution of the saddle-stitch process by the sheet processing device 230 for the sheets of the first media type job to be processed.

Or, for example, in a case wherein the job to be processed is a first media type job, in the event that the total number of output sheets necessary for the job to be processed (i.e., the total number N of sheets) is 15 sheets or less (Case 7 in FIG. 38), the CPU circuit unit 122 permits execution of the saddle-stitch process by the sheet processing device 230 for the sheets of the first media type job to be processed.

Next, let us say that with the job to be processed, the type of sheets on which the printing process is to be executed (i.e., media type) is color paper or glossy paper. Here, a job which uses such media type sheets like color paper or glossy paper or the like, which are different from the above-described media type sheets, will be referred to as a "second media type job".

With the present embodiment, this second type media sheet includes sheets which are of the same size as that of the above-described first type media sheet but are of a different weight, i.e., different thickness, per sheet. Also, for example, sheets which are thicker than the first type media sheets are included in the second type media sheets.

Now, in a case wherein the job to be processed is a second media type job, in the event that the total number of output sheets necessary for the job to be processed (i.e., the total number N of sheets) is less than 8 sheets (Case 8 in FIG. 38), or in the event that the number of sheets exceeds 100 sheets (Case 9, wherein N>100, in FIG. 38), the CPU circuit unit 122 inhibits execution of the case binding process by the sheet processing device 230 for the sheets of the second media type job to be processed.

Also, for example, in a case wherein the job to be processed is a second media type job, in the event that the total number of output sheets necessary for the job to be processed (i.e., the total number N of sheets) is 8 sheets or more but 100 sheets or less (Case 10 in FIG. 38), the CPU circuit unit 122 permits execution of the case binding process by the sheet processing device 230 for the sheets of the second media type job to be processed.

Also, for example, in a case wherein the job to be processed is a second media type job, in the event that the total number of output sheets necessary for the job to be processed (i.e., the total number N of sheets) exceeds 100 sheets (Case 11, wherein N>100, in FIG. 38), the CPU circuit unit 122 inhibits execution of the pad binding process by the sheet processing device 230 for the sheets of the second media type job to be processed.

Also, for example, in a case wherein the job to be processed is a second media type job, in the event that the total number of output sheets necessary for the job to be processed (i.e., the total number N of sheets) is 100 sheets or less (Case 12 in FIG. 38), the CPU circuit unit 122 permits execution of the pad binding process by the sheet processing device 230 for the sheets of the second media type job to be processed.

Also, for example, in a case wherein the job to be processed is a second media type job, in the event that the total number of output sheets necessary for the job to be processed (i.e., the total number N of sheets) exceeds 10 sheets (Case 13, wherein N>10, in FIG. 38), the CPU circuit unit 122 inhibits execution of the saddle-stitch process by the sheet processing device 230 for the sheets of the second media type job to be processed.

Or, for example, in a case wherein the job to be processed is a second media type job, in the event that the total number of output sheets necessary for the job to be processed (i.e., the total number N of sheets) is 10 sheets or less (Case 14 in FIG. 38), the CPU circuit unit 122 permits execution of the saddle-stitch process by the sheet processing device 230 for the sheets of the second media type job to be processed.

Next, let us say that with the job to be processed, the type of sheets on which the printing process is to be executed (i.e., media type) is heavy paper. Here, a job which uses such media type sheets like heavy paper or the like, which are different from the above-described first and second media type sheets, will be referred to as a "third media type job".

With the present embodiment, this third type media sheet includes sheets which are of the same size as that of the above-described first and second type media sheets but are of a different weight, i.e., different thickness, per sheet. Also, for example, sheets which are thicker than the first and second type media sheets are included in the third type media sheets.

Now, in a case wherein the job to be processed is a third media type job, in the event that the total number of output sheets necessary for the job to be processed (i.e., the total number N of sheets) is less than 5 sheets (Case 15 in FIG. 38), or in the event that the number of sheets exceeds 75 sheets (Case 16, wherein N>75, in FIG. 38), the CPU circuit unit 122 inhibits execution of the case binding process by the sheet processing device 230 for the sheets of the third media type job to be processed.

Also, for example, in a case wherein the job to be processed is a third media type job, in the event that the total number of output sheets necessary for the job to be processed (i.e., the total number N of sheets) is 5 sheets or more but 75 sheets or less (Case 17 in FIG. 38), the CPU circuit unit 122 permits execution of the case binding process by the sheet processing device 230 for the sheets of the third media type job to be processed.

Also, for example, in a case wherein the job to be processed is a third media type job, in the event that the total number of output sheets necessary for the job to be processed (i.e., the total number N of sheets) exceeds 75 sheets (Case 18, wherein N>75, in FIG. 38), the CPU circuit unit 122 inhibits execution of the pad binding process by the sheet processing device 230 for the sheets of the third media type job to be processed.

Also, for example, in a case wherein the job to be processed is a third media type job, in the event that the total number of output sheets necessary for the job to be processed (i.e., the total number N of sheets) is 75 sheets or less (Case 19 in FIG. 38), the CPU circuit unit 122 permits execution of the pad binding process by the sheet processing device 230 for the sheets of the third media type job to be processed.

Also, for example, in a case wherein the job to be processed is a third media type job, in the event that the total number of output sheets necessary for the job to be processed (i.e., the total number N of sheets) exceeds 5 sheets (Case 20, wherein N>5, in FIG. 38), the CPU circuit unit 122 inhibits execution of the saddle-stitch process by the sheet processing device 230 for the sheets of the third media type job to be processed.

Or, for example, in a case wherein the job to be processed is a third media type job, in the event that the total number of output sheets necessary for the job to be processed (i.e., the total number N of sheets) is 5 sheets or less (Case 21 in FIG. 38), the CPU circuit unit 122 permits execution of the saddle-stitch process by the sheet processing device 230 for the sheets of the third media type job to be processed.

Although not disclosed in FIG. 38, other media type sheets can be set in the sheet feeding units of the image forming system 1000, and can be printed with the printing unit 2. Accordingly, similar management information is also written in the table 3800 for these other types of media type sheets as well.

In this way, restriction item (rules) information for determining whether or not sheet processing can be executed, based on the number of sheets necessary for a job to be processed, for each of the multiple types of sheet processes which the sheet processing device 230 has, taking into consideration the type of sheets (media type) to be printed by the printer unit 2 in the job to be processed, is stored in the hard disk of the image memory 120 of the system 1000 beforehand, as management information. The CPU circuit unit 122 controls whether or not sheet processing can be executed for the sheets of a job to be processed, referring to the restriction items information in the image memory 120, taking into consideration the media type or the sheet to be used with the job to be processed. The CPU circuit unit 122 uses the management information in the management table 3800 in FIG. 38 for the later-described process in step S10-1, the process in step S9-5, and the process in step S9-6, in the flowchart shown in FIG. 14.

Now, let us compare Case 5 in FIG. 38 and Case 3 in FIG. 38. With a case wherein the job to be processed is a pad binding job for a first media type, the CPU circuit unit 122 permits pad binding of the sheets of the first media type job even if the total number of sheets of the first media type job to be processed is less than 10 sheets.

Also, let us compare Case 12 in FIG. 38 and Case 10 in FIG. 38. With a case wherein the job to be processed is a pad binding job for a second media type, the CPU circuit unit 122 permits pad binding of the sheets of the second media type job even if the total number of sheets of the second media type job to be processed is less than 8 sheets.

Further, let us compare Case 19 in FIG. 38 and Case 17 in FIG. 38. With a case wherein the job to be processed is a pad binding job for a third media type, the CPU circuit unit 122 permits pad binding of the sheets of the third media type job even if the total number of sheets of the third media type job to be processed is less than 5 sheets.

Thus, the CPU circuit unit 122 executes inhibiting control in the pad binding mode which differs from the inhibiting processing in the case binding mode, even while taking into consideration the media type of the job to be processed. This also is a feature of the present embodiment.

Accordingly, with the configuration described above, highly-detailed control can be realized taking into consideration the media type in the inhibiting processing relating to sheet gluing processes, for example, with the system 1000, thereby further improving the advantages of the present embodiment.

Next, the operations of the printer unit 2 and the sheet processing device 230 in the event of performing a case binding process will be described.

Let us say that with the present embodiment, the CPU circuit unit 122 has permitted performing the case binding process on the sheets of a job to be processed, based on determination made in accordance with the various rules such as described above, for example. In this case, of the series of print data of the job to be processed, which has been received from the reader unit 1 or external device 2002 and stored in the hard disk of the image memory 1220, the text image data is printed by the printer unit 2 in order on text sheets (type 1 sheets) in the case binding process.

The type 1 sheets following printing at the printer unit 2 are conveyed to a processing tray in the gluing unit 300 of the sheet processing device 230, and are sequentially stacked, in page order, on the tray, until the later-described gluing process is completed.

Now, let us say that printing of all pages of the text print data to be printed on the type 1 sheets has been completed, and all of the type 1 sheets for the text have been stacked on the tray of the gluing unit 300. The CPU circuit unit 122 responds by executing the gluing process with the gluing unit 300 of the sheet processing device 230, on the portion of the sheet stack of type 1 sheets, upon which the text image data has been printed, which corresponds to the spine. At this time, the CPU circuit unit 122 effects control so as to feed a case binding cover sheet (type 2 sheet) from a predetermined sheet feeding unit selected by the user for the job (e.g., manual feeding unit 227).

Subsequently, the gluing process is performed by pressing the cover sheet (equivalent to the type 2 sheet) against the text sheet stack (equivalent to the type 1 sheet stack) at the gluing unit 300, so that the spine portion of the type 1 sheet stack, regarding which the text image data has been printed and which the gluing process has been executed on the spine portion, matches the center portion of the cover sheet for the case binding process (see FIGS. 30A through 35B).

Following gluing of the cover sheet and the text sheets at the spine portion being completed, the cover sheet is folded over from the spine portion so as to cover the text sheets. The CPU circuit unit 122 then effects control so as to discharge the sheet stack of the job regarding which the case binding process has been completed, onto a stacking tray of the sheet processing device 230, using a discharge roller. Thus, the final printed article regarding which the case binding process has been performed, such as shown to the right in FIG. 8A and in FIGS. 25A through 29D, is obtained.

Note that with the present embodiment, consideration is given to the fact that with the case binding process, an action is necessary wherein the cover (equivalent to the type 2 sheet in the case binding mode) is firmly stuck to (glued to) the body sheet stack (the text sheet stack, i.e., equivalent to the type 1 sheet stack), as shown in FIG. 8A and in FIGS. 25A through 29D. The present embodiment further takes note that the body sheet stack needs to have a certain thickens, to where the gluing process of the case binding cover sheet to the text sheet stack can be properly executed, in order to realize such an action.

In other words, the present embodiment takes note of the fact that the following problems may occur in the event that the thickness of the type 1 sheet stack is very small, for example.

In case binding for example, the thickness of the body sheet stack (called the "type 1 sheet stack" in the present embodiment) defines the spine portion of the type 1 sheet stack. The portion where the spine is situated, is the portion where the type 2 sheet and the type 1 sheet stack are glued (see FIGS. 30A and 30B, for example).

Also, the greater the total number of type 1 sheets used in a single job (i.e., the value of N described with reference to FIGS. 36 through 38), the greater the thickness of the type 1 sheet stack is. Conversely, the smaller the total number of type 1 sheets used in a single job (i.e., the value of N described with reference to FIGS. 36 through 38), the smaller the thickness of the type 1 sheet stack is.

This means that a very small thickness of the type 1 sheet stack, i.e., a very small spine region, results in a very small region for gluing the type 2 sheet to the type 1 sheet stack. A smaller region for gluing the type 2 sheet to the type 1 sheet stack means that the percentage of the gluing region as to the other regions of the sheets is small, which directly reduces how strongly the type 2 sheet can be glued to the type 1 sheet stack, and may result in the glued sheets falling apart.

Even if such a problem does not occur, the following problem may. In order to obtain the final printed article regarding which the case binding process has been performed, such as shown to the right in FIG. 8A and in FIGS. 25A through 29D, gluing of the type 2 sheet to the type 1 sheet stack at the gluing unit 300 of the sheet processing device 230 is performed, following which the type 2 sheet needs to be folded over so as to cover the type 1 sheets by the sheet processing device 230. In the event that the number of type 1 sheets is too small in the process of folding the cover sheet against the sheet stack in the case binding process (i.e., the thickness of the first sheet stack is small), the type 2 sheet which is equivalent to the cover may become wrinkled or damaged.

Other problems besides these may be conceived as well. In any case, the present embodiment takes note that the output results which the user desires may not be obtainable in the event that the number of type 1 sheets is too small.

It is in light of the above problems which may occur, that the control described as Case 1 in FIG. 37 and Cases 1, 8, and 15 in FIG. 38, has been provided with the present embodiment, to proactively avoid these problems.

That is, a minimum line is set beforehand regarding the total number of sheets necessary for the job to be processed, as a condition for permitting execution of the case binding process. This is referred to in several ways in the present description, such as the "minimum allowable number of sheets" in the sheet gluing mode, or as the "minimum number of sheets", "first threshold value", "lower limit", or "second predetermined number of sheets. For example, with the example given in FIG. 37, a value equivalent to "10 sheets" is the first threshold value.

Also, in cases wherein consideration is given to the media type of the sheets to be printed on at the printer unit 2, as with the example shown in FIG. 38, a first threshold value is set for each media type usable with the present system 1000.

For example, with the example given in FIG. 38, a value equivalent to "10 sheets" is the first threshold value, in the case of processing a job of a first media type. In the case of processing a job of a second media type, a value equivalent to "8 sheets" is the first threshold value. Further, in the case of processing a job of a third media type, a value equivalent to "5 sheets" is the first threshold value.

Also, as described earlier, with the present embodiment, determination made based on the first threshold value is executed with regard to the case binding job by the CPU circuit unit 122, for example. However, the CPU circuit unit 122 does not apply determination based on the first threshold value for pad binding jobs.

The reason is that there is no gluing of a type 2 sheet to a type 1 sheet stack with the pad binding mode, i.e., the problem assumed in the case binding job cannot occur. This is another feature of the present embodiment.

On the other hand, determining based on the second threshold value is executed by the CPU circuit unit 122 for both cases of determination for a job regarding which the case binding mode has been selected, and of determination for a job regarding which the pad binding mode has been selected. Thus, the second threshold value is a condition for permitting execution of the case binding process, and also is a condition for permitting execution of the pad binding process. In the event that the value of the total number of sheets necessary for a job to be processed exceeds this second threshold value, execution of the case binding mode is inhibited, and execution of the pad binding mode is also inhibited.

This second threshold value is referred to in several ways in the present description, such as the "maximum allowable number of sheets" in the sheet gluing mode, or as the "maximum number of sheets", "upper limit", or "first predetermined number of sheets". For example, with the example given in FIG. 37, a value equivalent to "150 sheets" is the second threshold value.

Also, in cases wherein consideration is given to the media type of the sheets to be printed on at the printer unit 2, as with the example shown in FIG. 38, a second threshold value is set for each media type usable with the present system 1000.

For example, with the example given in FIG. 38, a value equivalent to "150 sheets" is the second threshold value, in the case of processing a job of a first media type. In the case of processing a job of a second media type, a value equivalent to "100 sheets" is the second threshold value. Further, in the case of processing a job of a third media type, a value equivalent to "75 sheets" is the second threshold value.

The reason that such control based on the second threshold value is carried out is due to mechanical configuration considerations of the system 1000, for example. This particularly takes into consideration the processing capabilities of the sheet processing device 230, for example.

Also, with the present embodiment, regardless of whether a case of not taking the media type into consideration as with the example in FIG. 37 as described above, or a case of taking the media type into consideration as with the example in FIG. 38, the first threshold value and the second threshold value may be arranged so as to be changeable, either manually by the user, or automatically under control of the CPU circuit unit 122 without user instructions.

The first threshold value (second predetermined number of sheets) and the second (first predetermined number of sheets) are particularly dependent on the processing capabilities of the sheet processing device 230, for example. Now, the sheet processing device 230 is configured as a detachable option to the image forming apparatus main unit.

Accordingly, a configuration may be made wherein the above values can be optionally changed by a particular user such as a manager or the like, using a manager's settings screen (not shown) displayed on the display unit 4-250 of the operating unit 123, taking into consideration the possibility that a sheet processing device having different processing capabilities from the sheet processing device 230 may be connected to the image forming apparatus main unit.

Further, an arrangement may be made wherein the CPU circuit unit 122 obtains device information from a sheet processing device newly connected to the image forming apparatus main unit, i.e., when transition is made from a state wherein there is no sheet processing device connected to the image forming apparatus main unit, to a state wherein there the sheet processing device has been connected to the image forming apparatus main unit. The CPU circuit unit 122 then can automatically change the above threshold values on its own judgment, so as to have the setting values suitable for the sheet processing device, based on the obtained processing capability information of the sheet processing device.

Also, note that of the above two types of threshold values, the first threshold value can be considered to be a static determination factor, based on appearance of the printed article and on user advantages, rather than a dynamic determination factor. Accordingly, an arrangement may be made wherein, with arrangements enabling automatic changing of settings by the CPU circuit unit 122 or enabling manual changing of the settings, regarding the threshold values, only the second threshold value is permitted to be changed, and changing the settings of the first threshold value is inhibited, so that the first threshold value is a fixed value.

It should be further noted that the present embodiment is not limited to a simple gluing process for printed sheets at the system 1000, and that various ingenious designs have been made taking into consideration circumstances regarding the device, the demands of the user, the environment in which the system is used, usage cases, and so forth. The control described next can also be executed on the system 1000 so as to exhibit such advantages, for example.

With the image forming system 1000 according to the present embodiment, in the event of performing the case binding process, the CPU circuit unit 122 also performs control relating to the sheets (type 1 sheets and type 2 sheet) themselves to be used for the case binding job.

For example, let us say that the user selects A4 size sheets (the length of the sheet in the conveyance direction is 210 mm, and the length in the direction perpendicular to the conveyance direction is 297 mm) as the text sheets (type 1 sheets) in the case binding mode. In this case, the case binding cover sheet, for binding the A4 size text sheets is preferably an "A3 oversize" sheet (the length of the sheet in the conveyance direction is 483 mm, and the length in the direction perpendicular to the conveyance direction is 329 mm) or the like. At least, a sheet of a size greater than an A3 size sheet (the length of the sheet in the conveyance direction is 420 mm, and the length in the direction perpendicular to the conveyance direction is 297 mm) is preferably used.

Or, at the very least, a sheet is preferably selected which has length in the direction perpendicular to the conveyance direction of 297 mm, and length in the conveyance direction of [(210 mm×2)+a length equal to the thickness of the text sheet stack (equivalent to the thickness of each text sheet multiplied by the total number of text sheets)] mm. This is due to the particular circumstances unique to case binding.

Based on such a perspective, the CPU circuit unit 122 controls the present system in the case binding mode, taking into consideration not only the size information of the text sheets (equivalent to type 1 sheets) themselves to be used in the job to be processed (in the case described above, A4 size sheets, i.e., 210 mm×297 mm) for using a cover sheet (type 2 sheet), but also takes into consideration the spine portion of the text sheet stack of the job (equivalent to the type 1 sheet stack), i.e., thickness information, to select the size of the sheet.

Due to such a configuration, trouble such as the text sheets protruding out from the cover after case binding the text sheets with the cover can be avoided. Thus, a printed article wherein the text sheets are suitably covered by the cover sheet can be created, as shown in FIG. 8A.

Now, even in the event that the size of the cover and text do not match in the case binding process performed, the CPU circuit unit 122 can effect control so as to execute the following processing with the sheet processing device 230, whereby creating unsuitable output articles can be prevented.

For example, the CPU circuit unit 122 effects control such that, following gluing the cover sheet (equivalent to the type 2 sheet) to the text sheet stack (equivalent to the type 1 sheet stack), and folding the cover sheet over, three-way trimming is performed on the sheet stack which has been subjected to the folding process, by a trimmer unit 24 of the sheet processing device 230. This three-way trimming process is a task for trimming three sides of the sheet edges, i.e., of the four edges (top, bottom, left, right), the three that are not the spine portion of the case-bound article, by a predetermined length.

For example, the case-bound output article shown to the right in FIG. 8A will be described in an erected state. Description will also be made with reference to FIGS. 24A, 25A, and others.

The edge of these case-bound printed articles which serves as the spine is the left edge. Of course, the remaining three edges are the top, right, and bottom. The process for trimming the three edges other than the spine portion by a predetermined length from the edge is referred to as "three-way trimming".

The CPU circuit unit 122 controls the trimmer unit 247 such that this sort of three-way trimming is executed on the sheet stack following the above sheet folding process, in response to a processing condition relating to the trimming process having been set by the user. Of course, the trimming processing may be made to be controlled so as to be executed automatically by the user selecting the case binding mode, even without explicit instructions for the trimming process being input from the user.

The above processing is executed for case binding jobs. Accordingly, even in the event that the cover and the text sheets are mismatched, a case-bound article with the sheet edges neatly aligned can be obtained.

Next, description will be made regarding the pad binding process, which is another type of a glue-binding process which can be executed on the image forming apparatus 1000 according to the present embodiment, that is different from the above-described case binding process.

Now, a description will be made regarding an example of the procedures for carrying out the pad binding process. In this case as well, description of the series of procedures will be made with the understanding that the data for the job to be processed originates at the reader unit 1 of the image forming apparatus itself, with the pad binding process being performed on the sheets printed in the printing process, at the sheet processing device 230.

First, in the event that the user selects the "Binding" mode by pressing the corresponding key 801 on the screen (a) displayed on the display unit 4-250 of the operating unit 123 shown in FIG. 6A, inputs instructions for "glue-binding" by the key 803 shown in FIG. 6C, but the user has not made cover setting with the screen (f) in FIG. 7C, i.e., in the event that the user has made no instructions to attach a cover to the sheets on which are printed the text data, the CPU circuit unit 122 determines that the job to be processed is a pad binding process job.

Let us say that setting of each of the printing process conditions for the job to be processed as described above has been completed, and that further, the user has then pressed the start key 4-242 on the operating unit 123 shown in FIG. 4. The CPU circuit unit 122 at this point determines that there has been input of a job process start request. Based on the instructions from the user, the document stack already loaded on the original document feeding device 101 by the user is fed to the reading position on the platen glass of the reader unit 1, one sheet at a time, in order from the first sheet, and the CPU circuit unit 122 controls the reader unit 1 so as to execute the reading process of the originals of the job. Further, the CPU circuit unit 122 controls the image memory 120 and so forth so as to sequentially store this read data as text image data for the pad binding process in the hard disk of the image memory 120.

The results of printing the stored data is equivalent to the both-sided text printing for example, like the sheets shown in FIG. 8B, which are a product of both-sided printing. However, it should be noted that both-sided printing is not a prerequisite for the pad binding process. There are a wide range of user needs, and while many users might want to have the text portion of the product to be printed on both sides, there will also be users who want the text portion of the product to be printed on just one side of the sheets. Accordingly, an arrangement may be made wherein, with the present system 1000, the user himself/herself can select whether to print the sheets (equivalent to type 1 sheets), upon which the text image data is to be printed, on one side or on both sides, when performing pad binding, using the key 4-258 shown in FIG. 4.

Also, in the above case-binding mode, there are cases wherein both-sided printing on the type 2 sheet is inhibited. However, even in a case wherein both-sided printing on the type 2 sheet has been inhibited, both-sided printing on the job sheets for the pad binding process is controlled so as to be permitted. Upon instruction from the user, both-sided printing on the sheets of the job to be processed in the pad binding mode is controlled so as to be executable.

The CPU circuit unit 122 executes the original document reading action with the reader unit 1, and at the same time, gets the number of print data pages of the pad binding process job from a document counter, thereby obtaining total page number information for the job. On the other hand, the CPU circuit unit 122 checks the print processing conditions set for the job by the user for whether there are any job processing conditions set which would affect the number of printed faces of the output sheets, such as both-sided printing settings, single-sided printing settings, reduced layout settings, and so forth. The CPU circuit unit 122 then calculates the total number of sheets to be used for the pad binding process job, based upon these various kinds of determination resources. This process is equivalent to the processing of step S9-3 in the later-described FIGS. 13, 15, and 16.

In the case of the pad binding mode as well, the CPU circuit unit 122 uses the same processing as that described with reference to FIG. 36 to calculate the total number of sheets N.

The CPU circuit unit 122 then performs a comparison process between the total number of sheets to be used for the pad binding job and a predetermined processing sheets number, to determine whether the job to be processed meets a predetermined condition. In the event that the job is a job which meets the predetermined condition, the CPU circuit unit 122 effects control so as to permit execution of the pad binding process on the sheets of the job. On the other hand, in the event that the job is not a job which meets the predetermined condition, the CPU circuit unit 122 effects control so as to inhibit execution of the pad binding process on the sheets of the job.

Examples of performing control to determine whether or not to execute the pad binding mode according to the present embodiment, without taking into consideration the media type of the sheets used for the job to be processed, involve the CPU circuit unit 122 executing the control of the Cases 4 and 5 shown in FIG. 37.

Examples of performing control to determine whether or not to execute the pad binding mode according to the present embodiment, while taking into consideration the media type of the sheets used for the job to be processed, involve the CPU circuit unit 122 executing the control of the Cases 4, 5, 11, 12, 18, and 19 shown in FIG. 38.

Once performing of the pad binding process has been permitted, the image data for the text of the job to be processed, stored in the hard disk of the image memory 120, is printed from the printer unit 2. Then, the gluing process is performed, by the gluing unit 300 which the sheet processing unit 230 has, at the portion of the sheet stack upon which the text data has been printed corresponding to the spine.

Subsequently, unlike the case binding process, there is no feeding of a cover, gluing of a cover sheet to the text sheets, or covering task; control is effected such that the sheet stack upon which the text images have been printed and the spine portion subjected to the gluing process is discharged by a discharge roller onto the stacking tray of the sheet processing device 230, as the sheet stack of the job regarding which pad binding has been completed. Thus, the final pad-bound printed article such as shown to the right in FIG. 8B is obtained.

As can be seen from FIG. 8B, there is no need to provide a cover with pad binding. That is to say, there is no need for an operation to stick a cover to the body sheets with the pad binding process. Accordingly, there is no problem of insufficient thickness of the sheet stack of the body sheets. This means that problems which could occur with the case binding process, such as the type 2 sheet coming loose from the type 1 sheet stack, the cover being wrinkled or damaged, and so forth, cannot occur with the pad binding process. The present embodiment also takes note of these points.

Based on this perspective, job processing which is different and independent from the job processing in the case binding process described above is executed by the CPU circuit unit 122 in the pad binding process.

For example, in the case binding mode, the "first threshold value" is set beforehand, regardless of whether the media type of the sheets to be printed on by the printer unit 2 is to be taken into consideration. In the event that the total number of sheets N necessary for the job to be processed is smaller than the first threshold value, the case binding process is inhibited.

However, with the present embodiment, control not based on such a first threshold value is executed by the CPU circuit unit 122. That is to say, control is effected to permit the pad binding process even in the event that the total number of sheets necessary for the pad binding job is smaller than the first threshold value, for example. This has already been described by way of the comparative description between Case 5 and Case 3 in FIG. 37, the comparative description between Case 5 and Case 3 in FIG. 38, the comparative description between Case 12 and Case 10 in FIG. 38, and the comparative description between Case 19 and Case 17 in FIG. 38.

In this way, the present embodiment assumes a wide range of scenarios, and various ingenious designs have been made, keeping in mind the realization of an image forming system such as a digital printing system having: a digital image forming apparatus which enables printing print data of various jobs input from scanners and networks, by means of large-capacity memory such as a hard disk; and a sheet processing device capable of executing at least a sheet gluing process on sheets conveyed from the image forming apparatus.

Thus, an apparatus or system can be actually realized wherein conventionally-expected problems do not occur, and which flexibly meets various user demands from various user including the sheet gluing process in a digital printing environment, as a user-friendly and handy apparatus or system.

Now, each of the first through third embodiments execute various types of control regarding the sheet gluing process, whereby the above-described advantages can be had. However, the present invention is not restricted to executing all of such control. The reason is that an arrangement which is capable of executing even one of the various types of control regarding the sheet gluing process is better and more advantageous than conventionally-expected apparatuses and systems, yielding improved ease-of use and advantages. Accordingly, any arrangement which can execute any one of the various types of control regarding the sheet gluing process is encompassed within the present invention.

As described above, the present embodiment also executes control regarding the sheet itself to be used for a job to be processed in the event of performing the sheet gluing process. This point will be described with reference to FIGS. 6A through 7D and FIG. 18.

For example, upon the user pressing the glue-binding key 803 on the settings screen (c) in FIG. 6C and then pressing the "OK" key, the CPU circuit unit 122 detects the user operations, and displays a sheet selection screen (d) shown in FIG. 7A (a sheet selection screen for selecting text sheets in the gluing process mode) on the liquid crystal display unit 4-250.

Upon the key 803 having been pressed in the screen (c) in FIG. 6C, let us say that the glue-binding process has been set by the user as the processing condition for the job to be processed, as sheet processing for sheets upon which printing has been performed in the image forming apparatus (also called "post-processing" or "finishing").

In the event that the job to be processed is a glue-binding process job like this, the CPU circuit unit 122 effects control so as to restrict sheet candidates from which the user is permitted to make a selection for text sheets (equivalent to the type 1 sheet upon which the text images are formed) in the glue-binding process job.

For example, let us say that there are a total of N types of candidates of sheets upon which images can be formed with the image forming apparatus according to the present embodiment, and that there are a total of N types of candidates for sheet processes which can be executed at the sheet processing device 230 (binding device). In this case, the CPU circuit unit 122 creates and stores a management table 1800 such as shown in FIG. 18, in the internal hard disk of the image memory 120 of the image forming apparatus according to the present embodiment.

The management table 1800 stores management information stipulating restriction items (rules) for restricting sheet candidates regarding which usage for a job to be processed is to be permitted, for each of the multiple types of sheets of the sheet processing device 230. The restriction item information stipulated in the management table 1800 is stored in the hard disk of the image memory 120 which the system 1000 has, as with the management table 3700 in FIG. 37 and the management table 3800 in FIG. 38.

The CPU circuit unit 122 manages the candidates for sheets which the user can select for the job to be processed, separately for each sheet process of the multiple sheet processes which the sheet processing device 230 of the system 1000 can execute, based on the management information in the management table 1800.

With such a configuration, the CPU circuit unit 122 performs the following control based on the management information in the management table 1800 shown in FIG. 18. Here, an example will be described specially for the case binding process and the pad binding process, of the many types of sheet processing which the sheet processing device 230 can perform.

Now, let us say that the user has selected the case binding mode, which is a type of glue-binding process, as a processing condition for the job to be processed. In this case, the CPU circuit unit 122 effects control so that the sheets regarding which the user is permitted to select from as the text sheets in the case binding job are "A4, LTR (letter), A5R, STMT-R, and B5", based on the rules stipulated in the management table 1800. These can be found in the table in FIG. 18, as the five sheet candidates for text sheets in both the case binding mode and pad binding mode, marked with a circle, indicating that these are available to that end. In the present embodiment, display control is performed at the display unit 4-250 of the operating unit such that the user is capable of selecting a text sheet (type 1 sheet) for the case binding process from these candidates which are the object of selection.

Also, based on the information of the management table 1800, the CPU circuit unit 122 excludes the "A5, A3, LGL (legal), 11×17 (ledger), A4R, LTR-R (letter-R), B4, and A3 oversize" as candidates for the text sheet (type 1 sheet) for the case binding process. These can be found in the table in FIG. 18, as the eight sheets which are candidates for text sheets neither in the case binding mode nor the pad binding mode, marked with an X, indicating that these are not available to that end. Control is effected so as to inhibit printing of the text image data of the case binding job on the sheets which fall under this category.

With the present embodiment, selection by the user of these selection-inhibited sheets as text sheets in the case binding mode is in itself inhibited, in order to proactively avid erroneous operations by the user. For example, display control is made at the display unit of the operating unit 123, such that the user is not capable of selecting any of these selection-inhibited sheets. An example is for the CPU circuit unit 122 to effect control so as to display an operating screen on the display unit 4-250 such as the screen (d) shown in FIG. 7A, based on the management information in the management table 1800 shown in FIG. 18.

In the display screen (d) in FIG. 7A, a guidance display is made so as to notify the user that the recording sheet sizes which can be selected as the body sheets (text), equivalent to the sheets for printing the text image data in the glue-binding processing mode, are "A4 oversize, A4, B5, A5R, LTR, and STMT-R". The CPU circuit unit 122 also controls the operating unit 123 so as to enable the user to select, using the screen (d) shown in FIG. 7A, a desired sheet from the selection candidates regarding which use as the text sheet (type 1 sheet) is permitted in the glue-binding mode (at least five candidates based on the management table 1800 shown in FIG. 18 in this example). For example, a configuration may be made wherein the display unit 4-250 is controlled so as to display buttons for selecting the selection candidate sheets, on the display screen.

Describing this with the example of the management table 1800 shown in FIG. 18, a sheet selection key for selecting A4 oversize sheets, a sheet selection key for selecting A4 sheets, a sheet selection key for selecting B5 sheets, a sheet selection key for selecting A5R sheets, a sheet selection key for selecting LTR sheets, and a sheet selection key for selecting STMT-R sheets, are displayed on the screen (d) shown in FIG. 7A. The user can use these sheet selection keys to select a desired sheet to use for the type 1 sheet.

Conversely, this means that the CPU circuit unit 122 controls the operating unit 123 so as to inhibit user selection of the sheets regarding which use as the text sheet (type 1 sheet) is inhibited (in this case, at least eight types of sheets, based on the management table 1800 shown in FIG. 18).

For example, the display unit 4-250 may be controlled so as to not display at all the sheet selecting keys for selecting the sheets regarding which selection as the type 1 sheet has been inhibited (eight in this case), or, the display unit 4-250 may be controlled so as to display these keys, either grayed out or hatched. Either way, the user cannot select these sheets excluded from selection.

In the example shown in FIG. 7A, the CPU circuit unit 122 has detected that A4 size sheets currently exist on the three sheet feeding cassettes of the image forming apparatus, based on information from the sheet presence sensors of the sheet feeding cassettes, and the results thereof have been reflected in the display screen.

In this case, control is effected such that the user can select one of the first through third sheet feeding cassettes to set A4 sheets as the text sheet in the gluing process mode.

Of course, in the state shown in FIG. 7A, the user would be able to set any of the above five selectable candidates (A4 sheets, B5 sheets, LTR sheets, and STMT-R sheets) in the manual feed tray 227 of the image forming apparatus, and select the manual feed tray 227 from the screen (d). Thus, the user can select a desired candidates form the sheet candidates regarding which selection is permitted.

Note that with the present embodiment, the candidates which can be selected by the user for the text sheets (also referred to as "body sheets" or type 1 sheets" here) are common (the same) for both the case wherein the case binding mode has been selected by the user and the case wherein the pad binding mode has been selected by the user, as can be seen by referencing the management information stipulated in the management table 1800 in FIG. 18. However, there is no particular need for an arrangement wherein the text sheets (body sheets) are the same for both the case binding mode and the pad binding mode, as in FIG. 18.

Still, the CPU circuit unit 122 effects control so as to inhibit using large-size sheets such as the sheets regarding which use as text sheets (equivalent to type 1 sheets) in the management table 1800 in FIG. 18 (i.e., the sheets marked with an X in the management table 1800 in FIG. 18) even in the event that either binding mode has been selected.

This control is in light of mechanical considerations of the device itself, since in the event that an image forming system capable of the gluing process but having a small size is realized, large-size sheets would not be able to be glued, and so forth. At the very least, the above control is made giving consideration to the user, in light of market demands expected with the conventional art.

This will be described with reference to, for example, FIGS. 8A, 8B, 24A, 25A, and 26A. Printed products which are the final result of the gluing process would mostly be user manual, guidebooks, and so forth. That is to say, it can be expected that the final output format of glue-bound printed articles would be small-sized, such as A4 size or smaller.

It should be added that while the present embodiment enables selection of large-size sheets such as A3 size to be fed as the cover in the case binding mode, the sheet to serve as the cover in the case binding mode (equivalent to the type 2 sheet) is folded so as to cover the text sheets following the gluing process by the gluing unit 300. That is to say, the final size of the printed article created in the case-binding mode is generally the same size for both the case binding mode and the pad binding mode even though such a large-size sheet is fed for the cover, as can be understood by comparing the right sides of FIGS. 8A and 8B. That is to say, the final size of both case-bound printed articles and pad-bound printed articles is a small size, such as the A4 size.

Based on such a perspective, and based on understanding of market demand, there would be very little use for an arrangement wherein the user would use large-size sheets as the text sheets which would result in a large-size final printed article in the glue binding process. Even in the event that the user specifies a large-size sheet form the operating unit to be used as the text sheets, the probability that the user has made an error is overwhelmingly high. This is why the above-described control is used, as consideration for the user.

As described above, according to the present embodiment, the CPU circuit unit 122 effects control such that only sheets which can be glue-bound are selectable, in response to user settings made in a case wherein the user has instructed the glue-binding mode (i.e., effects control such that large-size sheets which cannot serve as body sheets cannot be selected). That is to say, the CPU circuit unit 122 effects control such that only cassettes containing recording sheets of sizes which can be selected as body sheets can be selected, and the user can select a desired cassette from these cassettes.

This allows problems expected with the conventional art to be proactively avoided, and situations to be prevented wherein a user might have a false impression that large-size binding wherein the final results would be a large-size bound printed article, such as an A3-sized printed article, could be made, and specify printing and binding to large-sized sheets.

The above-described example is control relating to selection processing of text sheets wherein the glue-binding process has been selected for either case binding or pad binding. As can be understood by making reference to the management information in the management table 1800, this control is executed for both the case of processing a case binding job and the case of processing a pad binding job.

Further, with the present embodiment, the CPU circuit unit 122 executes the control regarding the text sheet (i.e., the type 1 sheets) selection process for the case binding mode, and also executes the control regarding the case binding cover sheet (i.e., the type 2 sheet) selection process.

As described above, the final printed product which has been subjected to the gluing process is a small size, even though a large-size sheet has been used for the cover.

Now, let us compare the text sheets (type 1 sheets) shown to the left side in FIG. 8A with the case binding cover sheet (type 2 sheet) shown at the middle of FIG. 8A. The size of the type 1 sheet is the same in comparison between the state before the case-binding process (see the left side of FIG. 8A) and the state after the case-binding process by which the final completed printing article is obtained (see the right side of FIG.

8A), although there will be slight reduction in the size if three-way trimming is performed.

On the other hand, the type 2 sheet is folded over so as to cover the type 1 sheet stack in the event of the case binding process, meaning that the state of the sheet before performing the case binding process is that such as shown in FIGS. 30A and 30B. Accordingly, since the size of the type 2 sheet is that such as shown to the right in FIG. 8A in the final completed state of the printed article, a sheet having a size prior to the case binding process capable of covering the text sheet stack is necessary.

Accordingly, with the present embodiment, the CPU circuit unit 122 performs the following control as control relating to the selection processing of the type 2 sheet in the case binding mode, for example.

For example, the CPU circuit unit 122 restricts the candidates for sheets which can be selected by the user as case binding cover sheets (type 2 sheets) for the case binding process, based on the restriction items described in the management table in FIG. 18 as described above.

For example, the CPU circuit unit 122 permits the user to select the sheet candidates "A3 oversize, A3, B4, A4R, 11×17, LGL, and LTR-R" (the candidates for case binding cover sheets in the case binding mode, marked with a circle in the table in FIG. 18, indicating that these are available to that end), as case binding cover sheets (type 2 sheets) in the case binding mode, based on the restriction information described in the management table 1800 shown in FIG. 18. The user selects one desired size sheet from the selectable candidates, from the screen (d) such as shown in FIG. 7A displayed on the display unit 4-250 for this purpose, for example.

Also, the CPU circuit unit 122 inhibits the user from selecting sheets other than the above sheet candidates, such as "A5, A4, LTR, A5R, B5, and STMT-R" (the sheets regarding which use as case binding cover sheets in the case binding mode is inhibited, marked with an X in the table in FIG. 18, indicating that these are not available to that end), as case binding cover sheets (type 2 sheets) in the case binding mode, based on the restriction information described in the management table 1800 shown in FIG. 18. Accordingly, the CPU circuit unit 122 controls the display unit 4-250 such that the keys for these sheets are either not displayed at all, or displayed grayed out or hatched on the display screen (d) in FIG. 7A for example, so that the user cannot select sheets of this group regarding which selection is inhibited.

The information of the management table 1800 shown in FIG. 18 is stored beforehand in the hard disk of the image memory 120, as management information stipulating restriction items (rules) for restricting sheet candidates regarding which usage for a job to be processed is to be permitted, for each of the multiple types of sheets of the sheet processing device 230, as with the management information relating to the restriction items in FIGS. 20, 37, and 38.

As described above, with the present embodiment, control is made so as to restrict the sheets which can be used in sheet glue binding, upon the user selecting a glue-binding mode such as the case binding mode or the pad binding mode. Based on the restriction item information such as described in the management table shown in FIG. 18, control is effected so as to inhibit use of predetermined sheets in the case of performing job processing regarding which the sheet gluing process mode has been selected.

Now, with the present embodiment, the management information in FIG. 18 for example is for enabling the CPU circuit unit 122 to execute exclusion control between selection of a sheet processing for a job to be processed, and selection of sheets to be used for the job to be processed. Accordingly, the management information in FIG. 18 can be used to carry out the following control, for example.

Let us say that in a state wherein the screen shown in FIG. 4 is displayed on the display unit 4-250, the user has not set any printing conditions as of yet. FIG. 4 illustrates the initial screen. This means that the user has not selected any of the multiple sheet processing modes which can be carried out by the sheet processing device 230.

Now, let us say that the user has pressed the sheet selection key 4-252 on the screen in FIG. 4 in this state. Upon receiving this, the CPU circuit unit 122 displays, on the display unit 4-250, candidates of sheets which can be used in the job to be processed, and also displays a sheet display screen (unshown) for enabling the user to select a desired sheet size from the candidates.

Thus, in the event that the user has instructed a sheet selection request in the state that the sheet processing mode has not be selected by the user, the CPU circuit unit 122 views all of the sheet selection candidates (A5 through sheet N) listed to the left of the management table 1800 in FIG. 18 as being candidates from which selection can be permitted. The operating unit 123 is then controlled such that the user can select the desired candidate from these candidates through the unshown sheet selection screen.

Now, let us say that the user has selected the A5 size sheet in the unshown sheet selection screen displayed on the display unit 4-250. In this case, the CPU circuit unit 122 checks the management table 1800 in shown FIG. 18 for sheet processing modes regarding which execution should be inhibited in the job to be processed, in accordance with the user having selected the A5 size sheet. Consequently, execution of the case binding mode, pad binding mode, saddle-stitching mode, and punching process mode is inhibited for the job to be processed, while execution of the stapling mode is permitted. Display control of the display unit 4-250 is performed based on the determination results thereof, and the sheet processing modes which the user can select are restricted accordingly.

Figure 19:
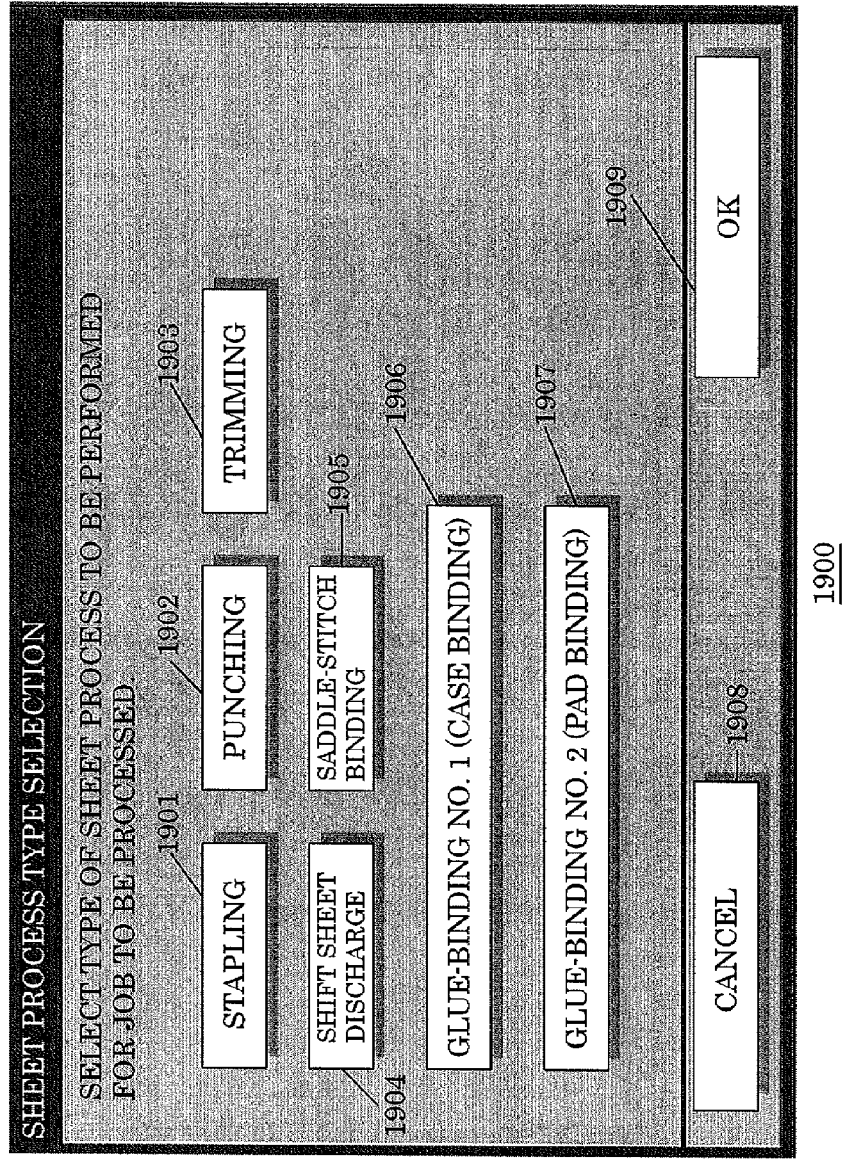
FIG. 19 is a diagram illustrating an example of a user interface screen to be controlled with the embodiment.

For example, in the event that the user selects the A5 size sheet as described above, and the presses the sorter key 4-256 on the display screen in FIG. 4, a sheet processing mode selection screen such as shown in FIG. 19 is displayed on the display unit 4-250. However, control is effected such that the five sheet processing modes which are excluded from being candidates in the event that the A5 sheet size has been selected cannot be selected by the user in the sheet processing mode selection screen. In this example, the CPU circuit unit 122 effects control such that the case binding mode key 1906, the pad binding mode key 1907, the saddle-stitching mode key 1905, and the punching process mode key 1902 are all grayed out or hatched, so as to disable selection of these modes by the user.

Thus, with the present embodiment, the CPU circuit unit 122 for example makes reference to the restriction item information of the management table 1800 in FIG. 18, and upon determining that a sheet selected by the user is a sheet of a predetermined size regarding which selection is to be excluded for the sheet gluing process mode of interest in the present embodiment, control is effected so as to inhibit both selection and execution of the sheet gluing process mode.

On the other hand, let us say that the user has selected the A4 size in the unshown sheet selection screen displayed on the display unit 4-250. In this case, the CPU circuit unit 122 effects control based on the information of the management table 1800 in FIG. 18, such that the case binding mode and pad binding mode for example, are permitted as processing for the job to be processed. Display control of the display unit 4-250 is performed based on the determination results thereof, and the sheet processing modes which the user can select are restricted accordingly.

For example, in the event that the user selects the A4 size sheet as described above, and the presses the sorter key 4-256 on the display screen in FIG. 4, a sheet processing mode selection screen such as shown in FIG. 19 is displayed on the display unit 4-250. In this example, the CPU circuit unit 122 effects control such that the case binding mode key 1906 and the pad binding mode key 1907 are displayed as valid selections on the screen in FIG. 19, based on the information in the table 1800, so that the user can select the desired glue-binding mode from these two glue-binding modes.

Thus, with the present embodiment, the CPU circuit unit 122 for example makes reference to the restriction item information of the management table 1800 in FIG. 18, and upon determining that a sheet selected by the user is a sheet of a predetermined size regarding which selection is to be enabled for the sheet gluing process mode of interest in the present embodiment, control is effected so as to permit both selection and execution of the sheet gluing process mode. Due to such a configuration, the above-described advantages regarding the sheet gluing process can be obtained with improved user operability, yielding even greater advantages.

Now, let us return to the description at the point that the display screen (d) shown in FIG. 7A has been displayed on the display unit 4-250. Note that this is a screen displayed on the display unit 4-250, in accordance with the user having selected the sheet gluing process mode, by pressing the key 803 in the screen (c) shown in FIG. 6C.

The key 805 displayed on the screen (d) shown in FIG. 7A, which the CPU circuit unit 122 displays on the display unit 4-250, is a key for enabling the user to set the cover in the glue-binding process mode. The user can use the key 805 to decide whether or not to attach a cover to the text sheets on which are to be printed the text image data, in the glue-binding process mode.

Now, in the event that the user has pressed the key 805 and then has pressed the "Next" key on the display screen (d) shown in FIG. 7A, the CPU circuit unit 122 effects control so as to attach a cover in the glue-binding process mode. That is to say, as described earlier with reference to FIG. 8A, the case binding mode, which is a type of glue-binding process mode, is set for the job to be processed.

On the other hand, in the event that the user has not pressed the key 805 but has pressed the "Next" key on the display screen (d) shown in FIG. 7A, the CPU circuit unit 122 effects control so as to inhibit attaching a cover in the glue-binding process mode. That is to say, as described earlier with reference to FIG. 8B, the pad binding mode, which is a type of glue-binding process mode, is set for the job to be processed.

In this way, with the present embodiment, in the event that the user makes settings for attaching a cover using the key 805 in the glue-binding mode settings, the CPU circuit unit 122 determines that the job to be processed is a job which is to be processed in the case binding mode. On the other hand, in the event that the user does not make settings for attaching a cover using the key 805 in the glue-binding mode settings, the CPU circuit unit 122 determines that the job to be processed is a job which is to be processed in the pad binding mode.

Thus, the present embodiment uses the above-described method so as to effect control by the CPU circuit unit 122 such that the user can select from the operating unit 123 whether to set the case binding mode or the pad binding mode for the job to be processed. However, the following method may be used instead to enable the user to select whether to set the case binding mode or the pad binding mode for the job to be processed.

For example, the key 4-256 in the operating screen shown in FIG. 4 is an instruction key for allowing the user to set the type of sheet processing to be executed, in the event that sheet processing is to be performed on the job to be processed at the sheet processing device (binding device) 230. In response to the user pressing the key 4-256 on the screen in FIG. 4, the CPU circuit unit 122 effects control so as to display the settings screen having the keys 1901 through 1909 and so forth such as shown in FIG. 19, for example, on the display unit 4-250.

The screen 1900 shown in FIG. 19 is a display screen enabling the user himself/herself to select the sheet processing to be executed by the sheet processing device 230 on the job to be processed.

In the event that the user presses the key 1906 on the screen 1900, the case binding mode is selected. In the event that the user presses the key 1907 on the screen 1900, the pad binding mode is selected. Thus, this sort of direct selection method may also be used for the user to select the desired glue-binding mode from the two glue-binding modes, i.e., the case binding mode and the pad binding mode.

In any case, the present embodiment is applicable to any configuration whereby the user can execute the desired glue-binding mode, regardless of the method.

In the event that the user has selected the case binding mode by pressing the key 1906 from the screen 1900 shown in FIG. 19, the CPU circuit unit 122 controls the display unit 4-250 so as to enable transition from the screen 1900 to the display screens (d) through (f), shown in FIGS. 7A through 7C.

In the screen (d) shown in FIG. 7A and other screens, the user can select the sheet to be used as the text sheets for the job to be processed in the case binding mode.

Also, in the screen (f) shown in FIG. 7C and other screens, the user can select the sheet to be used as the cover for the case binding mode. The control relating to the series of printing processes regarding the type 2 sheet has already been described in detail with reference to FIGS. 24A through 35B, and accordingly, description will be omitted here.

On the other hand, in the event that the user has selected the pad binding mode by pressing the key 1907 from the screen 1900 shown in FIG. 19, the CPU circuit unit 122 controls the display unit 4-250 so as to enable transition from the screen 1900 to the display screen (d), shown in FIG. 7A. In the screen (d) shown in FIG. 7A and other screens, the user can select the sheet to be used as the text sheets for the job to be processed in the pad binding mode.

Note that in the event that the user has selected the pad binding mode, there is no need to select a cover sheet. Accordingly, the display unit 4-250 may be controlled so as to inhibit display of the settings screen (f) while the user is setting the printing conditions of the job to be processed, with the printer unit 2 being controlled so as to inhibit selection of case binding cover sheets for the job regarding which the case binding mode has been selected.

Performing various types of control including such display control prevents beforehand erroneous operations of the apparatus, such as a case binding sheet being inserted or glued as an output sheet for a job in the pad binding mode. Moreover, user error such as erroneously making case binding sheet selection settings for a pad binding job at the operating unit 123 for example, and also be prevented beforehand. That is to say, the advantages of the present embodiment can be further improved.

Next, a separate example of controlling various types of predetermined processing which affect the sheet gluing process, which is of interest in the present embodiment, will be described.

The image forming system 1000 according to the present embodiment has an image forming apparatus main unit (reader unit 1, printer unit 2, etc.) and a sheet processing device 230. The sheet processing device 230 is controlled by the CPU circuit unit 122 so as to subject the sheet fed from the image forming apparatus to the sheet processing instructed by the user. The sheet processing device 230 is configured so as to be capable of executing multiple types of sheet processing modes, such as the stapling process mode, punching process mode, trimming process mode, shifted sheet discharge process mode, saddle-stitching mode, two types of glue-binding process (case binding process and pad binding process) modes, and so forth. The CPU circuit unit 122 controls the sheet processing device 230 so as to carry out the sheet processes which the user has instructed, based on the management table in FIG. 20.

The management table 2000 shown in FIG. 20 illustrates an example of a function management table. This management table 2000 is also stored beforehand in the memory which the image forming apparatus has, such as a hard disk of the image memory 120 or the like, as with the management tables in FIGS. 18, 37, 38, and so forth. The CPU circuit unit 122 confirms the candidates for sheet processing which can be executed at the sheet processing device 230, based on the management information of the management table 2000. The information in the management table 2000 is management information stipulating restriction items (rules) between the multiple types of sheet processing modes which the sheet processing device 230 has. The CPU circuit unit 122 executes inhibition control and exclusion control among the multiple sheet processing modes, based on the management information thereof. Also, the CPU circuit unit 122 performs display control based on the management information in the table 2000 with regard to the display unit 4-250.

Now, assuming the above configuration, with the present embodiment, the CPU circuit unit 122 displays the display keys 1901 through 1907 to be displayed on the display screen in FIG. 19 either as valid display, or invalid display (which means a display format wherein the button is not displayed at all, or is grayed out, or is hatched). Thus, the display unit 4-250 is controlled by the CPU circuit unit 122 so as to present to the user candidates of sheet processing which can be selected for the job to be processed.

Upon the user pressing one of the keys 1901 through 1907, the CPU circuit unit 122 effects control so that the user can select the desired sheet processing for the job to be processed.

For example, in the event that the user presses the key 1901 on the display screen 1900, the CPU circuit unit 122 effects control so as to set the stapling mode for the job to be processed. In the event that the user presses the key 1902 on the display screen 1900, the punching mode is set. In the event that the user presses the key 1903 on the display screen 1900, the trimming mode is set. In the event that the user presses the key 1904 on the display screen 1900, the shifted sheet discharge mode is set. In the event that the user presses the key 1905 on the display screen 1900, the saddle-stitching mode is set. In the event that the user presses the key 1906 on the display screen 1900, the case binding mode is set. In the event that the user presses the key 1907 on the display screen 1900, the pad binding mode is set.

Upon the settings of the printing process conditions for the job to be processed having been completed by the user, and the start key 4-241 on the operating unit 123 shown in FIG. 4 having been pressed by the user, the CPU circuit unit 122 responds by determining that an instruction to start processing of the job to be processed has been received from the user.

In the event that the operating mode selected by the user is a copy mode, the CPU circuit unit 122 starts the reading operation of an original stack either loaded on the ADF of the reader unit 1 or directly placed on the platen glass, using the reader unit 1. The series of read images of the job are stored in the hard disk of the image memory 120. Next, at the printer unit 2, sheets are fed from a sheet feeding unit selected by the user (either 227, 214, 215, 225, or 226). The aforementioned job data read out from the image memory 120 is printed on the sheets fed from the sheet feeding unit, by the printer unit 2. The sheets of this job are then guided to a sheet conveying path within the sheet processing unit 230, by a discharge roller 219.

Note that the image forming apparatus according to the present embodiment has multiple operating modes besides the copy mode, such as a box mode and the like. The box mode is a mode wherein job data input from the reader unit 1 or an external device (e.g., the external device 2002 in FIG. 2, etc.) via a network 2001 is stored and held at a predetermined region (called a "box region") within the hard disk of the image memory 120. This is also a function whereby image data which the user desires can be read out from a box which the user desires within the hard disk at a timing which the user desires, and be printed at the printer unit 2.

Accordingly, in the event that the CPU circuit unit 122 receives a processing start request through the start key 4-241 in the state that the box mode has been selected by the user, the CPU circuit unit 122 controls the image memory unit 120 so as to start the series of processing, from the reading out of the image data from the hard disk. Processing following reading out from the image memory 120 is the same as the operations in the copy mode. That is to say, the image data read out from the hard disk in the box mode is printed at the printer unit 2, and the sheets which have been subjected to the printing process are guided to the sheet conveying path within the sheet processing device 230, via the discharge roller 219.

The CPU circuit unit 122 controls the sheet processing device 230 such that the sheets of the job which have been subjected to the printing process at the printer unit 2 are then subjected to the sheet processing corresponding to the sheet processing mode selected by the user, at the sheet processing device 230.

Now, the series of operations in the various sheet processing modes shown in FIGS. 19 and 20 will be described. For example, let us say that prior to the user inputting the job processing start request by pressing the start key 4-241, the user has already pressed the key 1901 on the display screen 1900 shown in FIG. 19, thereby setting the stapling mode for the job to be processed. In this case, the CPU circuit unit 122 controls the sheet processing device 230 so as to perform the stapling process on the sheets of the job, based on the job processing condition set by the user.

For example, the sheets of the job to be processed which are conveyed into the sheet processing device 230 by the discharge roller 219 of the printer unit 2 are temporarily stacked on a processing tray which the stapling unit 280 has. At the point that one stack worth of sheets (e.g., in the event that the job is made up of a total of five pages worth of original data, sheets equivalent to the five pages) is stacked on the tray of the stapling unit 280, the stapling unit 280 executes the stapling process. The sheets of the job which have been subjected to the stapling process are then discharged as a stack from the processing tray of the stapling unit 280 to a tray 256 of the sheet processing unit 230. This series of processing is executed for the number of prints set by the user for the job using the numeric keypad 4-245 before printing.

Next, let us say that the user has pressed the key 1903 on the display screen 1900 shown in FIG. 19, thereby setting the trimming mode for the job to be processed. In this case, the CPU circuit unit 122 controls the sheet processing device 230 so as to perform the trimming process (a process for trimming the edges of the sheets) on the sheets of the job, based on the job processing condition set by the user.

For example, the sheets of the job to be processed which are conveyed into the sheet processing device 230 by the discharge roller 219 of the printer unit 2 are temporarily stacked on a trimmer table 255. At the point that one stack worth of sheets (e.g., in the event that the job is made up of a total of 30 pages worth of original data, sheets equivalent to the 30 pages) is stacked on the trimmer table 255, the trimmer unit 247 executes the trimming process. The sheets of the job which have been subjected to the trimming process are then discharged as a stack to a tray 257 of the sheet processing unit 230. This series of processing is executed for the number of prints set by the user for the job using the numeric keypad 4-245 before printing.

Next, let us say that the user has pressed the key 1904 on the display screen 1900 shown in FIG. 19, thereby setting the shifted sheet discharge process mode for the job to be processed. In this case, the CPU circuit unit 122 controls the sheet processing device 230 so as to perform the shifted sheet discharge process (a process for stacking multiple sheet stacks in a shifted manner for each stack, on a discharge tray) for the sheets of the job, based on the job processing condition set by the user.

For example, at the point that one stack worth of sheets (e.g., in the event that the job is made up of a total of five pages worth of original data, sheets equivalent to the five pages) is stacked on the tray of the stapling unit 280, the one stack worth of sheets on the tray of the stapling unit 280 is shifted toward the front of the apparatus or toward the rear of the apparatus, using a restricting plate of the unit. At the point that the shifting in one direction has been completed, the sheet stack is discharged to the discharge tray 256. The next sheet stack to be discharge after this sheet stack is shifted using the restricting plate of the stapling unit 280, so as to be shifted on the tray of the stapling unit 280 in the opposite direction from the previous sheet stack. The sheet stack which has been shifted in the opposite direction from that of the previous sheet stack is discharged to the discharge tray 256, onto the already-discharged sheet stack. Thus, the preceding sheet stack and the following sheet stack can be stacked shifted toward the front of the apparatus and toward the rear of the apparatus on the discharge tray 256 respectively. This enables the division between the multiple sheet stacks to be easily grasped. This series of shifted sheet discharge processing is executed for the number of prints set by the user for the job using the numeric keypad 4-245 before printing.

Next, let us say that the user has pressed the key 1905 on the display screen 1900 shown in FIG. 19, thereby setting the saddle-stitching mode for the job to be processed. In this case, the CPU circuit unit 122 controls the sheet processing device 230 so as to perform the saddle-stitching process on the sheets of the job, based on the job processing condition set by the user.

Figure 39A:
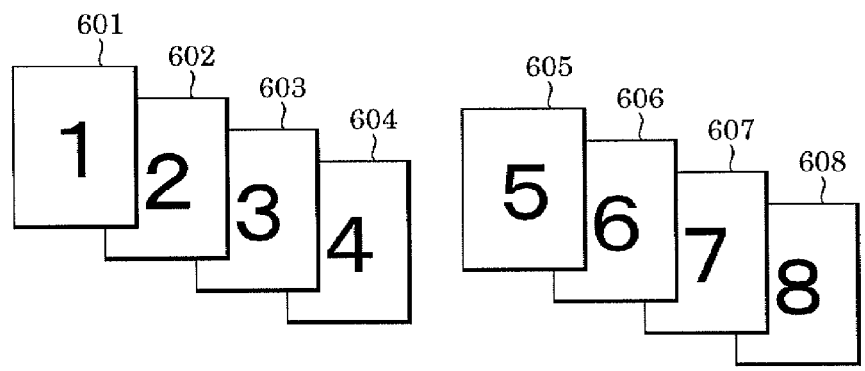
FIGS. 39A through 39C are explanatory diagrams relating to a saddle-stitch binding printing process, which is to be controlled with the embodiment.

An example will be described regarding a case wherein saddle-stitching is performed using A3 size sheets for an 8-page A4 sized job (equivalent to the series of input print data shown in FIG. 39A, including the 8 pages of document data 601 through 608). Upon the processing start instruction being input by the user by pressing the start key 4-241, the job is stored in the hard disk of the image memory 120 in sequential page order, from the first page 601 of the job.

Figure 39B:
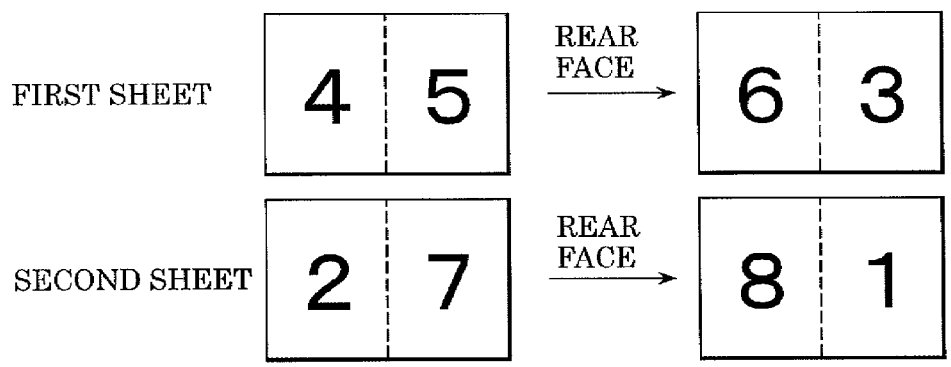

Once the data of all of the pages has been stored in the hard disk of the image memory 120, one A3 size recording sheet is fed from the sheet feeding unit. Two pages worth of image, of the fourth page and fifth page, are formed in array on the first face of this first recording sheet. The front and back sides of the sheet are reversed within the image forming apparatus, the recording sheet is fed again, and then two pages worth of image, of the sixth page and third page, are formed in array on the second face of this first recording sheet (the face opposite to the first face). Thus, printing of the first recording sheet shown in FIG. 39B is completed. Following completion of both the front and back faces of the first sheet, this sheet is temporarily stacked on a tray within the sheet processing device 230.

Next, another A3 size recording sheet is fed from the sheet feeding unit as the second recording sheet. Two pages worth of image, of the second page and seventh page, are formed in array on the first face of this second recording sheet. Further, two pages worth of image, of the eighth page and first page, are formed in array on the second face of this second recording sheet (the face opposite to the first face). Thus, printing of the second sheet shown in FIG. 39B is completed.

Following completion on both the front and back faces of the second sheet, this sheet is stacked on the first sheet already stacked in the sheet processing device 230. The two sheets are aligned, following the center position is taken as a stapling position, and this position is subjected to execution of the stapling process (this is what saddle-stitching is). Upon the saddle-stitching process having been performed, a folding process is executed by the sheet processing device 230 so as to fold the sheet stack in two, with the first page being the front cover and the eighth page being the back cover. After the folding-in-two process is completed, the stack is discharged to the discharge tray 257, for example.

Figure 39C:
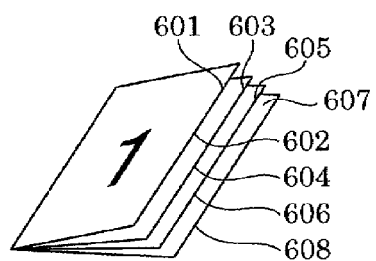

A saddle-stitch printed article such as shown in FIG. 39C can be created by the CPU circuit unit 122 controlling the system 1000 so as to execute the above series of processing. Thus, in the event of processing a job regarding which the saddle-stitching process mode has been selected, the CPU circuit unit 122 effects control so as to inhibit the gluing process which is performed in the case binding mode and pad binding mode. The CPU circuit unit 122 controls the image forming apparatus and the sheet processing device 230 so that this series of the saddle-stitching process is executed for the number of prints set by the user for the job using the numeric keypad 4-245 before printing.

As described above, the present embodiment has, as binding modes, for example, not only the above-described two types of glue-binding modes, but also a saddle-stitching mode regarding which the gluing process is inhibited, and is configured so that the user can select a desired binding mode. This configuration allows users to create printed articles of various output formats, meeting various user demands, and also further improving the advantages of the present embodiment.

Next, let us say that the user has pressed the key 1906 on the display screen 1900 shown in FIG. 19, thereby setting the case binding process mode, which is one of the gluing processes, for the job to be processed. In this case, the CPU circuit unit 122 controls the sheet processing device 230 so as to perform the case binding process for the sheets of the job, based on the job processing condition set by the user. The processing sequence for the case binding process is as described above with reference to FIG. 8A and FIGS. 24A through 35B. Further, description will be made later with reference to FIG. 11, and accordingly description will be omitted here.

Next, let us say that the user has pressed the key 1907 on the display screen 1900 shown in FIG. 19, thereby setting the pad binding process mode, which is one of the gluing processes, for the job to be processed. In this case, the CPU circuit unit 122 controls the sheet processing device 230 so as to perform the pad binding process for the sheets of the job, based on the job processing condition set by the user. The processing sequence for the pad binding process is as described above with reference to FIG. 8B. Further, description will be made later with reference to FIG. 11, and accordingly description will be omitted here.

As described above, with the present embodiment, the CPU circuit unit 122 acts independently to control the image forming system so as to display such a user interface screen in the display device, thereby allowing the user to select the desired type of sheet processing using this user interface. Of course, a selection method other than the above-described selection method may be used. Any configuration is applicable to the present embodiment, as long as the user can at least select desired sheet processing.

Thus, with the present embodiment, the sheet processing device 230 is capable of executing multiple types of sheet processing including at least one type of gluing process of the case binding process and the pad binding process. The user is presented with candidates of sheet processing which can be executed, from which the user can arbitrarily select a desired sheet process.

Now, the image forming system according to the present embodiment is configured so as to proactively avoid erroneous operations by the user. The image forming system also has a configuration whereby malfunctioning and trouble due to such erroneous operations by the user can be proactively avoided. Accordingly, not only can problems expected with the conventional art being avoided, but also the advantages of the present embodiment can be improved even further.

For example, in response to a predetermined type of sheet process being selected by the user through the screen 1900 shown in FIG. 19 with regard to a job to be processed, the CPU circuit unit 122 effects control so as to inhibit selection of sheet processing modes other than the selected type. Or, the CPU circuit unit 122 effects control so that multiple sheet processing modes, two types for example, can be selected for the job to be processed from the multiple types of sheet processing modes, within a range that problems such as described above do not occur.

The CPU circuit unit 122 controls the image forming system 1000 so as to execute exclusion control (restriction control of sheet processing functions) of sheet processes for jobs to be processed, based on function restriction information stored in a function management table 2000 shown in FIG. 20.

For example, the CPU circuit unit 122 reads the function restriction information stored in the table 2000 in FIG. 20 beforehand from the hard disk of the image memory 120 into RAM 125, handles the management information as inhibition rules (also called "restriction item information" in the present embodiment), and performs inhibition control relating to the sheet processing by the sheet processing device 230, based on the rules such as listed below.

For example, let us say that the user has selected the "case binding process mode" from a display screen (see FIG. 19, for example) displayed on a user interface unit (the operating unit 123 in the case of a job from the reader unit 1, and a printing settings screen such as a printer driver or the like in the case of an external device 2002 such as a host computer or the like) used with the image forming system 1000. In this case, the sheet processing device 230 is controlled so as to execute the case binding process on sheets of the job to be processed.

Thus, in the event that the user has selected the case binding mode, execution of the case binding mode on the sheets of the job to be processed is permitted. Further, execution of the trimming process on the sheets of the case binding job is permitted based on the inhibition rules of the table 2000 in FIG. 20. However, the CPU circuit unit 122 controls the system 1000 so as to inhibit execution of all other types of sheet processing for the sheets of the job.

With reference to the example shown in FIG. 20, in this case (the case wherein the user has selected the case binding mode), five types of modes, i.e., the pad binding process mode, the saddle-stitching process mode, the stapling process mode, the punching process mode, and the shifted sheet discharge process mode, are determined to fall under the selection-inhibited sheet process modes. Accordingly, execution of the sheet processing of these sheet process modes on the sheets of the case binding job is inhibited. Further, control is effected so as to inhibit user selection thereof altogether.

Also, for example, let us say that the user has selected the "pad binding process mode" from the user interface unit used with the image forming system 1000. In this case, the sheet processing device 230 is controlled so as to execute the pad binding process on sheets of the job to be processed.

Thus, in the event that the user has selected the case binding mode, execution of the pad binding mode on the sheets of the job to be processed is permitted. Further, execution of the trimming process and/or punching process on the sheets of the pad binding job is permitted based on the inhibition rules of the table 2000 in FIG. 20. However, the CPU circuit unit 122 controls the system 1000 so as to inhibit execution of all other types of sheet processing for the sheets of the job.

With reference to the example shown in FIG. 20, in this case (the case wherein the user has selected the pad binding mode), four types of modes, i.e., the case binding process mode, the saddle-stitching process mode, the stapling process mode, and the shifted sheet discharge process mode, are determined to fall under the selection-inhibited sheet process modes. Accordingly, execution of the sheet processing of these sheet process modes on the sheets of the pad binding job is inhibited. Further, control is effected so as to inhibit user selection thereof altogether.

Also, for example, let us say that the user has selected the "saddle-stitching process mode" from the user interface unit (the operating unit 123 in this case) used with the image forming system 1000. In this case, the sheet processing device 230 is controlled so as to execute the saddle-stitching process on sheets of the job to be processed.

Thus, in the event that the user has selected the saddle-stitching mode, execution of the saddle-stitching mode on the sheets of the job to be processed is permitted. Further, execution of the trimming process on the sheets of the saddle-stitching job is permitted based on the inhibition rules of the table 2000 in FIG. 20. However, the CPU circuit unit 122 controls the system 1000 so as to inhibit execution of all other types of sheet processing for the sheets of the job.

With reference to the example shown in FIG. 20, in this case (the case wherein the user has selected the saddle-stitching mode), five types of modes, i.e., the case binding process mode, the pad binding process mode, the stapling process mode, the punching process mode, and the shifted sheet discharge process mode, are determined to fall under the selection-inhibited sheet process modes. Accordingly, execution of the sheet processing of these sheet process modes on the sheets of the saddle-stitching job is inhibited. Further, control is effected so as to inhibit user selection thereof altogether.

Also, in the same way, in the event that the user has selected the "trimming process mode", execution of the trimming process mode on the sheets of the job to be processed is permitted. Further, execution of at least one of the case binding process mode, the pad binding process mode, and the stapling process mode, on the sheets of the pad binding job, is permitted based on the inhibition rules of the table 2000 in FIG. 20. However, the CPU circuit unit 122 controls the system 1000 so as to inhibit execution of all other types of sheet processing for the sheets of the job (the punching process mode and the shifted sheet discharge process mode are determined to fall under the selection-inhibited sheet process modes with the example shown in FIG. 20).

Also, in the same way, in the event that the user has selected the stapling mode, the punching process mode, or the shifted sheet discharge mode, permission and inhibition of execution of sheet processing is controlled based on the inhibition rules of the table 2000 in FIG. 20.

In this way, with the present embodiment, inhibition rules are provided between the multiple types of sheet processing modes which can be executed by the sheet processing device 230. Based on the inhibition rules, the CPU circuit unit 122 effects control so as to permit execution of the sheet processing of predetermined sheet processing other than the selected sheet processing on the job to be processed, and to inhibit execution of all other sheet processing on the job to be processed.

Describing the various types of inhibition control relating to the above-described sheet processing, primarily with regard to the glue-binding processes such as the case binding process and the pad binding process, the system according to the present embodiment is configured so as to execute control listed below.

Let us say that, for example, with the present embodiment, a sheet process mode which is a sheet process mode other than the case binding mode and is also a predetermined sheet process mode type regarding which selection thereof is to be inhibited in the event that the case binding mode is executed, has been selected by the user through the user interface unit. In response, the CPU circuit unit 122 controls the image forming system so as to inhibit case binding processing on the sheets of the job to be processed.

For example, with the inhibition control example of the table 2000 shown in FIG. 20, the CPU circuit unit 122 controls the image forming system such that upon at least one of the five types of sheet processing modes, i.e., the pad binding mode, saddle-stitching mode, stapling process mode, punching process mode, and shifted sheet discharge mode, being selected by the user, the CPU circuit unit 122 controls the image forming system so as to inhibit executing of the case binding process on the sheets of the job to be processed.

However, in the event that a another predetermined type of sheet processing (called "second predetermined type of sheet processing" here), separate and different from the above-described predetermined type of sheet processing (called "first predetermined type of sheet processing" here), has been selected, the system 1000 is controlled so as to permit executing the case binding process on the sheets of the job regarding which the processing condition has been set.

For example, in the event that the user has selected the trimming process mode through a user interface unit such as the operating unit 123, the CPU circuit unit 122 controls the system 1000 so as to permit the case binding process for the sheets of the trimming process job.

For the pad binding process mode, control is made as follows. Let us say that, for example, with the present embodiment, a sheet process mode which is a sheet process mode other than the pad binding mode and is also a predetermined sheet process mode type regarding which selection thereof is to be inhibited in the event that the pad binding mode is executed, has been selected by the user through the user interface unit. In response, the CPU circuit unit 122 controls the image forming system 1000 so as to inhibit pad binding processing on the sheets of the job to be processed.

For example, with the inhibition control example of the table 2000 shown in FIG. 20, the CPU circuit unit 122 controls the image forming system 1000 such that upon at least one of the four types of sheet processing modes, i.e., the case binding mode, saddle-stitching mode, stapling process mode, and shifted sheet discharge mode, being selected by the user, the CPU circuit unit 122 controls the image forming system 1000 so as to inhibit executing of the pad binding process on the sheets of the job to be processed.

However, in the event that a another predetermined type of sheet processing (called "fourth predetermined type of sheet processing" here), separate and different from the above-described predetermined type of sheet processing (called "third predetermined type of sheet processing" here), has been selected, the system 1000 is controlled so as to permit executing the pad binding process on the sheets of the job regarding which the processing condition has been set.

For example, in the event that the user has selected the trimming process mode and/or punching process mode through a user interface unit such as the operating unit 123, the CPU circuit unit 122 controls the system 1000 so as to permit the pad binding process for the sheets of the trimming process job.

As described above, in the event that a predetermined type of sheet process mode has been selected by the user, control is effected so as to permit using another type of sheet process mode along therewith, but the CPU circuit unit 122 effects control such that whether or not to actually execute the sheet processing corresponding to the sheet process mode which has been permitted to operate therewith, can be selected by the user.

For example, let us say that in response to the user having selected the sort key 4-256 on the screen shown in FIG. 4, the display screen 1900 shown in FIG. 19, for allowing the user to select the type of sheet processing to be executed on the job to be processed, is displayed on the display unit 4-250. Let us further say that the user selects the staple key 1901 from the display screen in FIG. 19. The CPU circuit unit 122 accordingly controls the display unit 4-250 such that the display state of the display unit 4-250 makes transition to the state of the screen shown in FIG. 21, based on the restriction item information described in the management table 2000 in FIG. 20.

Figure 21:
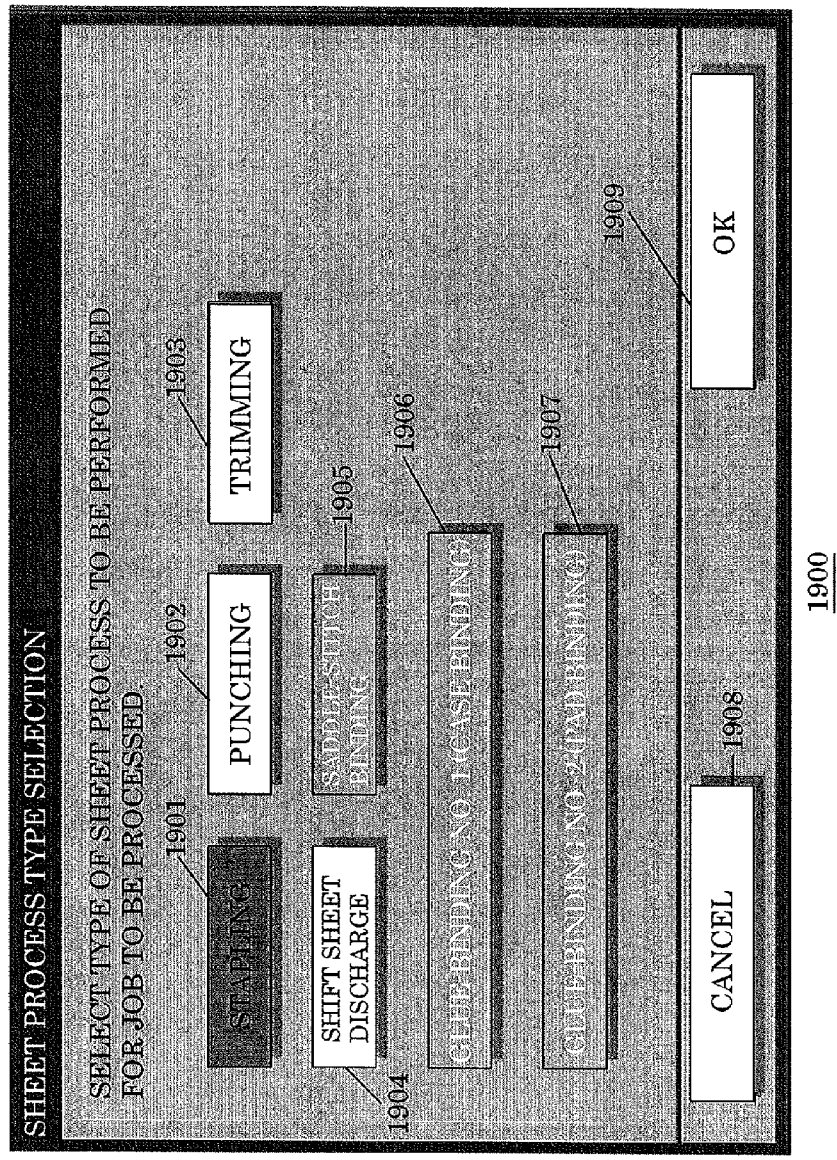
FIG. 21 is a diagram illustrating an example of a user interface screen which is to be controlled with the embodiment.

With the present embodiment, as shown in FIG. 21, in the sheet process setting screen in the state that the staple key 1901 has been pressed, the punch key 1902 and trimming key 1903 and shifted sheet discharge key 1904 are in a valid display state. On the other hand, the saddle-stitching key 1905, the case binding key 1906, and the pad binding key 1907, are grayed out in the display, and user selection thereof is disabled.

Due to this display control, the user can select at least one of the punching mode, trimming mode, and shifted sheet discharge mode, for jobs regarding which the stapling mode has been selected, but control is effected such that user selection of the saddle-stitching mode, the case binding mode, and the pad binding mode, is inhibited.

Also, for example, let us say that the user selects the case binding key 1906 from the display screen 1900 in FIG. 19. The CPU circuit unit 122 accordingly controls the display unit 4-250 such that the display state of the display unit 4-250 makes transition to the state of the screen shown in FIG. 22, based on the restriction item information described in the management table 2000 in FIG. 20.

Figure 22:
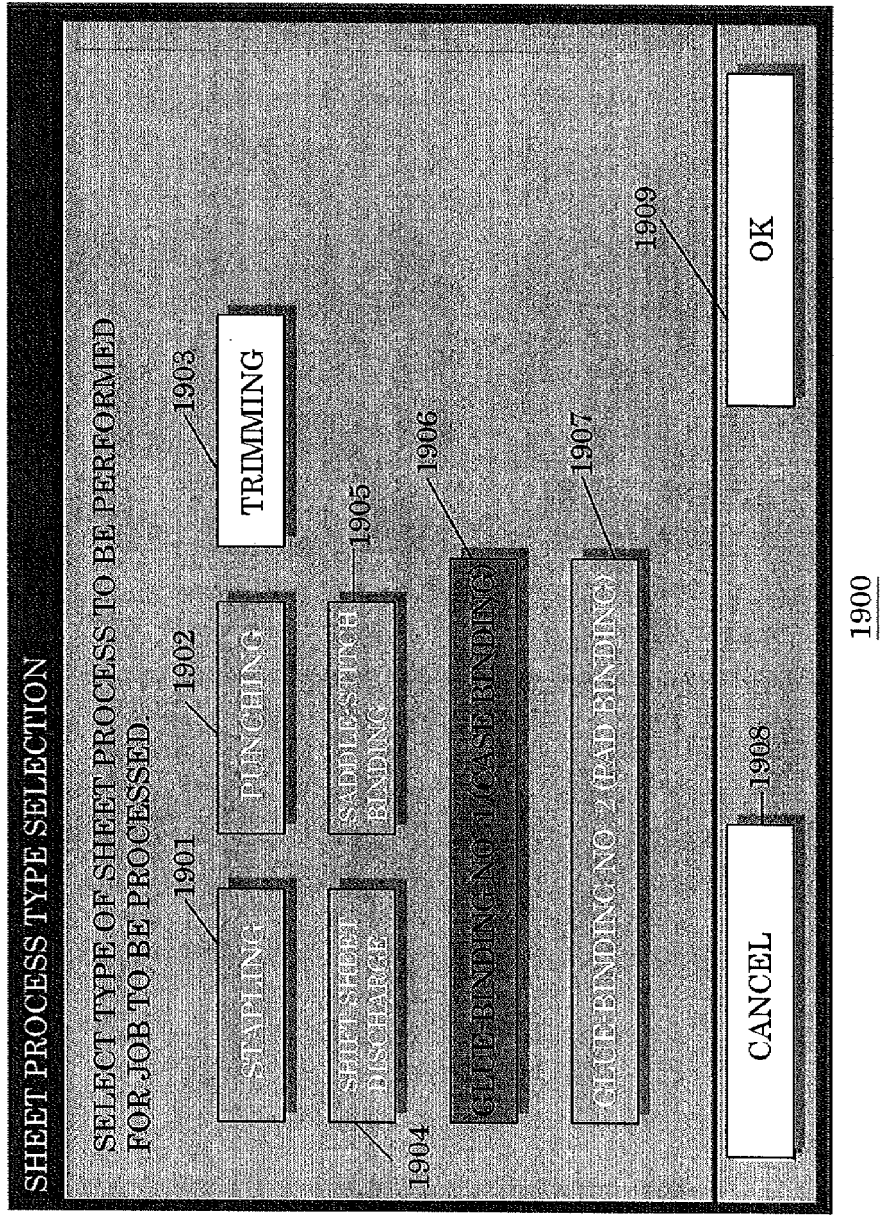
FIG. 22 is another diagram illustrating an example of a user interface screen which is to be controlled with the embodiment.

With the present embodiment, as shown in FIG. 22, in the sheet process setting screen in the state that the case binding key 1906 has been pressed, the trimming key 1903 is in a valid display state. On the other hand, the staple key 1901, the punch key 1902, the shifted sheet discharge key 1904, the saddle-stitching key 1905, and the pad binding key 1907, are grayed out in the display, and user selection thereof is disabled.

Due to this display control, the user can select the trimming mode for jobs regarding which the case binding mode has been selected, but control is effected such that user selection of the stapling mode, punching mode, shifted sheet discharge mode, saddle-stitching mode, and the pad binding mode, is inhibited.

Also, for example, let us say that the user selects the pad binding key 1907 from the display screen 1900 in FIG. 19. The CPU circuit unit 122 accordingly controls the display unit 4-250 such that the display state of the display unit 4-250 makes transition to the state of the screen shown in FIG. 23, based on the restriction item information described in the management table 2000 in FIG. 20.

Figure 23:
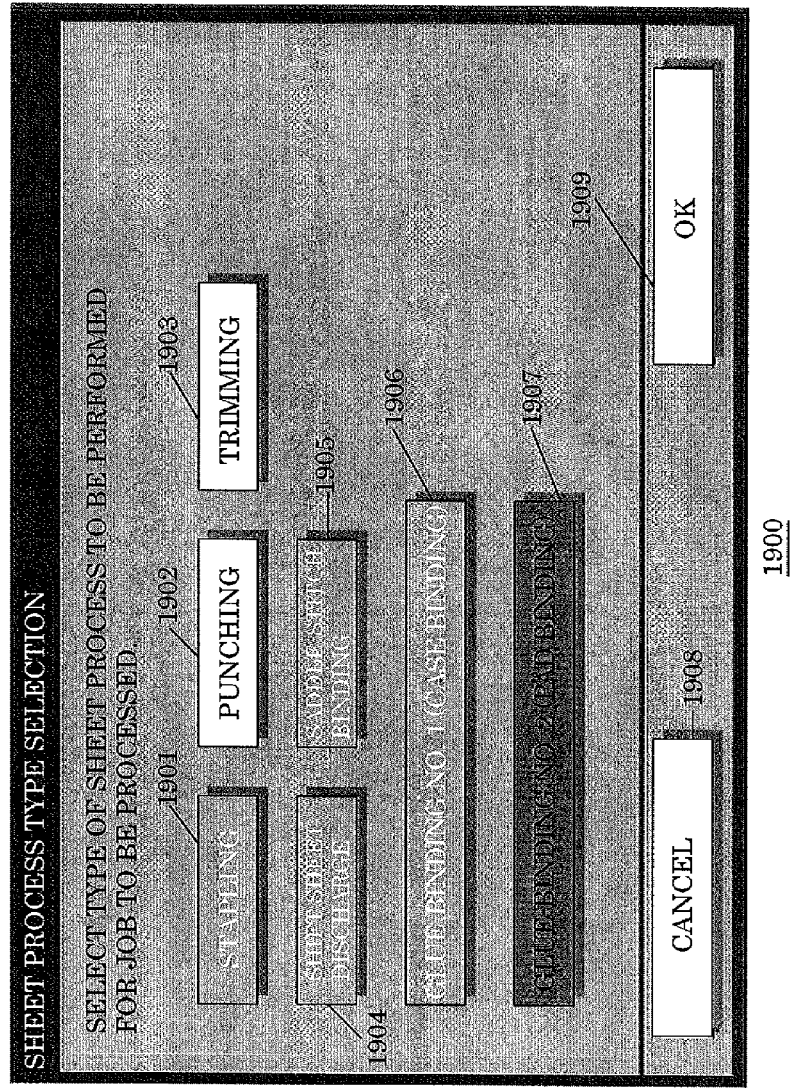
FIG. 23 is another diagram illustrating an example of a user interface screen which is to be controlled with the embodiment.

With the present embodiment, as shown in FIG. 23, in the sheet process setting screen in the state that the pad binding key 1907 has been pressed, the punch key 1902 and the trimming key 1903 are in a valid display state. On the other hand, the staple key 1901, the shifted sheet discharge key 1904, the saddle-stitching key 1905, and the case binding key 1906, are grayed out in the display, and user selection thereof is disabled.

Due to this display control, the user can select any one of the sheet-processing modes, i.e., the punching mode and the trimming mode for jobs regarding which the pad binding mode has been selected, but control is effected such that user selection of the stapling mode, shifted sheet discharge mode, saddle-stitching mode, and the case binding mode, is inhibited.

This configuration which controls not only the actual sheet process actions themselves but also operational control of the user interface unit can further improve the above-mentioned advantage of operability.

Now, while the above example has been described as being a configuration wherein the user selects, upon his/her own decision, whether or not to perform the trimming process on the sheets of the case binding job, the following control may be performed with the present embodiment.

For example, a configuration may be made such that, in the event that the user has selected the case binding mode, as described above, the CPU circuit unit 122 controls the sheet processing device 230 so as to automatically execute trimming processing on the sheets of the case binding job, in response to the selection for the case binding mode. In this configuration, in the event that the user selects the case binding mode for the job to be processed, the CPU circuit unit 122 makes an independent decision to determine whether or not to perform the trimming processing on the sheets of the case binding job, regardless of whether the user selects the trimming process mode.

Also, for example, a configuration may be made such that, in the event that the user has selected the pad binding mode, the CPU circuit unit 122 controls the sheet processing device 230 so as to automatically execute trimming processing on the sheets of the pad binding job, in response to the selection for the pad binding mode. In this configuration, in the event that the user selects the pad binding mode for the job to be processed, the CPU circuit unit 122 makes an independent decision to determine whether or not to perform the trimming processing on the sheets of the pad binding job, regardless of whether the user selects the trimming process mode.

Also, as described in the examples above, in the event of performing the trimming process on a job which performs the sheet gluing process (including both cases of the user explicitly instructing execution of the trimming processing, and cases of the CPU circuit unit 122 automatically deciding to execute the trimming processing), the CPU circuit unit 122 effects control so as to execute the above-described three-way trimming process.

Due to the above-described configuration, in situations wherein the appearance of the edges of the output printed and glued article would be untidy without trimming, a neat-appearing printed and glued article can be created with the system 1000 even in the event that the user forgets to input instructions from the operating unit to perform the trimming process.

Next, description will be made regarding the user operation following display of the display screens shown in FIGS. 7A through 7D on the display unit 4-250.

Upon the user pressing the key 805 (upon the user pressing the key 805, and the "next" key, in that order), i.e., upon making a request of case binding, the CPU circuit unit 122 controls the liquid crystal display unit 4-250 to display an operating screen (f) shown in FIG. 7C on the liquid-display unit 4-250. As described above, the operating screen (f) shown in FIG. 7C allows the user to select the printing-sheet size of a cover, the feeding cassette (feeding position), decision whether or not printing is performed on the cover, and so forth, in the case binding mode.

Note that the present embodiment allows the user to select a cassette from only the cassettes storing recording sheets which can be selected and used as a cover, by actions of the CPU circuit unit 122.

As shown in FIG. 7C, the present embodiment permits the user to select the printing-sheet size used for a cover (the type 2 sheet) from "A3 oversize", "A3", "B4", "A4R", "11×17", "LGL", and "LTR-R", in the case-binding mode based upon the restriction-item information stored in the management table 1800 shown in FIG. 18. Furthermore, as described with FIGS. 24A through 35B, in the case binding mode, the present embodiment has a configuration which allows the user to decide whether or not printing is performed on the outer side of the front cover (type 2 sheet), whether or not printing is performed on the inner side of the front cover, whether or not printing is performed on the outer side of the back cover, and whether or not printing is performed on the inner side of the back cover. With such a configuration, upon the user making these settings, and pressing the "next" key, settings for the case binding is completed.

On the other hand, upon the user selecting the key 804, and pressing the "OK" key on the operating screen (c) shown in FIG. 6C, the CPU circuit unit 122 detects the operation, and controls the liquid crystal display unit 4-250 so as to display the operating screen (g) shown in FIG. 7D, which allows the user to make settings for saddle stitching.

As shown in FIG. 7B, in the saddle stitching mode (non-gluing binding mode), the present embodiment permits the user to select the printing-sheet size used for a printing sheet in the saddle stitching mode, from "A3", "B4", "A4R", "11× 17", "LGL", and "LTR-R", based upon the restriction-item information stored in the management table 1800 shown in FIG. 18. Upon the user making these settings, and pressing the "next" key, the CPU circuit unit 122 controls the liquid-display unit 4-250 so as to display the operating screen (g) as shown in FIG. 7D. The operating screen (g) shown in FIG. 7D allows the user to select a mode from "saddle stitching" and "no saddle stitching". Upon the user making these settings and pressing the "next" key, the settings for saddle stitching are completed.

Note that various kinds of processing conditions, including the conditions shown in FIGS. 4 through 7D, and FIGS. 19 through 23D, and so forth, wherein the system allows the user to make settings for jobs through the user interface according to the present embodiment, are stored as user-setting information in the RAM 125 included in the system 1000. The present embodiment has a configuration for performing comparison processing as to various kinds of restriction-item information described above, or various kinds of determination processing shown in the flowcharts described later.

Description will be made below regarding a storage method and readout method for images with reference to FIGS. 9 and 10.

FIG. 9 is a schematic diagram which shows a memory map of the image memory 120 shown in FIG. 2. As shown in FIG. 9, the image memory 120 comprises layout memory 5000 and multiple (one hundred in the present embodiment) accumulation memory 1 (5001) through accumulation memory 100 (5100), which allows storage of 100 images.

Figure 10:
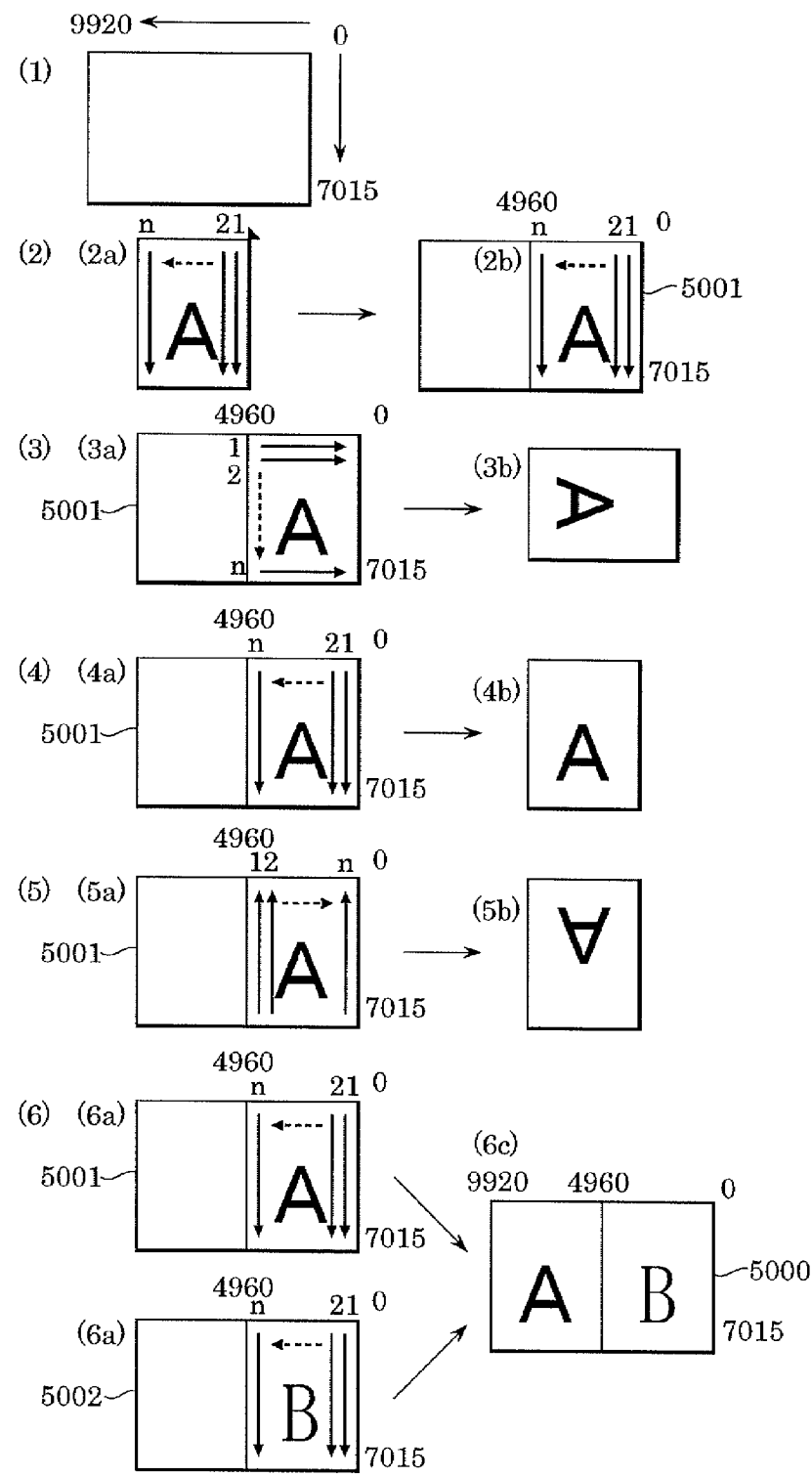
FIGS. 10(1) through 10(6) are diagrams for describing the storage method and reading method of images to and from the image memory shown in FIG. 9.

FIG. 10 is a diagram for describing the storage method and readout method for the image memory 120 shown in FIG. 9.

FIG. 10(1) shows storage capacity in the single accumulation memory shown in FIG. 9, having a storage capacity of a bit size (width×height) of (7015 bits×9920 bits), which allows storage of an A3-size image with a 600-dpi standard. The storage region has a structure formed of the single layout memory (image layout region) and the single character data region, which allows storage of 100 images.

Subsequently, description will be made regarding storage of an A4-size original image in the image memory with reference to FIG. 10(2). The subsequent steps are controlled by the CPU circuit unit 122 shown in FIG. 2.

The printed data on an A4-size original placed on the original-table glass face 102 (FIG. 1) as shown in FIG. 10(2*a*) is sequentially read out in the direction as indicated by the arrow as shown in FIG. 10(2*a*).

At this time, as shown in FIG. 10(2*b*), the CPU circuit unit 122 sets the counter address to the address (0, 0) in the storage memory (e.g., the accumulation memory 1 (5001)) for storing the image data thus read out, with the counter-increment mode in both the X direction and the Y direction.

Upon completion of readout of the data of the first line, the CPU circuit unit 122 sequentially writes first-line image data thus read out, in the direction from the address (0, 0) to the address (0, 7015). Next, upon completion of readout of the second-line image data, the CPU circuit unit 122 increments the counter address in the X-direction by one, and sequentially writes the second-line image data thus read out, in the direction of the address (1, 0) to the address (1, 7015). Next, upon completion of readout of the third-line image data, the CPU circuit unit 122 increments the counter address in the X-direction by one, and sequentially writes the third-line image data thus read out, in the direction of the address (2, 0) to the address (2, 7015). Thereafter, readout and writing are repeated in the same way, whereby the image is written in the storage memory unit up to the address (4960, 7015).

Next, description will be made, with reference to FIG. 10(3) regarding readout of the image data stored in the storage memory unit as shown in FIG. 10(2), with turning of the image in the clockwise direction by 90°.

At the time of readout of the data stored in the storage memory unit (e.g., the accumulation memory 1 (5001)) with turning of the image in the clockwise direction by 90°, the CPU circuit unit 122 sets the counter address to the address (4960, 0) as a start point with the decrement mode in the X-direction and the increment mode in the Y-direction. Following the aforementioned settings, the CPU circuit unit 122 reads out the first-line image data while decrementing the address in the X-direction from the address (4960, 0) to the address (0, 0). Next, the CPU circuit units increments the counter address in the Y-direction by one, following which the CPU circuit unit 122 reads out the second-line image data in the direction of the address (4960, 1) to the address (0, 1). Thereafter, the image data is sequentially read out in the same way as described above, whereby the image data is read out from the storage memory unit, with turning of the image in the clockwise direction by 90°, as shown in FIG. 10(3*b*), as shown in FIG. 10(3*a*).

Next, description will be made regarding a process for reading out the image data stored in the storage memory unit as shown in FIG. 10(2), without turning of the image, with reference to FIG. 10(4).

At the time of readout of the data stored in the storage memory unit (e.g., the accumulation memory 1 (5001)) without turning of the image, the CPU circuit unit 122 sets the counter address to the address (0, 0) as a start point with the increment mode both in the X-direction and the Y-direction as shown in FIG. 10(4*a*). Following the aforementioned settings, the CPU circuit unit 122 reads out the first-line image data while incrementing the address in the Y-direction from the address (0, 0) to the address (0, 7015). Next, the CPU circuit units increments the counter address in the X-direction by one, following which the CPU circuit unit 122 reads out the second-line image data in the direction of the address (1, 0) to the address (1, 7015). Thereafter, the image data is sequentially read out in the same way as described above, whereby the image data is read out from the storage memory unit as shown in FIG. 10(4*b*).

As described above, the image is read out without turning thereof by reading out the A4-size original data shown in FIG. 10(2*a*) in the direction shown in FIG. 10(4*a*).

Next, description will be made regarding a process for reading out the image data stored in the storage memory unit as shown in FIG. 10(2), with turning of the image by 180°, with reference to FIG. 10(5).

At the time of readout the data stored in the storage memory unit (e.g., the accumulation memory 1 (5001)) with turning of the image by 180°, first, the CPU circuit unit 122 sets the counter address to the address (0, 7015) as a start point with the decrement mode both in the X-direction and the Y-direction. Following the aforementioned settings, the CPU circuit unit 122 reads out the first-line image data while decrementing the address in the Y-direction from the address (4960, 7015) to the address (4960, 0). Next, the CPU circuit units decrement the counter address in the X-direction by one, following which the CPU circuit unit 122 reads out the second-line image data in the direction of the address (4959, 7015) to the address (4959, 0). Thereafter, the image data is sequentially read out in the same way as described above, whereby the image data is read out from the storage memory unit as shown in FIG. 10(5*b*).

As described above, the image is read out with turning thereof by 180°, by reading out the A4-size original data shown in FIG. 10(2*a*) in the direction shown in FIG. 10(5*a*).

Next, description will be made regarding a process for reading image data sets stored in the multiple storage memory units, and merging the image data sets thus read out, on the layout memory 5000, with reference to FIG. 10(6).

As shown in FIGS. 10(6a) and 10(6b), the CPU circuit unit 122 reads out the images each of which have been stored in a respective storage memory unit (e.g., the accumulation memory 1 (5001) and the accumulation memory 2 (5002)), and writes the images thus read out, on desired positions of the layout memory 5000, as shown in FIG. 10(6c), thereby merging the different document images on the image memory 120.

(Description of the Printer Unit 2)

Description will be made below regarding a configuration and operation of the printer unit 2 with reference to FIG. 1. With the printer unit 2 shown in FIG. 1, reference numeral 210 denotes an exposure control unit for controlling a process wherein the image signal input to the printer unit 2 is converted into modulated light signal, and the modulated light signal is cast onto a photosensitive member 211 through a mirror 207. The latent image formed on the photosensitive member 211 by actions of the illumination light is developed by a developing device 212. A transfer sheet is conveyed from one of transfer-sheet stacking units 214, 215, 225, and 226, and manual-feeding unit 227, synchronously with the tip of the aforementioned developed image, and the aforementioned developed image is transferred onto the transfer sheet at a transfer unit 216. The image transferred on the transfer sheet is fixed at a fixing unit 217, following which the transfer sheet is introduced in the direction of a discharge roller 219 through a conveying-direction switching member 220, passes through a discharge sensor 218, and is discharged to a article-binding unit 230 by actions of the discharge roller 219.

Next, description will be made regarding a method for consecutively reading out images, and outputting images thus read out, onto both sides of the a single printing sheet.

At the first time that the printing sheet subjected to the fixing process at the fixing unit 217 is conveyed to the discharge roller 219, the printing sheet is conveyed in the reverse direction to a refeeding-transfer-sheet stacking unit 221 through the conveying-direction switching member 220. Upon setting of the next original, the original image is read out in the same way as with the process described above. In this case, the transfer sheet is fed from the refeeding-transfer-sheet stacking unit 221, thereby outputting two original images on the front face and the back face of the single printing sheet.

Then, the transfer sheet output from the discharge roller 219 is received by the bookbinding unit 230. The bookbinding unit 230 is a finishing device having functions for performing gluing binding process (case-binding process, pad-binding process) for the printing sheets subjected to the printing process and output from the printer unit 2.

The bookbinding unit 230 controls the direction of conveyance of the transfer sheet corresponding to the kind of finishing process. In a case of the punching function being selected, the bookbinding unit 230 controls direction switching members 232 and 235 so as to introduce the transfer sheet to a punching unit 290 for the punching process. In the same way, in a case of the stapling function being selected, the bookbinding unit 230 controls the direction switching members 232 and 235 so as to introduce the transfer sheet to a stapling unit 280 for the stapling process. The transfer sheet subjected to the aforementioned process by the punch unit 290 or the stapling unit 280 are discharged to a discharge tray 256.

Furthermore, in a case of the user giving instructions for gluing binding, the bookbinding unit 230 controls the direction switching members 232 and 235 so as to introduce the transfer sheet to a glue-binding unit 300. Note that the transfer sheets subjected to gluing binding by the glue-binding unit 300 are discharged to a discharge tray 257.

On the other hand, in a case wherein no finishing process is performed by the punch unit 290, the stapling unit 280, or the glue-binding unit 300, the transfer sheet is discharged to the discharge tray 257.

Each of the discharge trays 256 and 257 includes an unshown sensor for detecting the stacking amount of the transfer sheets thus discharged. The CPU circuit unit 122 has a function for determining whether or not the transfer sheet can be further discharged to the discharge trays, based on the detection results of the sensors.

Description will be made regarding the operation of the case binding for attachment of a cover, performed by the bookbinding unit 230.

FIGS. 11A through 12G are diagrams for describing the operation for case binding for attachment of a cover, performed by the bookbinding unit 230. Note that a single printing sheet 701 is indicated by a heavy line in FIGS. 11A through 11C for convenience of indicating the position of the sheet. On the other hand, in FIGS. 12D through 12G, reference numeral 801 denotes a stack of text sheets.

As shown in FIG. 11A, the direction switching member 232 changes the direction of conveyance such that the transfer sheet 701 is introduced to a transfer-sheet path 233. In this case, the transfer sheet is conveyed by actions of rollers 270 and 271. Subsequently, as shown in FIG. 11B, the direction switching member 235 changes the direction of the transfer sheet 701 so as to be introduced to a stack unit 236. Then, as shown in FIG. 11C, the transfer sheet 701 is stored in the stack unit 236. In the same way, all the text sheets for case binding are stored in the stack unit 236.

Subsequently, as shown in FIG. 12D, a cover 802 for case binding is conveyed. In this case, the direction switching member 232 changes the direction of the cover so as to be introduced to a cover path 234. The rollers 243 and 239 are rotated such that the cover is conveyed with the middle portion nipped between the roller 243 and 239.

Subsequently, glue-binding unit 300 is moved inward so as to apply glue to the stack of the transfer sheets. The glue-binding unit 300 comprises a glue unit 301, a heater unit 302, and a sensor unit 303, as shown in FIG. 1. With such a configuration, heat is applied to a solid-state glue up to a predetermined temperature at the heater unit 302, thereby performing the gluing process. Note that the temperature of the glue is controlled so as to be within a predetermined range while detecting the temperature with the sensor unit 303.

Subsequently, the stack of text sheets, to which the glue has been applied, is glued to the cover.

As shown in FIG. 12E, the glue-binding unit 300 is retracted to a predetermined position by rotation of the rollers 237 and 238. Furthermore, the rollers 272 and 273 rotate so as to convey the stack of the text sheets downwards. Upon the stack of the text sheets coming into contact with the cover, rotation of the rollers 272 and 273 is stopped. The aforementioned state is kept for a predetermined period of time, whereby gluing is completed. Subsequently, a folding member 277 operates so as to fold the cover. Folding of the cover with a small number of the text sheets, performed by the folding member 277, often leads to wrinkles or damage on the front cover. Accordingly, case binding should be performed with a restriction of the minimum number of text sheets (i.e., case binding needs to be performed with such a restriction).

Subsequently, as shown in FIG. 12F, a member 242 at the gluing position is moved so as to introduce the edge of the glued unfinished article (unfinished article wherein the cover 802 has been glued to the stack of the text sheets 801) to the position for trimming. At this time, members 274 and 275 are moved such that the glued unfinished article lies on the trimmer turn table.

As shown in FIG. 12G, a position control member 252 is moved so as to adjust the position of the glued unfinished article stacked on the trimmer turn table 255. A cutter 248 protruding from a trimmer unit 247 is moved in the vertical direction so as to perform trimming of the edge of the glued unfinished article. The trimmer turn table 255 has a function for turning at an angle of 90° and 180°, thereby enabling trimming of the three-side edges thereof. Subsequently, the position control member 252 is moved toward the tray 257, and the finished article subjected to trimming is conveyed and discharged to the tray 257 by actions of rollers 249, 253, 251, and 254.

Next, description will be made regarding pad binding without a cover.

Figure 11:
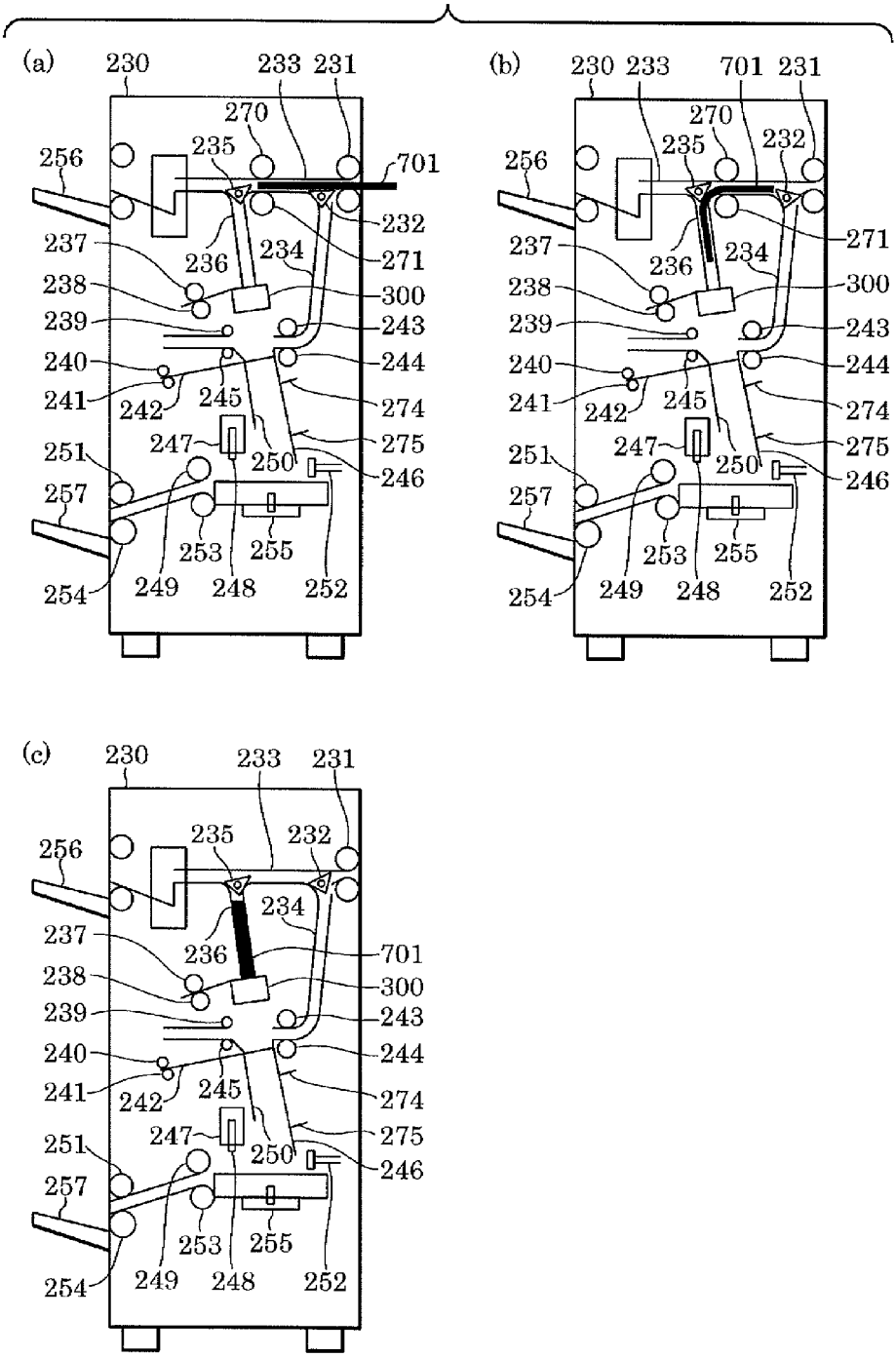
FIGS. 11A through 11C are diagrams for describing steps (a) through (c) of case binding wherein a cover is attached by a sheet processing device shown in FIG. 1.
Figure 12:
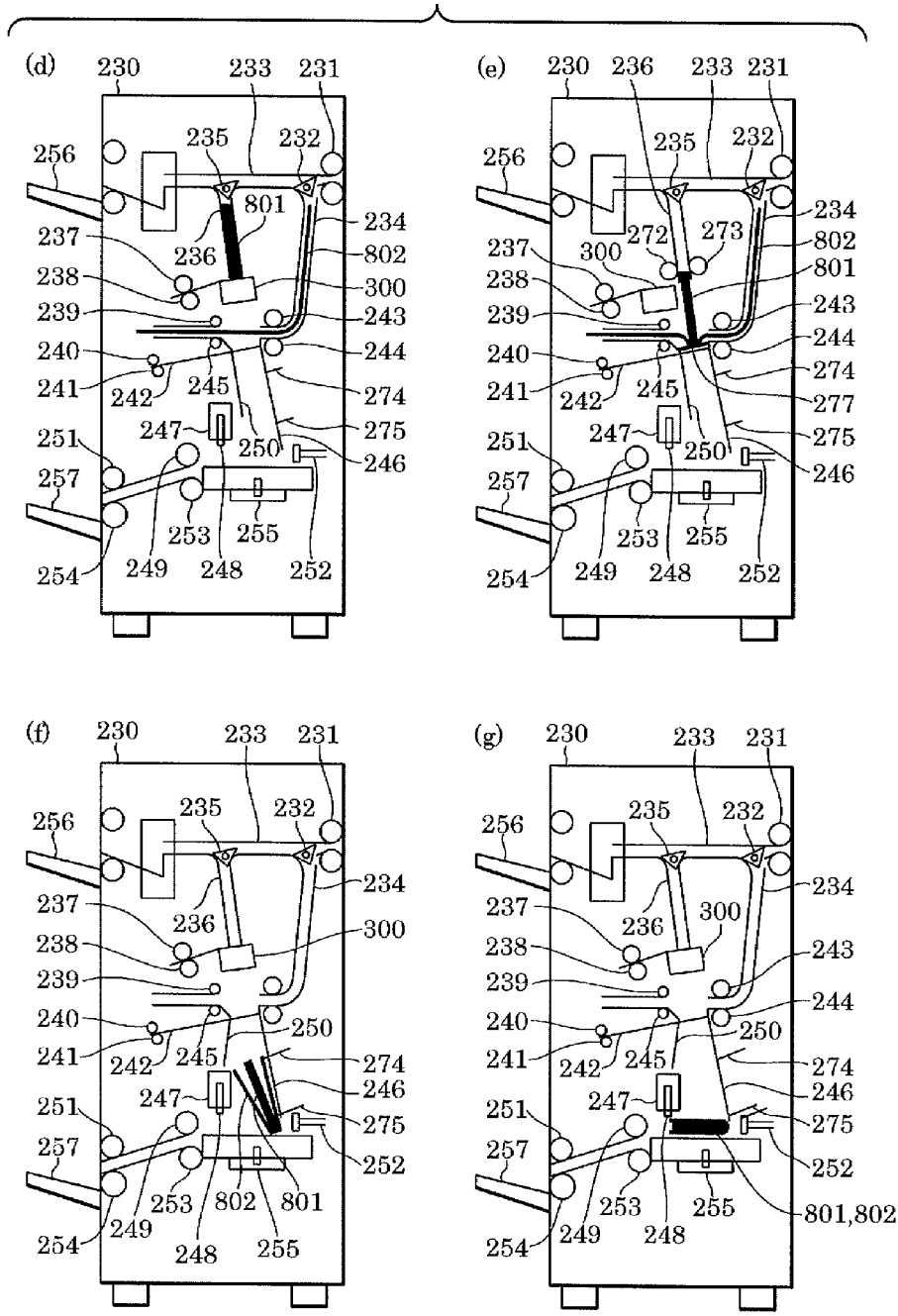
FIG. 12 is another diagram for describing steps (d) through (f) of case binding wherein a cover is attached by a sheet processing device shown in FIG. 1.

Pad binding is performed without the process wherein a cover is glued to a stack of text sheets. Accordingly, the operation of pad binding is the same as the operation of the case binding shown in FIGS. 11A through 12G except that the operations shown in FIGS. 11B and 12E are omitted. With the pad binding, the operation shown in FIG. 12E is omitted, thereby allowing the user to bind without restriction of the minimum number of text sheets, unlike case binding as described above (there is no need to determine the restriction of the minimum number of text sheets).

Description will be made below regarding control of case binding and pad binding according to the present embodiment with reference to FIGS. 13 and 14.

Figure 13:
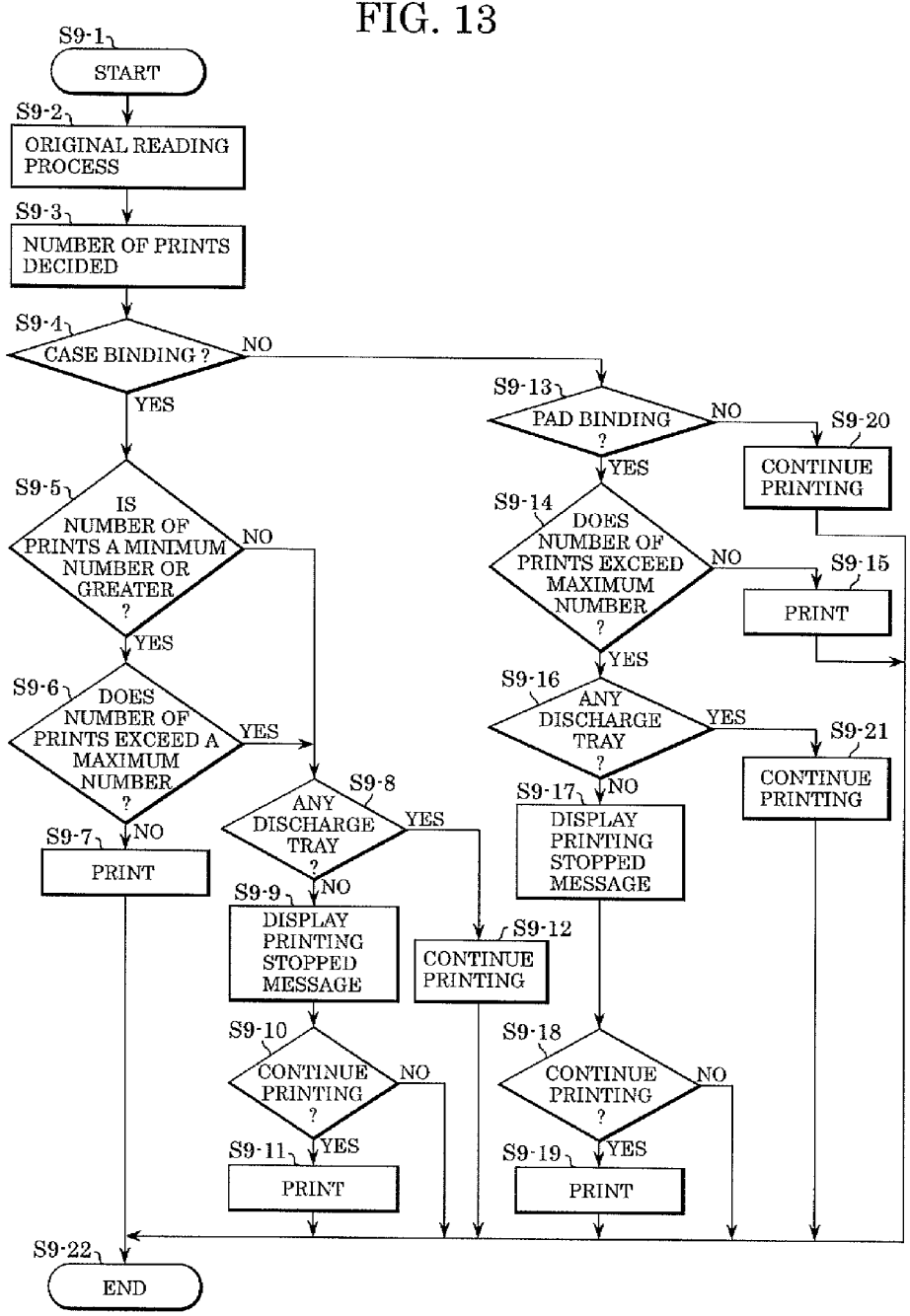
FIG. 13 is a flowchart illustrating an example of first control procedures according to the image forming system of the present invention.

FIG. 13 is a flowchart which shows an example of the first control procedures for an image formation apparatus according to the present invention. The process shown in the flowchart is realized by the CPU circuit unit 122 executing a program loaded to the RAM 125 from the ROM 124 or an unshown storage medium. Note that in the drawings, reference characters S9-1 through S9-22 denote corresponding steps. Let us say that the gluing unit 300 has a restriction of the minimum number of text sheets of 10, which is the minimum number of the text sheets which allows the user to glue a cover to the stack of the text sheets, and a restriction of the maximum number of text sheets of 150, which is the maximum number of the text sheets which allows the user to perform a gluing process by actions of the glue-binding unit 300.

Upon the user pressing the start key 4-241 shown in FIG. 4, the CPU circuit unit 122 starts processes (S9-1), wherein an original document is fed from an original document feeding device 101, the image data is read out by the reader unit 1 (S9-2), the number of sheets which are to be printed and output from the printer unit 2 (which will be referred to as "number of printing sheets" hereafter) is calculated and determined based upon readout results and setting information stored in the RAM 125 (S9-3). Note that "number of printing sheets" used here corresponds to "total number of sheets N" described above.

Next, the CPU circuit unit 122 determines whether or not case binding is set, based upon the setting information stored in the RAM 125 (S9-4). In a case wherein determination has been made that case binding is set, based upon the setting information stored in the RAM 125, the flow proceeds to Step S9-5, wherein the CPU circuit unit 122 determines whether or not the number of printing sheets is equal to or greater than the minimum number of text sheets which allows the following process.

In Step S9-5, in a case wherein the CPU circuit unit 122 has determined that the number of printing sheets is equal to or greater than the minimum number of sheets for processing, the flow proceeds to Step S9-6, wherein the CPU circuit unit 122 determines whether or not the number of printing sheets exceeds the maximum number of sheets for processing. In a case wherein determination has been made that the number of printing sheets does not exceed the maximum number of sheets for processing, the flow proceeds to Step S9-7, wherein case binding is performed as well as printing, whereby the process ends (9-22).

On the other hand, in a case wherein the CPU circuit unit 122 has determined that the number of printing sheets is not equal to or not greater (is smaller) than the minimum number of sheets for processing, in Step S9-5, or in a case wherein the CPU circuit unit 122 has determined that the number of printing sheets exceeds the maximum number of sheets for processing, in Step S9-6, the flow proceeds to Step S9-8, wherein determination is made whether or not there are any available discharge trays.

Figure 14A:
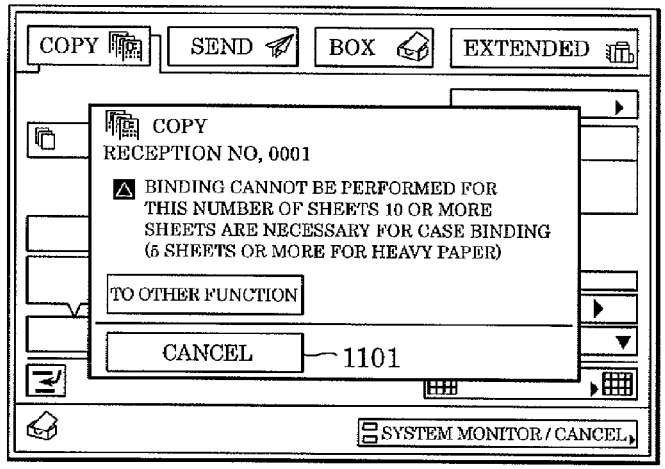
FIGS. 14A through 14C are model diagrams illustrating an example of a message screen displayed at the time of performing case binding and pad binding according to the image forming system of the present invention.

In a case wherein the CPU circuit unit 122 has determined that there is no available tray in Step S9-8, the flow proceeds to Step S9-9, wherein the CPU circuit unit 122 controls the liquid-crystal display unit 4-250 so as to display a message screen shown in FIG. 14A or FIG. 12B in step S9-6, and cancels printing, following which the flow proceeds to Step S9-10.

Figure 14B:
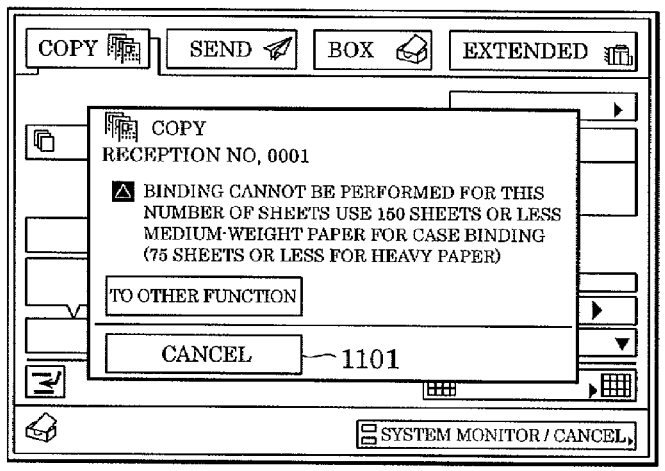
Figure 14C:
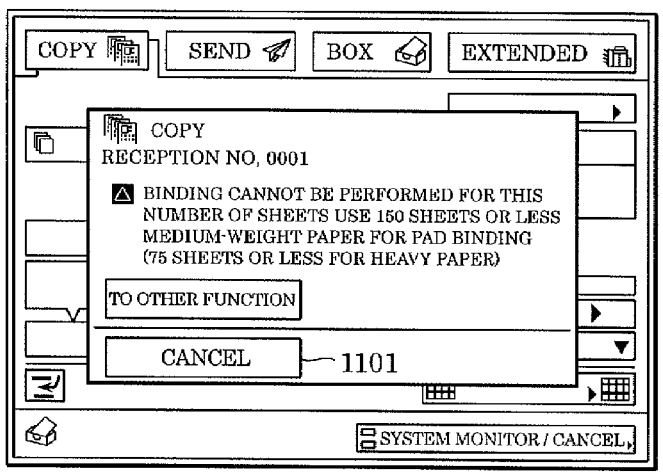

FIGS. 14A through 14C are schematic diagrams which show examples of message screens at the time of the case-binding process and pad-binding process for the image formation apparatus according to the present invention.

FIG. 14A shows an example of a message screen displayed in a case wherein determination has been made that number of printing sheets is not equal to or not greater than a predetermined minimum number at the time of case binding. FIG. 14B shows an example of a message screen displayed in a case wherein determination has been made that number of printing sheets exceeds a predetermined maximum number at the time of pad binding.

In FIG. 14, reference numeral 1101 denotes a cancel key. Upon the user pressing the cancel key 1101, a printing job is canceled.

The description will now return to the flowchart shown in FIG. 13. In Step S9-10, the CPU circuit unit 122 determines whether or not printing should be continued, based upon information whether or not the user has pressed the cancel key 1101 shown in FIG. 14A or 14B. In a case wherein determination has been made that the user has not pressed the cancel key 1101, and printing should be continued, the flow proceeds to Step S9-11, wherein printing is executed (note that case binding is inhibited), whereby the process ends (S9-22).

On the other hand, in a case wherein the CPU circuit unit 122 has detected the user pressing the cancel key 1101 shown in FIG. 14A in step S9-10, and printing should not be continued, the processing ends without printing (S9-22).

On the other hand, in a case wherein the CPU circuit unit 122 has determined that there are available discharge trays in step S9-8, the flow proceeds to Step S9-12, wherein printing is executed, and the printed sheet is discharged to an available tray (note that case binding is inhibited), whereby the process ends (S9-22).

On the other hand, in a case wherein the CPU circuit unit 122 has determined that case binding is not set, in Step S9-4, the flow proceeds to Step S9-13, wherein determination is made whether or not pad binding is set. In a case wherein determination has been made that pad binding is set, the flow proceeds to Step S9-14, wherein the CPU circuit unit 122 determines whether or not the number of printing sheets exceeds the maximum number of sheets for processing.

In Step S9-14, in a case wherein the CPU circuit unit 122 has determined that the number of printing sheets does not exceed the maximum number of sheets for processing, the flow proceeds to Step S9-15, wherein the pad binding process is performed as well as printing, whereby the process ends (S9-22).

On the other hand, in a case wherein the CPU circuit unit 122 has determined that the number of printing sheets exceeds the maximum number of sheets for processing, in step S9-14, the flow proceeds to Step S9-16, wherein determination is made whether or not there are any available discharge trays. In a case wherein there are no discharge available trays, the flow proceeds to Step S9-17, wherein the CPU circuit unit 122 controls the liquid crystal display unit 4-250 so as to display the message shown in FIG. 14C, and cancels printing, following which the flow proceeds to Step S9-18.

In Step S9-18, the CPU circuit unit 122 determines whether or not printing should be continued, based upon information whether or not the user has pressed the cancel key 1101 shown in FIG. 14C. In a case wherein determination has been made that the user has not pressed the cancel key 1101, and printing should be continued, the flow proceeds to Step S9-19, wherein printing is executed (note that the pad binding process is inhibited), whereby the process ends (S9-22).

On the other hand, in Step S9-18, in a case wherein the CPU circuit unit 122 has detected that the user pressing the cancel key 1101 shown in FIG. 14A, and has determined that printing should not be continued, the processing ends without printing (S9-22).

On the other hand, in Step S9-16, in a case wherein the CPU circuit unit 122 is that there are available discharge trays, the flow proceeds to Step S9-21, wherein printing is executed, and the printed sheet is discharged to an available discharge tray (note that the pad-binding process is inhibited), whereby the process ends (S9-22).

On the other hand, in a case wherein the CPU circuit unit 122 has determined that the pad binding is not set, in Step S9-13, the flow proceeds to Step S9-20, printing is executed, whereby the process ends (S9-22).

As described above, in a case wherein the number of printing sheets (the number of printing sheets which are to be printed and output from the printer unit 2) is smaller than the minimum number of sheets for processing, the CPU circuit unit 122 controls so as to inhibit only execution of the case-binding process by the glue-binding unit. Furthermore, in a case wherein the number of printing sheets exceeds the maximum number of sheets for processing, the CPU circuit unit 122 controls so as to inhibit execution of both the case-binding process and pad-binding process by the glue-binding unit. Such operations suppress trouble of the glue-binding unit due to departure from the aforementioned restrictions required for a small-size glue-binding unit.

Description will be made regarding specific examples.

Example 1

Let us say that the user places 50 A4-size both-sided original documents on the original document feeding device 101, A-4 size printing sheets on the cassette 214, and a desired-size printing sheet (in this case, 297 mm×424 mm, which corresponds to a pair of A4-size printing sheets and a spine with a width of 4 mm) on the manual feed tray 227. Then, upon the user making settings of case binding, and pressing the start key 4-241, according to the flow of the operation shown in FIGS. 6A through 7D, the process starts (S9-1), whereby the original documents are fed from the original document feeding device 101, and image data is read out from both sides of the 50 original documents (S9-2). That is to say, a total of 100 faces of the original-document data are read out.

Next, the flow proceeds to Step S9-2, wherein determination is made that 50 printing sheets are required for both-side printing based upon the fact that the 100 faces of original document data have been read out. That is to say, the system determines the number of printing sheets of "50". Note that the number of printing sheets is determined depending upon the printing settings such as single-side printing, 2-in-1 printing, and so forth. For example, in a case of printing settings of single-side printing, the number of printing sheets is set to 100. On the other hand, in a case of printing settings of 2-in-1 printing, the number of printing sheets is set to 50.

Next, in Step S9-4, determination is made that case binding is set, and the flow proceeds to Step S9-5. In this case, the number of printing sheets has been set to 50, and the minimum number of sheets for processing is 10. Accordingly, determination is made that the following process can be made, and the flow proceeds to Step S9-6. In this case, the number of printing sheets has been set to 50, and the maximum number of sheets for processing is 150. Accordingly, in Step S9-6, determination is made that the number of printing sheets does not exceed the maximum number of sheets for processing, and the flow proceeds to Step S9-7, wherein printing and case binding are executed, whereby the process ends (S9-22).

Example 2

Next, description will be made regarding an Example 2. In Example 2, let us say that the user places 5 A4-size both-sided original documents on the original document feeding device 101, A-4 size printing sheets on the cassette 214, and a desired-size printing sheet (in this case, 297 mm×424 mm, which corresponds to a pair of A4-size printing sheets and a spine with a width of 4 mm) on the manual feed tray 227.

Upon the user making settings of case binding, and pressing the start key 4-241, according to the flow of the operation shown in FIGS. 6A through 7D, the flow proceeds to Step S9-1, wherein the process starts, whereby the original documents are fed from the original document feeding device 101, and image data is read out from both sides of the 5 original documents. That is to say, a total of 10 faces of the original-document data is read out. The flow proceeds to step S9-2, and since the original document data is 10 faces, determination is made that this is 5 sheets in both-sided printing, so the number of printing sheets is set to 5. Subsequently, the flow proceeds to Step S9-4, wherein determination is made whether or not the printing settings thus made allow the following case binding. In this case, case binding is set, and accordingly, the flow proceeds to Step S9-5, wherein determination is made whether or not the number of printing sheets is equal to or greater than the minimum number of sheets for processing. In this case, the number of printing sheets is 5, and the minimum number of sheets for processing is 10, i.e., the number of printing sheets is not equal to or not greater than 10 which allows the following process. Accordingly, determination is made that the following process cannot be performed, and the flow proceeds to Step S9-8.

Next, in Step S9-8, determination is made whether or not there are any available discharge trays. Let us say that the tray 256 is available. In this case, the flow proceeds to Step S9-12, wherein printing is performed (without case binding), and the printed sheets are discharged to the tray 256.

On the other hand, in a case wherein there are no available discharge trays in Step S9-8, the flow proceeds to Step S9-9, wherein the message screen shown in FIG. 14A is displayed, and printing is canceled. Note that, upon the user pressing the cancel key shown in FIG. 14A, the current printing job is canceled.

Note that an arrangement may be made which allows the user to make unshown printing-confirmation settings wherein the flow proceeds to Step S9-9 from S9-8 even in a case that the tray 256 is available. In this case, the flow proceeds to Step S9-9, wherein the message screen shown in FIG. 14A is displayed, and the printing is canceled, regardless of presence or absence of the available tray 256. Note that such printing-confirmation settings allow the user to select execution of printing in a case that the tray 256 is available. The aforementioned printing-confirmation settings allow the user to press the start key 4-241 shown in FIG. 4. Upon the user pressing the start key 4-241, the CPU circuit unit 122 controls the apparatus such that the flow proceeds to Step S9-11, whereby the printing process is performed.

Example 3

Upon the user pressing the continuous reading key 811 shown in FIG. 6A, the system enters the mode which allows the user to further feed original documents. Description will be made below regarding a specific example of further feeding of original documents.

Let us say that the user places 100 of two-hundred A4-size both-sided original documents on the original document feeding device 101, A-4 size printing sheets on the cassette 214, a desired-size printing sheet (in this case, 297 mm×424 mm, which corresponds to a pair of A4-size printing sheets and a spine with a width of 4 mm) on the manual feed tray 227.

Upon the user making settings of case binding, and pressing the start key 4-241, according to the flow of the operation shown in FIGS. 6A through 7D, the flow proceeds to Step S9-1, wherein the process starts, whereby the original documents are fed from the original document feeding device 101, and image data is read out from both sides of the 100 original documents. That is to say, a total of 200 faces of the original-document data is read out. Next, the flow proceeds to Step S9-2, wherein determination is made that 100 printing sheets are required for both-side printing based upon the fact that the 200 faces of original document data have been read out.

The current mode allows the user to further feed original documents. Let us say that the user places the remaining 100 sheets of A4 size on the original document feeding device 101. In this stage, upon the user pressing the start key 4-241, image data is read out from both sides of the 100 original documents. That is to say, a total of 200 faces of the original-document data is read out. In this case, a total number of the original documents is 200, and accordingly, the total number of the original-document faces is 400. In this case, two-hundred printing sheets are required for both printing, and accordingly, the number of printing sheets is set to 200.

Then, the flow proceeds to Step S9-4, wherein determination is made whether or not case binding has been set. In this case, the case binding has been set, and accordingly, the flow proceeds to Step S9-5, wherein determination is made whether or not the number of printing sheets is equal to or greater than the minimum number of sheets for processing. In this case, the number of printing sheets is 200, and the minimum number of sheets for processing is 10. Accordingly, determination is made that the following process can be performed, and the flow proceeds to Step S9-6. In Step S9-6, determination is made that the following process cannot be performed, based upon the fact that the number of printing sheets is 200, and the maximum number of sheets for processing is 150. Next, the flow proceeds to Step S9-8, wherein determination is made whether or not there are any available trays. In this case, the tray 256 is available, and accordingly, the flow proceeds to Step S9-12, wherein the printed sheets are discharged to the tray 256.

In a case wherein determination has been made that there are no available trays in Step S9-8, the flow proceeds to Step S9-9, wherein the message screen shown in FIG. 14B is displayed, and printing is canceled. Upon the user pressing the cancel key displayed on the message screen shown in FIG. 14B, the current printing job is canceled.

Example 4

Let us say that the user places 50 A4-size both-sided original documents on the original document feeding device 101, and A-4 size printing sheets on the cassette 214. Upon the user making settings of pad binding, and pressing the start key 4-241, according to the flow of the operation shown in FIGS. 6A through 7D, the flow proceeds to Step S9-1, wherein the process starts, whereby the original documents are fed from the original document feeding device 101, and image data is read out from both sides of the 50 original documents. That is to say, a total of 100 faces of the original-document data is read out. Next, the flow proceeds to Step S9-2, wherein determination is made that 50 printing sheets are required for both-side printing based upon the fact that the 100 faces of original document data have been read out. That is to say, the number of printing sheets is set to 50. Then, the flow proceeds to Step S9-4, wherein determination is made whether or not case binding has been selected. In this case, pad binding has been selected, and accordingly the flow proceeds to Step S9-13. In Step S9-13, determination is made whether or not pad binding has been selected, and the flow proceeds to Step S9-14.

In Step S9-14, determination is made whether or not the number of printing sheets exceeds the maximum number of sheets for processing. In this case, the number of printing sheets is 50, and the maximum number of sheet which allows the following process is 150. Accordingly, determination is made that following printing can be performed, and the flow proceeds to Step S9-15, wherein printing is executed.

Example 5

In this example, let us say that the user places 5 A4-size both-sided original documents on the original document feeding device 101, and A-4 size printing sheets on the cassette 214. Upon the user making settings of pad binding, and pressing the start key 4-241, according to the flow of the operation shown in FIGS. 6A through 7D, the flow proceeds to Step S9-1, wherein the process starts, whereby the original documents are fed from the original document feeding device 101, and image data is read out from both sides of the 5 original documents. That is to say, a total of 10 faces of the original-document data is read out. Next, the flow proceeds to Step S9-2, wherein determination is made that 5 printing sheets are required for both-side printing based upon the fact that the 10 faces of original document data have been read out. That is to say, the number of printing sheets is set to 5. Then, the flow proceeds to Step S9-4, wherein determination is made whether or not case binding has been selected. In this case, pad binding has been selected, and accordingly the flow proceeds to Step S9-13. In Step S9-13, determination is made whether or not pad binding has been selected, and the flow proceeds to Step S9-14. In S9-14, determination is made whether or not the number of printing sheets exceeds the maximum number of sheets for processing. In this example, the number of printing sheets is 5, and the maximum number of sheets for processing is 150. Accordingly, the flow proceeds to Step S9-15, wherein printing is executed.

Example 6

Upon the user pressing the continuous reading key 811 shown in FIG. 6A, the system enters the mode which allows the user to further feed original documents. Description will be made below regarding a specific example of further feeding of original documents.

In this example, let us say that the user places 100 of two-hundred A4-size both-sided original documents on the original document feeding device 101, and A-4 size printing sheets on the cassette 214.

In this stage, upon the user making settings of pad binding, and pressing the start key 4-241, according to the flow of the operation shown in FIGS. 6A through 7D, the flow proceeds to Step S9-1, wherein the process starts, whereby the original documents are fed from the original document feeding device 101, and image data is read out from both sides of the 100 original documents. That is to say, a total of 200 faces of the original-document data is read out. Next, the flow proceeds to Step S9-2, wherein determination is made that 100 printing sheets are required for both-side printing based upon the fact that the 200 faces of original document data have been read out.

The current mode allows the user to further feed original documents. Let us say that the user places the remaining 100 sheets of A4 size on the original document feeding device 101. In this stage, upon the user pressing the start key 4-241, image data is read out from both sides of the 100 original documents. That is to say, a total of 200 faces of the original-document data is read out. In this case, a total number of the original documents is 200, and accordingly, the total number of the original-document faces is 400. In this case, two-hundred printing sheets are required for both printing, and accordingly, the number of printing sheets is set to 200.

Then, the flow proceeds to Step S9-4, wherein determination is made whether or not case binding has been selected. In this case, pad binding has been selected, and accordingly the flow proceeds to Step S9-13. In Step S9-13, determination is made whether or not pad binding has been selected, and the flow proceeds to Step S9-14. In S9-14, determination is made whether or not the number of printing sheets exceeds the maximum number of sheets for processing. In this example, the number of printing sheets is 200, and the maximum number of sheets for processing is 150. Accordingly, determination is made that the following process cannot be performed, and the flow proceeds to Step S9-16, wherein determination is made whether or not there are any available trays. In this case, the tray 256 is available, and accordingly, the flow proceeds Step S9-21, wherein the printed sheets are discharged to the tray 256.

In a case wherein determination has been made that there are no available trays in Step S9-16, the flow proceeds to Step S9-17, wherein the message screen shown in FIG. 14C is displayed, and printing is canceled. Specifically, upon the user pressing the cancel key displayed on the message screen shown in FIG. 14C, the current printing job is canceled.

Note that an arrangement may be made which allows the user to make printing-confirmation settings wherein the flow proceeds to Step S9-9 even in a case that the tray 256 is available. In this case, the flow proceeds to Step S9-17, wherein the message screen shown in FIG. 14C is displayed, and the printing is canceled, regardless of presence or absence of the available tray 256. Note that such printing-confirmation settings allow the user to select execution of printing in a case that the tray 256 is available. The aforementioned printing-confirmation settings allow the user to press the start key 4-241 shown in FIG. 4. Upon the user pressing the start key 4-241, the CPU circuit unit 122 operates such that the flow proceeds to Step S9-19, whereby the CPU circuit unit 122 controls the printing process.

As described above, the CPU circuit unit 122 instructs the user to specify and select the sheet-size alone, which can be used for bookbinding, according to the operation flow shown in FIGS. 6A through 7D. The following process with the number of sheets outside of a predetermined restriction often leads to trouble such as paper jamming and so forth. With the present embodiment, readout of original documents is performed prior to the following process such as printing process and so forth, in order to determine the number of printing sheets.

Upon determination of the number of printing sheets after readout of the original documents, determination is made whether or not the following process can be performed. The case binding shown in FIG. 8A, wherein a cover is glued to a stack of text sheets, requires the process wherein a cover is pressed into contact with a stack of text sheets, leading to restriction that a sufficient thickness thereof is required, resulting in a restriction value of the minimum number of sheets for processing. On the other hand, the pad binding shown in FIG. 8B, wherein bookbinding is performed without a cover, does not require the process wherein a cover is pressed into contact with a stack of text sheets, and accordingly, bookbinding can be performed without restriction of the minimum number of sheets for processing. With the present embodiment, the CPU circuit unit 122 checks the kind of bookbinding specified by the user. In a case of the user specifying pad binding, the CPU circuit unit 122 controls the process without restriction of the minimum number of sheets for processing.

Furthermore, such a small-size apparatus leads to restriction of the maximum number of sheets for processing. With the present embodiment, the CPU circuit unit 122 controls the process with restriction of the maximum number of sheets for processing, both in the aforementioned case binding and pad binding.

Specifically, in a case wherein determination has been made that the number of sheets exceeds a predetermined restriction based upon the determination results corresponding to the kind of glue-binding as described above, the CPU circuit unit 122 controls the apparatus so as to stop the following operation or so as to continue the printing process without inhibited bookbinding functions.

With the present embodiment, the CPU circuit unit 122 controls the process giving consideration to the restriction, thereby enabling operation of a small-size glue-binding apparatus without trouble. This allows the user to introduce a glue-binding apparatus with low cost and with a small area required for installing the apparatus, i.e., provides low-cost glue-binding.

Furthermore, the present embodiment enables pad binding without a cover without restriction of the minimum number of sheets for processing, serving as simple bookbinding.

With the present embodiment, the glue-binding apparatus is controlled giving consideration to the restriction due to the small size of the apparatus, thereby enabling bookbinding while preventing trouble due to settings for printing and bookbinding, which have been specified by the uninformed user and are outside of the restriction of the maximum number of sheets and the minimum number of sheets.

Second Embodiment

While description has been made in the aforementioned first embodiment regarding an arrangement wherein the process is controlled with restriction of the single minimum number of sheets and the single maximum number of sheets, regardless of the kind of sheets, an arrangement may be made wherein the maximum number of sheets and the minimum number of sheets for processing are changed corresponding to the kind of printing sheets. Description will be made below regarding such an arrangement.

Figure 15:
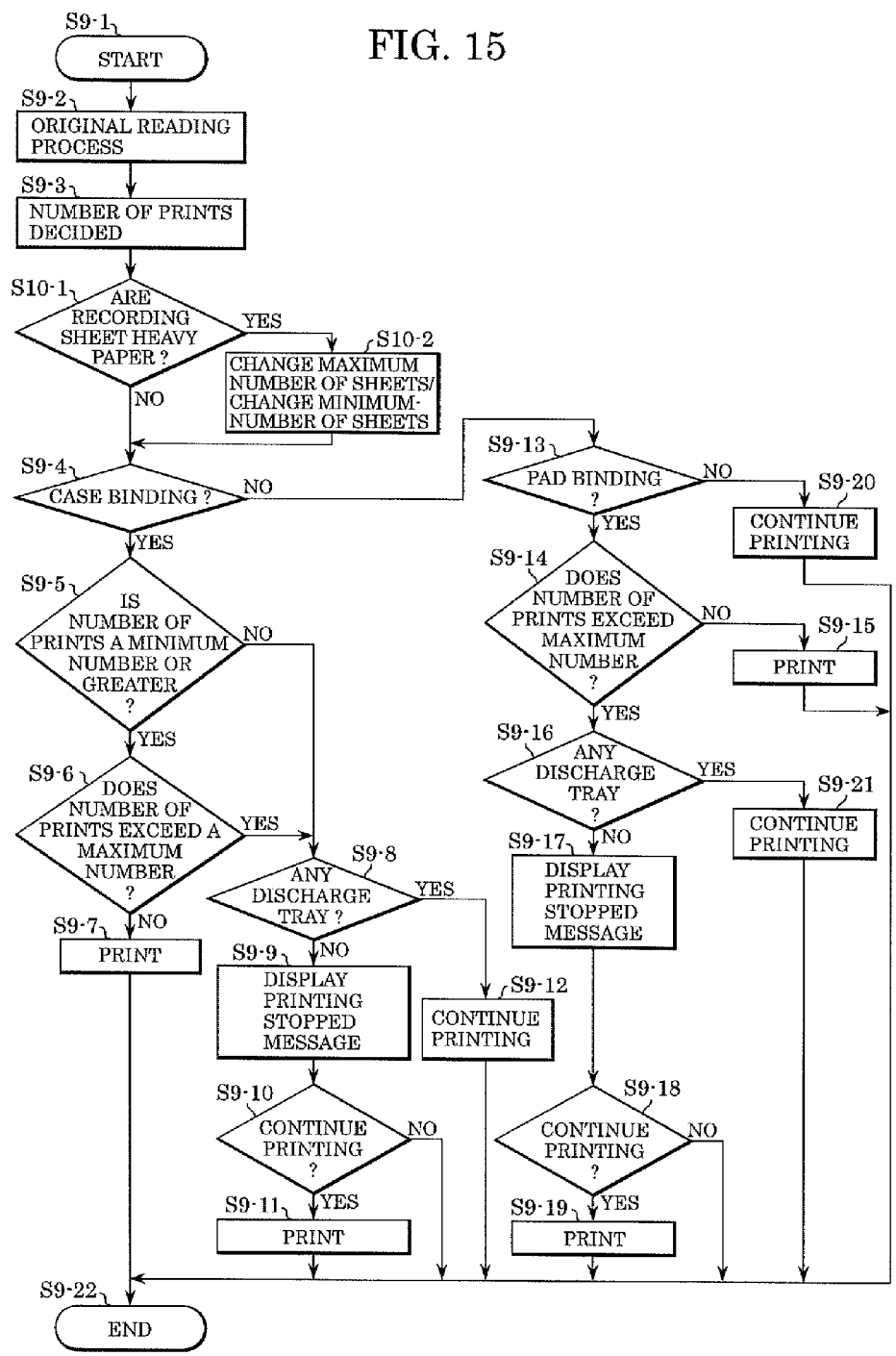
FIG. 15 is a flowchart illustrating an example of second control procedures according to the image forming system of the present invention.

Case binding and pad binding control according to the present embodiment will be described with reference to FIG. 15. FIG. 15 is a flowchart which shows an example of a second control procedures for the image formation apparatus according to the present invention. The process shown in the flowchart is realized by the CPU circuit unit 122 shown in FIG. 2 executing a program loaded to the RAM 125 from the ROM 124 or an unshown storage medium. Note that in the drawings, reference characters S9-1 through S9-22 and S10-1 and S10-2, denote corresponding steps. Note that the same steps as those shown in FIG. 13 are denoted by the same reference characters, and description thereof will be omitted. Let us say that an arrangement according to the present embodiment has a restriction of the minimum number of text sheets of 10, and maximum number of text sheets of 150, for allowing the following process. Furthermore, let us say that in a case wherein heavy sheets are used for printing sheets, the minimum number of sheets is changed to 5, and the maximum number of sheets is changed to 75.

Upon determination of the number of printing sheets in Step S9-3, the flow proceeds to Step S10-1, wherein the CPU circuit unit 122 determines whether or not heavy sheets have been specified as printing sheets. In a case wherein determination has been made that heavy sheets have not been specified as printing sheets, the flow proceeds to Step S9-4 in the same way as described in the first embodiment.

On the other hand, in a case wherein the CPU circuit unit 122 has determined that heavy sheets have been specified as printing sheets, in Step S10-1, the flow proceeds to Step S10-2, wherein the maximum number of sheets for processing is changed from 150 to 75, and the minimum number of sheets for processing is changed from 10 to 5, following which the flow proceeds to Step S9-4.

Note that the CPU circuit unit 122 determines the kind of printing sheets based upon the sheet-feeding cassette setting information stored in unshown nonvolatile memory within the RAM 125 and the settings of the sheet-feeding cassette in the current job; each cassette serving as a dedicated cassette for storing a predetermined kind of printing sheets.

Description will be made regarding specific examples.

Example 1

Let us say that the user places 50 A4-size both-sided original documents on the original document feeding device 101, A-4 size heavy printing sheets on the cassette 214, and a desired-size printing sheet (in this case, 297 mm×424 mm, which corresponds to a pair of A4-size printing sheets and a spine with a width of 4 mm) on the manual feed tray 227. Then, upon the user making settings of case binding, and pressing the start key 4-241, according to the flow of the operation shown in FIGS. 6A through 7D, the process starts (S9-1), whereby the original documents are fed from the original document feeding device 101, and image data is read out from both sides of the 50 original documents. That is to say, a total of 100 faces of the original-document data is read out.

Next, the flow proceeds to Step S9-3, wherein determination is made that 50 printing sheets are required for both-side printing based upon the fact that the 100 faces of original document data have been read out. That is to say, the number of printing sheets is set to 50.

Next, the apparatus checks the kind of printing sheets. In Step S10-1, determination is made whether or not heavy sheets have been specified as printing sheets. In this example, heavy sheets have been specified as printing sheets. Accordingly, the flow proceeds to Step S10-2, wherein the minimum number of sheets for processing is changed to 5, and the maximum number of sheets for processing is changed to 75, following which the flow proceeds to Step S9-4.

Subsequently, determination is made that case binding has been specified, in Step S9-4, following which the flow proceeds to Step S9-5. In this case, the number of printing sheets has been set to 50, and the minimum number of sheets for processing is 5. Accordingly, determination is made that the following process can be made, and the flow proceeds to Step S9-6. In this case, the number of printing sheets has been set to 50, and the maximum number of sheets for processing is 75. Accordingly, in Step S9-6, determination is made that the number of printing sheets does not exceed the maximum number of sheets for processing, and the flow proceeds to Step S9-7, wherein printing and case binding are executed, whereby the process ends (S9-22).

Example 2

In Example 2, let us say that the user places 5 A4-size both-sided original documents on the original document feeding device 101, A-4 size heavy printing sheets on the cassette 214, and a desired-size printing sheet (in this case, 297 mm×424 mm, which corresponds to a pair of A4-size printing sheets and a spine with a width of 4 mm) on the manual feed tray 227.

Upon the user making settings of case binding, and pressing the start key 4-241, according to the flow of the operation shown in FIGS. 6A through 7D, the process starts (S9-1), whereby the original documents are fed from the original document feeding device 101, and image data is read out from both sides of the three original documents in step S9-2. That is to say, a total of six faces of the original-document data is read out. The flow proceeds to Step S9-3, wherein determination is made that three printing sheets are required for both-side printing based upon the fact that the six faces of original document data have been read out. That is to say, the number of printing sheets is set to three.

Next, the apparatus checks the kind of printing sheets. In Step S10-1, determination is made whether or not heavy sheets have been specified as printing sheets. In this example, heavy sheets have been specified as printing sheets. Accordingly, the flow proceeds to Step S10-2, wherein the minimum number of sheets for processing is changed to 5, and the maximum number of sheets for processing is changed to 75, following which the flow proceeds to Step S9-4.

Subsequently, in Step S9-4, determination is made whether or not case binding has been specified. In this case, case binding has been specified, and accordingly, the flow proceeds to Step S9-5, wherein determination is made whether or not the number of printing sheets is equal to or greater than the minimum number of sheets for processing. In this case, the number of printing sheets has been set to 3, and the minimum number of sheets for processing is 5, and accordingly the following process cannot be performed, and the flow proceeds to Step S9-8.

Next, in Step S9-8, determination is made whether or not there are any available trays. Let us say that the tray 256 is available. In this case, the flow proceeds to Step S9-12, wherein printing is performed (without case binding), and the printed sheets are discharged to the tray 256.

On the other hand, in a case wherein there are no available trays in Step S9-8, the flow proceeds to Step S9-9, wherein the message screen shown in FIG. 14A is displayed, and printing is canceled. Note that, upon the user pressing the cancel key shown in FIG. 14A, the current printing job is canceled.

Note that an arrangement may be made which allows the user to make unshown printing-confirmation settings wherein the flow proceeds to Step S9-9 from S9-8 even in a case that the tray 256 is available. In this case, the flow proceeds to Step S9-9, wherein the message screen shown in FIG. 14A is displayed, and the printing is canceled, regardless of presence or absence of the available tray 256. Note that such printing-confirmation settings allow the user to select execution of printing in a case that the tray 256 is available. The aforementioned printing-confirmation settings allow the user to press the start key 4-241 shown in FIG. 4. Upon the user pressing the start key 4-241, the CPU circuit unit 122 controls the apparatus such that the flow proceeds to Step S9-11, whereby printing process is performed.

Example 3

In Example 3, let us say that the user places 100 A4-size both-sided original documents on the original document feeding device 101, A-4 size heavy printing sheets on the cassette 214, and a desired-size printing sheet (in this case, 297 mm×424 mm, which corresponds to a pair of A4-size printing sheets and a spine with a width of 4 mm) on the manual feed tray 227.

Upon the user making settings of case binding, and pressing the start key 4-241, according to the flow of the operation shown in FIGS. 6A through 7D, the process starts (S9-1), whereby the original documents are fed from the original document feeding device 101, and image data is read out from both sides of the 100 original documents. That is to say, a total of 200 faces of the original-document data is read out. The flow proceeds to Step S9-2, wherein determination is made that 100 printing sheets are required for both-side printing based upon the fact that the 200 faces of original document data have been read out. That is to say, the number of printing sheets is set to 100 in Step S9-3.

Next, the apparatus checks the kind of printing sheets. In Step S10-1, determination is made whether or not heavy sheets have been specified as printing sheets. In this example, heavy sheets have been specified as printing sheets. Accordingly, the flow proceeds to Step S10-2, wherein the minimum number of sheets for processing is changed to 5, and the maximum number of sheets for processing is changed to 75, following which the flow proceeds to Step S9-4.

Subsequently, in Step S9-4, determination is made whether or not case binding has been specified. In this case, case binding has been specified, and accordingly, the flow proceeds to Step S9-5, wherein determination is made whether or not the number of printing sheets is equal to or greater than the minimum number of sheets for processing. In this case, the number of printing sheets has been set to 100, and the minimum number of sheets for processing is 5, and accordingly, determination is made that the following process can be performed, whereby the flow proceeds to Step S9-6. In this case, the number of printing sheets has been set to 100, and the maximum number of sheets for processing is 75, and accordingly, in Step S9-6, determination is made that the following process cannot be performed due to excessive number of printing sheets exceeding the maximum number of sheets for processing, whereby the flow proceeds to Step S9-8.

Next, in Step S9-8, determination is made whether or not there are any available trays. Let us say that the tray 256 is available. In this case, the flow proceeds to Step S9-12, wherein printing is performed (without case binding), and the printed sheets are discharged to the tray 256.

On the other hand, in a case wherein there are no available trays in Step S9-8, the flow proceeds to Step S9-9, wherein the message screen shown in FIG. 14A is displayed, and printing is canceled. Note that, upon the user pressing the cancel key shown in FIG. 14A, the current printing job is canceled.

Note that an arrangement may be made which allows the user to make unshown printing-confirmation settings wherein the flow proceeds to Step S9-9 from S9-8 even in a case that the tray 256 is available. In this case, the flow proceeds to Step S9-9, wherein the message screen shown in FIG. 14A is displayed, and the printing is canceled, regardless of presence or absence of the available tray 256. Note that such printing-confirmation settings allow the user to select execution of printing in a case that the tray 256 is available. The aforementioned printing-confirmation settings allow the user to press the start key 4-241 shown in FIG. 4. Upon the user pressing the start key 4-241, the CPU circuit unit 122 controls the apparatus such that the flow proceeds to Step S9-11, whereby printing process is performed.

Example 4

In Example 4, let us say that the user places 50 A4-size both-sided original documents on the original document feeding device 101, and A-4 size heavy printing sheets on the cassette 214. Upon the user making settings of pad binding, and pressing the start key 4-241, according to the flow of the operation shown in FIGS. 6A through 7D, the flow proceeds to Step S9-1, wherein the process starts. As a result, in Step S9-2, the original documents are fed from the original document feeding device 101, and image data is read out from both sides of the 50 original documents. That is to say, a total of 100 faces of the original-document data is read out. The flow proceeds to Step S9-3, wherein determination is made that 100 printing sheets are required for both-side printing based upon the fact that the 100 faces of original document data have been read out. That is to say, the number of printing sheets is set to 50.

Next, the apparatus checks the kind of printing sheets. In Step S10-1, determination is made whether or not heavy sheets have been specified as printing sheets. In this example, heavy sheets have been specified as printing sheets. Accordingly, the flow proceeds to Step S10-2, wherein the minimum number of sheets for processing is changed to 5, and the maximum number of sheets for processing is changed to 75, following which the flow proceeds to Step S9-4.

Subsequently, in Step S9-4, determination is made whether or not case binding has been specified. In this case, pad binding has been specified, and accordingly, the flow proceeds to Step S9-13, wherein determination is made whether or not pad binding has been specified, following which the flow proceeds to Step S9-14.

In Step S9-14, determination is made whether or not the number of printing sheets exceeds the maximum number of sheets for processing. In this case, the number of printing sheets has been set to 50, and the maximum number of sheets for processing is 75, and accordingly, determination is made that printing can be made, following which the flow proceeds to Step S9-15, wherein printing is executed.

Example 5

In Example 5, let us say that the user places three A4-size both-sided original documents on the original document feeding device 101, and A-4 size heavy printing sheets on the cassette 214. Upon the user making settings of pad binding, and pressing the start key 4-241, according to the flow of the operation shown in FIGS. 6A through 7D, the flow proceeds to Step S9-1, wherein the process starts. As a result, in Step S9-2, the original documents are fed from the original document feeding device 101, and image data is read out from both sides of the three original documents. That is to say, a total of six faces of the original-document data is read out. The flow proceeds to Step S9-3, wherein determination is made that three printing sheets are required for both-side printing based upon the fact that the six faces of original document data have been read out. That is to say, the number of printing sheets is set to 3.

Next, the apparatus checks the kind of printing sheets. In Step S10-1, determination is made whether or not heavy sheets have been specified as printing sheets. In this example, heavy sheets have been specified as printing sheets. Accordingly, the flow proceeds to Step S10-2, wherein the minimum number of sheets for processing is changed to 5, and the maximum number of sheets for processing is changed to 75, following which the flow proceeds to Step S9-4.

Subsequently, in Step S9-4, determination is made whether or not case binding has been specified. In this case, pad binding has been specified, and accordingly, the flow proceeds to Step S9-13, wherein determination is made whether or not pad binding has been specified, following which the flow proceeds to Step S9-14. In Step S9-14, determination is made whether or not the number of printing sheets exceeds the maximum number of sheets for processing. In this case, the number of printing sheets has been set to three, and the maximum number of sheets for processing is 75, the flow proceeds to Step S9-15, wherein printing is executed.

Example 6

In Example 6, let us say that the user places 100 A4-size both-sided original documents on the original document feeding device 101, and A-4 size heavy printing sheets on the cassette 214. Upon the user making settings of pad binding, and pressing the start key 4-241, according to the flow of the operation shown in FIGS. 6A through 7D, the flow proceeds to Step S9-1, wherein the process starts. As a result, in Step S9-2, the original documents are fed from the original document feeding device 101, and image data is read out from both sides of the 100 original documents. That is to say, a total of 200 faces of the original-document data is read out. The flow proceeds to Step S9-3, wherein determination is made that 100 printing sheets are required for both-side printing based upon the fact that the 200 faces of original document data have been read out. That is to say, the number of printing sheets is set to 100.

Next, the apparatus checks the kind of printing sheets. In Step S10-1, determination is made whether or not heavy sheets have been specified as printing sheets. In this example, heavy sheets have been specified as printing sheets. Accordingly, the flow proceeds to Step S10-2, wherein the minimum number of sheets for processing is changed to 5, and the maximum number of sheets for processing is changed to 75, following which the flow proceeds to Step S9-4.

Subsequently, in Step S9-4, determination is made whether or not case binding has been specified. In this case, pad binding has been specified, and accordingly, the flow proceeds to Step S9-13, wherein determination is made whether or not pad binding has been specified, following which the flow proceeds to Step S9-14. In Step S9-14, determination is made whether or not the number of printing sheets exceeds the maximum number of sheets for processing. In this case, the number of printing sheets has been set to 100, and the maximum number of sheets for processing is 75, and accordingly, determination is made that the following process cannot be performed, following which the flow proceeds to Step S9-16, wherein determination has been made whether or not there are any available trays. In this case, the tray 256 is available, and accordingly, the flow proceeds to Step S9-21, wherein printing is performed, following which the printed sheets are discharged to the tray 256.

On the other hand, in a case wherein there are no available trays in Step S9-16, the flow proceeds to Step S9-17, wherein the message screen shown in FIG. 14C is displayed, and printing is canceled. Note that, upon the user pressing the cancel key shown in FIG. 14C, the current printing job is canceled.

Note that an arrangement may be made which allows the user to make unshown printing-confirmation settings wherein the flow proceeds to Step S9-17 from S9-16 even in a case that the tray 256 is available. In this case, the flow proceeds to Step S9-17, wherein the message screen shown in FIG. 14C is displayed, and the printing is canceled, regardless of presence or absence of the available tray 256. Note that such printing-confirmation settings allow the user to select execution of printing in a case that the tray 256 is available. The aforementioned printing-confirmation settings allow the user to press the start key 4-241 shown in FIG. 4. Upon the user pressing the start key 4-241, the CPU circuit unit 122 controls the apparatus such that the flow proceeds to Step S9-19, whereby printing process is performed.

While description has been made in the aforementioned embodiment regarding an arrangement wherein, only in the event that heavy sheets have been specified as printing sheets, the maximum number of sheets and the minimum number of sheets for processing are changed, an arrangement may be made wherein the maximum number of sheets and the minimum number of sheets for processing are changed corresponding to multiple kinds of printing sheets (multiple kinds of sheets classified based upon the thickness or the like).

As described above, the CPU circuit unit 122 determines and sets the restriction conditions (maximum number of sheets and minimum number of sheets for processing) based upon the kind of printing sheets, thereby enabling execution of the following process while preventing trouble of the apparatus.

This enables bookbinding while preventing trouble due to settings for printing and bookbinding, which have been specified by the uninformed user and are outside of the restriction of the maximum number of sheets and the minimum number of sheets for processing; the restriction being determined based upon the kind of the printing sheets.

Third Embodiment

Now, description has been made in the above first and second embodiments regarding a configuration for simply performing the printing process without performing case binding in the event that case binding is not usable due to the number of printing sheets being smaller than the minimum number of sheets for processing; however, a configuration may be made wherein pad binding is performed in the event that case binding is not usable due to the number of printing sheets being smaller than the minimum number of sheets for processing. The following is a description of such an embodiment.

Figure 16:
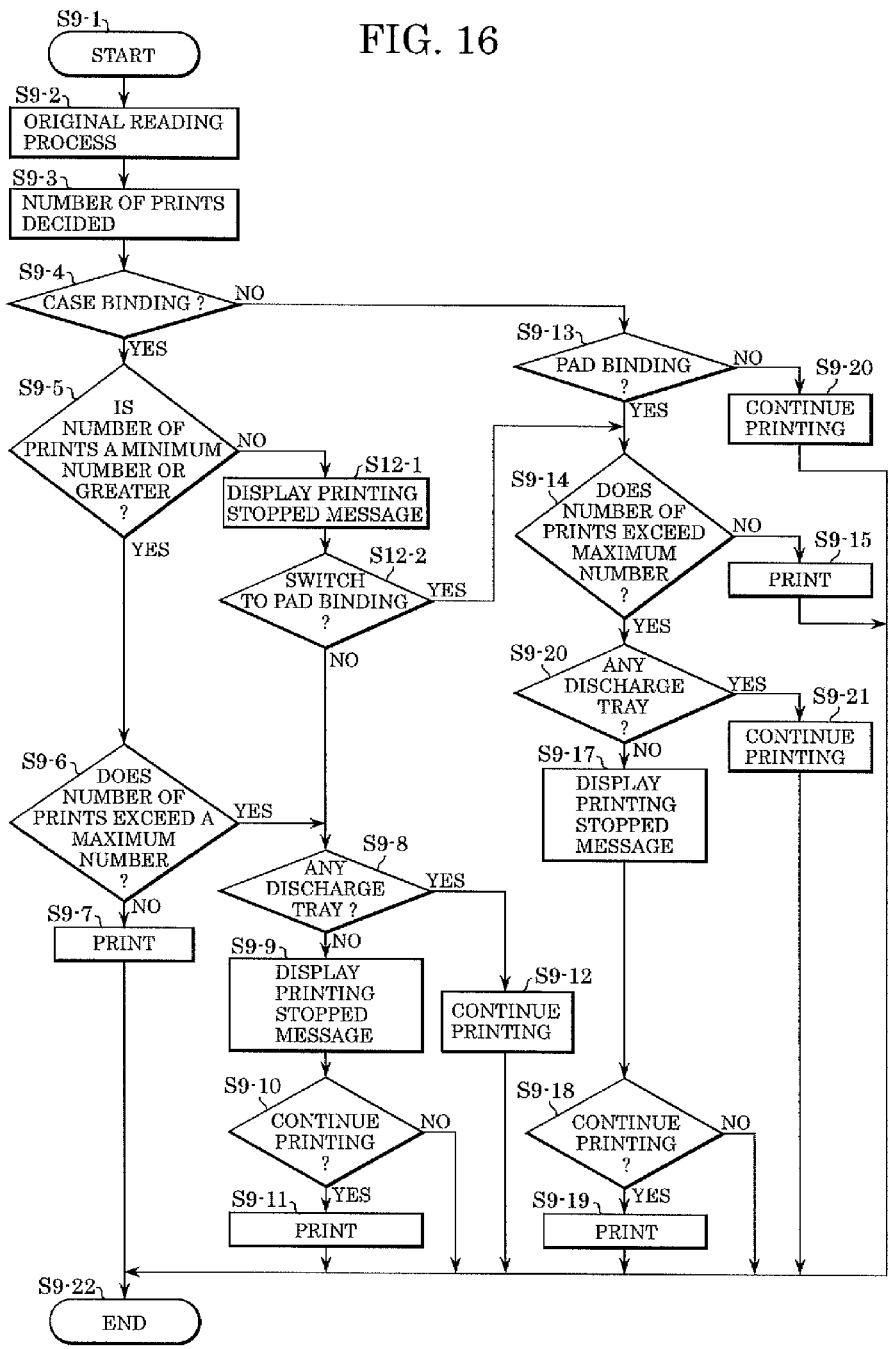
FIG. 16 is a flowchart illustrating an example of third control procedures according to the image forming system of the present invention.

The case binding and pad binding processes according to the present embodiment will be described now with reference to FIGS. 16 and 17. FIG. 16 is a flowchart illustrating an example of third control procedures carried out in the image forming apparatus according to the present invention. The processing of the flowchart is realized by the CPU circuit unit 122 shown in FIG. 2 loading a program, stored in the ROM 124 or another unshown storage medium to the RAM 125, and executing the program. Note that S9-1 through S9-22, S12-1, and S12-2 each represent steps, denoted with the same step Nos. as in FIG. 13, and accordingly description thereof will be omitted. Also, with the present embodiment, the minimum number of sheets for processing is 10, and the maximum number of sheets is 150, for example.

Figure 17:
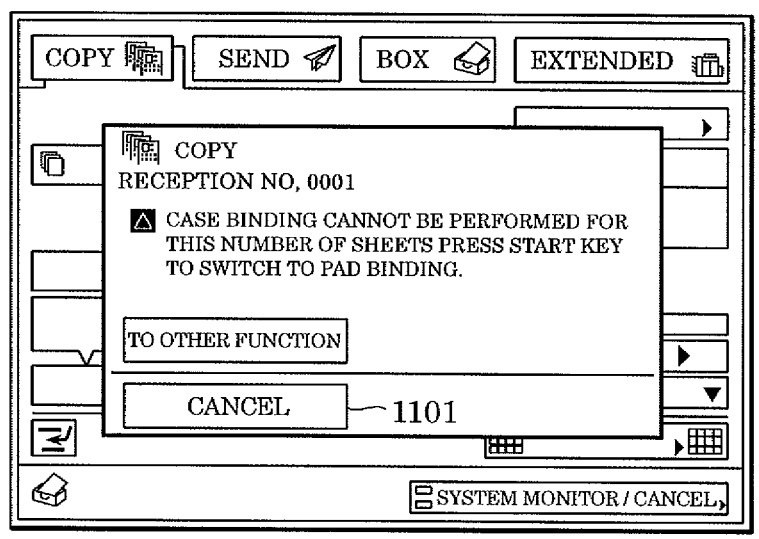
FIG. 17 is a model diagram illustrating an example of a message screen displayed in the event that case binding cannot be performed due to the number of sheets printed being less than the minimum number of sheets capable of being processed, according to the image forming xsystem of the present invention.

In Step S9-4, determination is made that case binding has been specified, the flow proceeds to step S9-5, and upon the CPU circuit unit 122 determining that case binding cannot be performed due to the number of printing sheets being smaller than the minimum number of sheets for processing, the message screen shown in FIG. 17 is displayed on the liquid crystal display unit 4-250 in step S12-1, control is effected so as to cancel the printing, and the flow proceeds to step S12-2.

FIG. 17 is a model diagram illustrating an example of a message displayed in the event that case binding is not available due to the number of printing sheets being smaller than the minimum number of sheets for processing.

In FIG. 17, reference numeral 1101 denotes a cancel key, which can be pressed to cancel a printing job. Also, in the event that the start key 4-241 shown in FIG. 4 is pressed while the message screen shown in FIG. 17 is being displayed, the case binding can be switched to pad binding.

Now, let us return to description of the flowchart in FIG. 16. In step S12-2, the CPU circuit unit 122 determines whether or not the case binding has been switched to pad binding by whether or not the start key 4-241 has been pressed. In the event that determination is made that the start key 4-241 has been pressed with the message screen shown in FIG. 17 displayed, the flow switches to pad binding, and the flow proceeds to step S9-14.

On the other hand, in the event that determination is made that the start key 4-241 has not been pressed with the message screen shown in FIG. 17 displayed in step S12-2, the flow proceeds to step S9-8 without switching to pad binding. This will be described in greater detail by way of examples.

Example 1

Let us say that the user places 5 A4-size both-sided original documents on the original document feeding device 101, A-4 size heavy printing sheets on the cassette 214, and a desired-size printing sheet (in this case, 297 mm×424 mm, which corresponds to a pair of A4-size printing sheets and a spine with a width of 4 mm) on the manual feed tray 227. Then, upon the user making settings of case binding, and pressing the start key 4-241, according to the flow of the operation shown in FIGS. 6A through 7D, the process starts (S9-1), whereby the original documents are fed from the original document feeding device 101, and image data is read out from both sides of the 5 original documents (S9-2). That is to say, a total of 10 faces of the original-document data is read out.

Next, the flow proceeds to Step S9-3, wherein determination is made that 5 printing sheets are required for both-side printing based upon the fact that the 10 faces of original document data have been read out. That is to say, the number of printing sheets is set to 5.

In Step S9-4, determination is made that case binding has been specified, the flow proceeds to step S9-5. In this case, determination is made that case binding cannot be performed due to the number of printing sheets being smaller than the minimum number of sheets for processing, since the minimum number of sheets for processing is 10 while the number of printing sheets is 5, so the flow proceeds to step S12-1, the message screen shown in FIG. 17 is displayed, and the printing is cancelled.

Next, determination is made regarding whether or not the job can be switched to pad binding. In the event that the CPU circuit unit 122 detects that the start key 4-241 has been pressed by the user with the message screen shown in FIG. 17 displayed, the CPU circuit unit 122 determines to switch the job to pad binding.

In the event that determination to switch the job to pad binding has been made in step S12-2, the flow proceeds to step S9-14, wherein determination is made regarding whether or not the number of printing sheets exceeds the maximum number of sheets for processing. In this case, the number of printing sheets is 100 sheets and the maximum number of sheets for processing is 150, so determination is made that discharge can be performed, the flow proceeds to step S9-15, the body sheets are printed, and pad binding is performed.

On the other hand, in a case wherein determination has been made not to switch to pad binding in step S12-2, the flow proceeds to step S9-8, wherein determination is made whether or not there are any available trays. Currently, discharge can be made to the tray 256, so the flow proceeds to step S9-12 where printing is performed, and sheets are discharged to the tray 256.

In a case wherein there are no available trays in step S9-8, the flow proceeds to Step S9-9, the message shown in FIG. 14B is displayed, and printing is canceled. The printing job can be cancelled by pressing the cancel key displayed in the message screen shown in FIG. 14B.

While an arrangement has been described with reference to the flowchart in FIG. 16 wherein, in the event that a job is determined not to be capable of case binding in step S9-5 since the number of printing sheets is less than 10 which is the minimum number of sheets for processing, the flow proceeds to step S12-1, the message screen shown in FIG. 17 is displayed, and the mode is switched to pad binding, but an arrangement may be made wherein a switching setting is made from an unshown setting screen beforehand (a setting that in the event that case binding cannot be performed, the mode is switched to pad binding) and stored in the RAM 125, and in the event that a job is determined not to be capable of case binding in step S9-5 since the number of printing sheets is less than 10 which is the minimum number of sheets for processing, the flow proceeds to step S12-1 only in the event that the above switching setting has been made, but proceeds to step S9-8 in the event that the above switching setting has not been made.

As described above, the CPU circuit unit 122 effects control so as to enable selection of pad binding in the event that case binding can not be made, so the images that have been read in can be validly used.

Now, the above embodiments have been described as arrangements wherein both-sided original reading is performed at the original document feeding device 101 and both-sided printing is performed at the printer unit 2, but it is needless to say that the original reading and the body sheet printing are not restricted to this, and that single-sided reading, single-sided printing, etc., can be equally applied.

Also, description has been made in the above embodiments regarding an arrangement wherein the printer unit (printer engine) 2 is a laser beam device, but the present invention is by no means restricted to this, and the present invention is applicable to a wide variety of printing methods besides laser beam printing as well, such as non-laser-beam electrophotography (e.g., LED), liquid crystal shutter, ink-jet, thermal transfer, sublimation, and so forth.

Also, combinations of the first through third embodiments are also included in the present invention. For example, a configuration may be made combining the control for changing the maximum number of sheets for processing and the minimum number of sheets for processing indicated in the second embodiment (S10-1 and S10-2 in FIG. 15), and the control for switching to pad binding since case binding cannot be performed due to the number of printing sheets being smaller than the minimum number of sheets for processing indicated in the third embodiment (S12-1 and S12-2 in FIG. 15).

Now while the embodiments have been described, the present invention is capable of assuming embodiments in the form of, for example, a system, apparatus, method, program, storage medium, or the like, and more specifically, may be applied to a system configured of multiple devices, or may be applied to an apparatus configured of a single device. Further, with the image forming system 1000 according to the embodiments, all units other than the sheet processing device 230 are built into the image forming apparatus main unit (the portion of the reader 1 and printer unit 2 and so forth, excluding the sheet processing unit 230 in FIG. 1). That is to say, the image forming apparatus main unit side comprises all of the principal components, such as the CPU circuit unit 122 and image memory 120 and so forth. Also, the sheet processing device 230 is configured so as to be detachable from the image forming apparatus main unit, and further, a sheet processing device other than the sheet processing device 230 can be connected thereto. Thus, the present invention based on the embodiments is an invention as an image forming apparatus.

The following is a description regarding the configuration of a data processing program which can be read with the image forming system according to the present invention, with reference to the memory map shown in FIG. 42. FIG. 42 is a diagram illustrating the memory map of a recording medium (storage medium) for storing various data processing programs which can be read with the image forming system according to the present invention.

Although not shown in particular in the drawing, there are cases wherein information for managing program groups stored in the storage medium, such as version information, author, etc., is stored, and also cases wherein information dependent on the program reading side operating system or the like, such as icons for visually identifying programs, and so forth, are stored therein. Further, data dependent on the programs is also managed in the aforementioned directory. Moreover, there may be cases wherein programs for installing programs in the computer, programs for expanding the programs to be installed in the event that these are compressed, and so forth, may be stored therein.

The functions of the present embodiment shown in FIGS. 13, 15, and 16, may be realized by a host computer executing programs (including various kinds of management information programs shown in FIGS. 18, 20, 36, 37, and 38) installed from an external device. In this case, the present invention may be applied to an arrangement wherein information including programs is supplied to an output apparatus through a storage medium such as CD-ROM, flash memory, FD, or the like, or via a network.

For example, description will be made regarding an arrangement wherein the image forming system 1000 according to the present embodiment is controlled through a host computer which is an example of the external device 2002.

Let us say that the program data for executing various kinds of processing and control as shown in FIG. 42 described in the present embodiment is downloaded to a host computer from a data supply source such as WEB or the like, or the aforementioned storage medium. In this stage, upon the user giving instructions for starting up a printer driver for operating the image formation system 1000 according to the present embodiment through a mouse or a keyboard, the CPU of the aforementioned host computer displays the printing setting screen shown in FIG. 40, on the display unit of the host computer.

Figure 40:
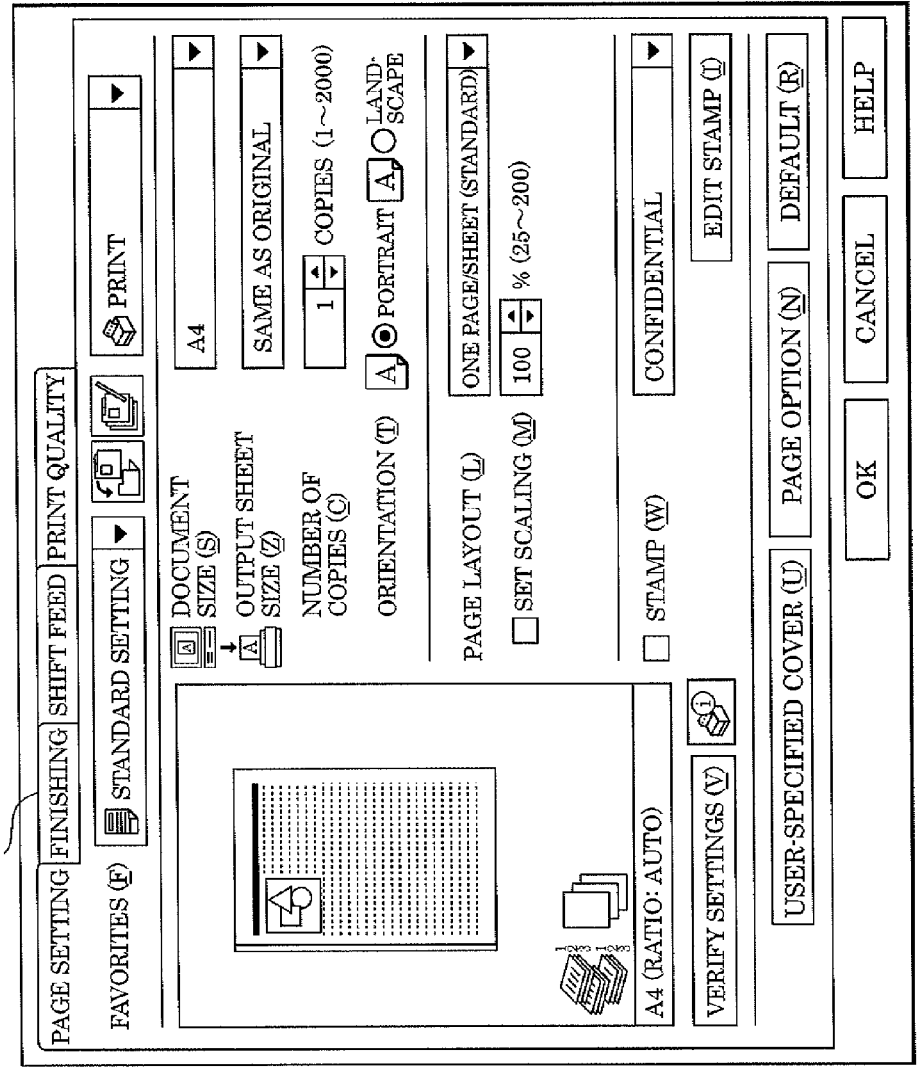
FIG. 40 is a diagram illustrating an example of a user interface screen to be controlled with the embodiment.
Figure 41:
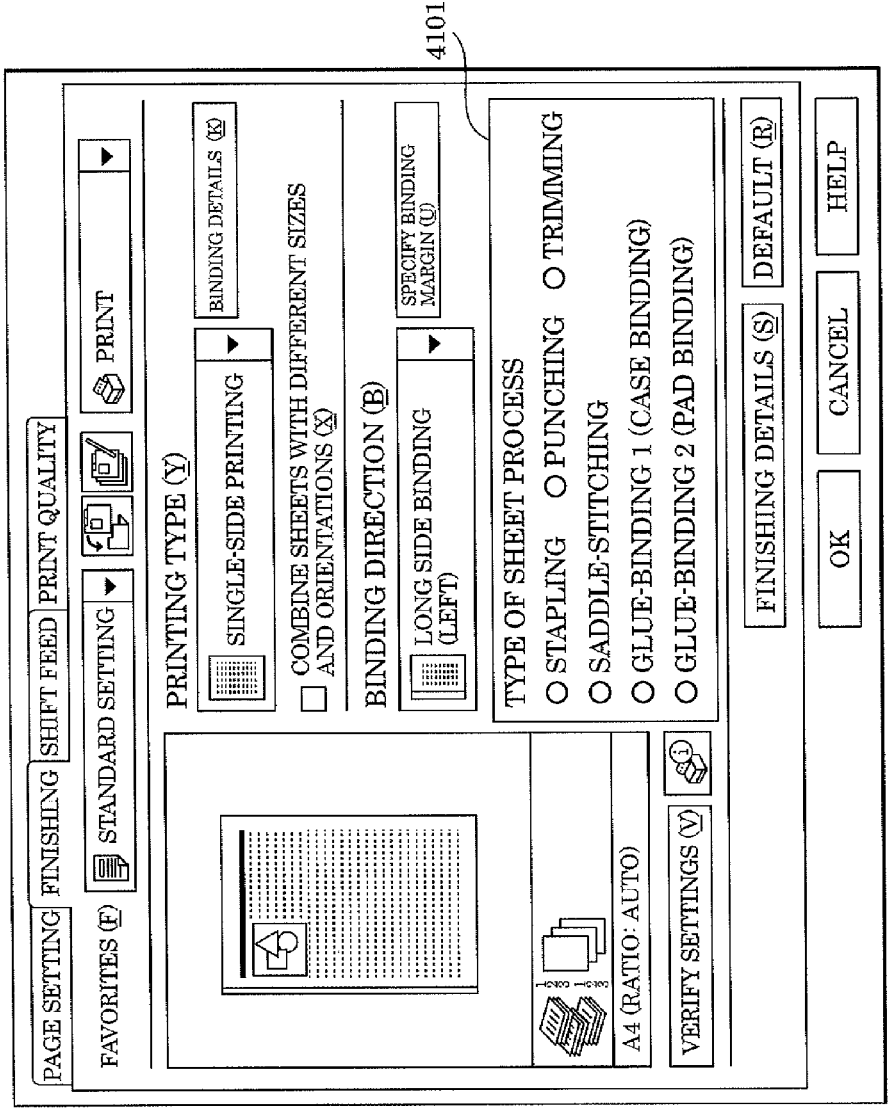
FIG. 41 is a diagram illustrating an example of another user interface screen to be controlled with the embodiment.

Then, for example, upon the user pressing the finishing key 4001 on the operating screen shown in FIG. 40, through the mouse, the CPU of the host computer controls the display unit so as to switch the current printing-setting screen to another printing setting screen shown in FIG. 41.

In this stage, the CPU of the host computer allows the user to select the kind of sheet process which is to be executed by the sheet processing device 230 included in the image formation system 1000 according to the present embodiment, through the sheet process setting item 4101 on the printing setting screen shown in FIG. 41. Note that the external device 2002 such as the host computer has a function for displaying screens (not shown) other than the screens shown in FIGS. 40 and 41, which allow the user to input other instructions described in the present embodiment. That is to say, the image formation system according to the present embodiment allows the user to execute the same processing and control as those described above, through such an external device.

In this stage, let us say that the user selects a desired sheet process through the setting item 4101, and presses the OK key so as to return to the screen shown in FIG. 40.

Upon reception of these instructions, the CPU of the host computer correlates the commands for instructing various printing conditions specified by the user through the aforementioned printing setting screen with a series of printing data which is to be printed by the printer unit 2 as a single job, and transmits the job thus created, to the image formation system 1000 according to the present embodiment through the network 2001.

Upon the connector 121 of the present image formation system 100 receiving the job from the aforementioned host computer, the CPU circuit unit 122 of the present image formation system controls the image formation system 1000 so as to perform the job according to instructions for the process specified by the user through the host computer.

Such a configuration allows the user to execute the various kinds of functions described above through a job transmitted from the external device 2002 or the like, thereby further improving ease-of-use of the user.

It is needless to say that the object of the present invention may be realized by an arrangement wherein a storage medium storing a software program code for realizing the functions of the embodiments described above is supplied to a system or an apparatus, and the computer (CPU or MPU) of the system or the apparatus reads out and executes the program code stored in the storage medium.

In this case, the new functions according to the present invention are realized by the program code itself read out from the storage medium, and accordingly, the storage medium makes up the present invention.

Note that it is needless to say that the aforementioned program may be employed as long as the program has a function as described above, regardless of the kind of the program whether or not object codes, interpretive programs, script data supplied to OS, and so forth.

Examples of storage media for supplying the program include: a flexible disk; hard disk; optical disk; magnet-optical disk; MO; CD-ROM; CD-R; CD-RW; magnetic tape; nonvolatile memory card; ROM; DVD; and so forth.

In this case, the new functions according to the present invention are realized by the program code itself read out from the storage medium, and accordingly, the program code makes up the present invention.

Furthermore, the aforementioned program may be downloaded from a Web site on the Internet through a browser on a client computer in the form of an uncompressed program file or in the form of a compressed program file with an automatic install function. Furthermore, an arrangement may be made wherein the program code which makes up the program according to the present invention is divided into multiple files, and each of the files thus divided are downloaded from different Web sites. That is to say, a WWW server, an ftp server, and so forth, which allow multiple users to download the program file for realizing the functions according to the present invention through a computer are also included within the spirit and scope of the appended claims.

Also, distribution of the program may be realized by encrypting the program and storing in a storage medium such as a CD-ROM or the like to be distributed to the user, following which users meeting a predetermined condition are permitted to download key information for decrypting the encryption from a Web site on the Internet, and running the encrypted program using the key information so as to be installed on the computer.

Also, it is needless to say that the present invention is not restricted to cases wherein the functions of the above-described embodiments are realized by a computer executing program code that has been read out, but also includes cases wherein an operating system or the like running on the computer based on the instructions of the program code performs part or all of the actual processing, whereby the functions of the above-described embodiments are realized.

Further, it is needless to say this includes cases wherein the program code read out from a storage medium is written to memory in a function expansion board inserted to the computer or in a function expansion unit connected to the computer, following which, a CPU provided to the function expansion board or function expansion unit performs part of all of the actual processing based on the commands of the program code, whereby the functions of the above-described embodiments are realized.

Further, the present invention may be applied to a system configured of multiple devices, or to an apparatus configured of a single device. Also, it is needless to say that the present invention also can be applied to cases wherein the invention is realized by supplying a program to a system or a device. In this case, the system or device can manifest the advantages of the present invention by the system or device reading out the program described as software for achieving the present invention from the recording medium to the system or device.

The present invention is by no means restricted to the above embodiments; rather, a wide range of modifications (including organic combinations of the embodiments) may be made based on the spirit of the present invention, and these modifications are also encompassed within the scope of the present invention.

Also, according to the configuration of the embodiments described above, problems expected with the conventional art can be proactively avoided in the process of realizing a product of an image forming apparatus or image forming system enabling the gluing process to be performed on sheets, whereby unexpected trouble in the apparatus or extra work for the operator can be prevented beforehand, thereby providing an image forming apparatus or image forming system such as a digital printing system or the like which handles an environment capable of performing the sheet gluing process, and is user-friendly.

Further, the above configuration allows impediments in glue-binding, due to the restriction items occurring due to reduction in size of the device for performing the glue-binding, to be suppressed, and solves the ill ease-of-use due to the restriction items occurring due to reduction in size, footprint, and cost.

Further, the above configuration takes into consideration various user needs regarding bookbinding (glue-binding such as case binding and pad binding, non-glue binding such as saddle-stitching, and so forth), and handles such user needs.

Further, the above configuration takes into consideration various user needs regarding output of the glue-bound printed articles, and handles a wide variety of output formats to meet such needs.

Further, the above configuration takes into consideration various user needs regarding glue-binding, and flexibly handles various user needs, is easy to use, and provides increased user advantages.

Thus, the present invention flexibly handles various needs of various users including the demands of users who wish to perform glue-binding processes on printed sheets for example, and according to the present invention, impediments in glue-binding, due to the restriction items occurring due to reduction in size of the device for performing the glue-binding, can be suppressed. Further, simple glue-binding processing, such as pad binding which does not use a cover sheet, can be easily performed. Moreover, the arrangement wherein pad binding can be selected in the event that case binding cannot be performed allows images which have been read to be validly used.

Also, this provides a compact and inexpensive image forming apparatus and image forming system having a glue-binding device, wherein impediments in glue-binding, due to the restriction items occurring due to reduction in size of the device for performing the glue-binding can be suppressed, such as situations in binding wherein a user might have a false impression that large-size binding wherein the final results would be a large-size bound printed article could be made, and specify printing and binding to large-sized sheets, or might print sheets exceeding the maximum number.

Customers who had so far not purchased such products due to issues of costs, installation area, and so forth, will be able to introduce this product to the workplace, and obtain the advantages of glue-binding at low costs.

Further, the present system can be used from an external device as well, which is even more advantageous.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing apparatus, comprising:
a reading unit configured to read an original document and generate image data;
a printing unit configured to perform a printing process on a sheet based on the image data generated by the reading unit;
a binding unit configured to perform a case binding process which is for performing gluing of a spine of a sheet bundle on which the printing process has been performed and casing with a cover sheet the sheet bundle on which the gluing has been performed;
a displaying unit configured to display a setting screen for a user to set a printing setting;
a calculating unit configured to calculate, before the printing unit starts the printing process, a number of sheets to be used as body sheets of the case binding process, based on a number of the original documents read by the reading unit and the printing setting set on the setting screen; and
a controlling unit configured to permit the printing unit to start the printing process in a case where the number of the sheets calculated by the calculating unit is greater than or equal to a first number which is a lower limit number of sheets which enables the case binding process for casing with the cover sheet the sheet bundle on which the gluing has been performed and is less than or equal to a second number which is an upper limit number of sheets appropriate for the case binding process, and to inhibit the printing unit from starting the printing process in a case where the number of the sheets calculated by the calculating unit is less than the first number or is greater than the second number, wherein the lower limit number of sheets provides enough glued area for casing with the cover sheet the sheet bundle.

2. The printing apparatus according to claim 1, wherein a combination of the first number and the second number differs based on a type of the sheets to be printed by the printing unit.

3. The printing apparatus according to claim 1, wherein the printing setting includes at least a both-sided printing setting.

4. The printing apparatus according to claim 1, wherein the printing setting includes at least a reduced layout setting.

5. A printing method for a printing apparatus including a printing unit, the printing method comprising:
reading an original document and generating image data;
performing a printing process on a sheet based on the image data by using the printing unit;
performing a case binding process by using a binding unit, the case binding process for performing gluing of a spine of a sheet bundle on which the printing process has been performed and casing with a cover sheet the sheet bundle on which the gluing has been performed;
displaying a setting screen for a user to set a printing setting;
calculating, before the printing unit starts the printing process, a number of sheets to be used as body sheets of the case binding process, based on a number of the original documents read in the reading step and the printing setting set on the setting screen; and
permitting the printing unit to start the printing process in a case where the number of the sheets calculated in the calculating step is greater than or equal to a first number which is a lower limit number of sheets which enables the case binding process for casing with the cover sheet the sheet bundle on which the gluing has been performed and is less than or equal to a second number which is an upper limit number of sheets appropriate for the case binding process, and inhibiting the printing unit from starting the printing process in a case where the number of the sheets calculated by the calculating unit is less than the first number or is greater than the second number, wherein the lower limit number of sheets provides enough glued area for casing with the cover sheet the sheet bundle.

6. The printing method according to claim 5, wherein a combination of the first number and the second number differs based on a type of the sheets to be printed by the printing unit.

7. The printing method according to claim 5, wherein the printing setting includes at least a both-sided printing setting.

8. The printing method according to claim 5, wherein the printing setting includes at least a reduced layout setting.

9. A printing system, comprising:
a reading unit configured to read an original document and generate image data;
a printing unit configured to perform a printing process on a sheet based on the image data generated by the reading unit;
a binding unit configured to perform a case binding process which is for performing gluing of a spine of a sheet bundle on which the printing process has been performed and casing with a cover sheet the sheet bundle on which the gluing has been performed;
a displaying unit configured to display a setting screen for a user to set a printing setting;
a calculating unit configured to calculate, before the printing unit starts the printing process, a number of sheets to be used as body sheets of the case binding process, based on a number of the original documents read by the reading unit and the printing setting set on the setting screen; and
a controlling unit configured to permit the printing unit to start the printing process in a case where the number of the sheets calculated by the calculating unit is greater than or equal to a first number which is a lower limit number of sheets which enables the case binding process for casing with the cover sheet the sheet bundle on which the gluing has been performed and is less than or equal to a second number which is an upper limit number of sheets appropriate for the case binding process, and to inhibit the printing unit from starting the printing process in a case where the number of the sheets calculated by the calculating unit is less than the first number or is greater than the second number, wherein the lower limit number of sheets provides enough glued area for casing with the cover sheet the sheet bundle.

10. The printing system according to claim 9, wherein a combination of the first number and the second number differs based on a type of the sheets to be printed by the printing unit.

11. The printing system according to claim 9, wherein the printing setting includes at least a both-sided printing setting.

12. The printing system according to claim 9, wherein the printing setting includes at least a reduced layout setting.

* * * * *